(12) United States Patent
Shimojoh

(10) Patent No.: US 6,480,328 B2
(45) Date of Patent: Nov. 12, 2002

(54) OPTICAL AMPLIFIER AND OPTICAL AMPLIFICATION METHOD FOR AMPLIFYING WAVELENGTH DIVISION MULTIPLEXED SIGNAL LIGHT

(75) Inventor: Naomasa Shimojoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/727,448

(22) Filed: Dec. 4, 2000

(65) Prior Publication Data

US 2001/0048545 A1 Dec. 6, 2001

(30) Foreign Application Priority Data

Jan. 18, 2000 (JP) .......................... 2000-009385

(51) Int. Cl.$^7$ ............................................. H01S 3/091
(52) U.S. Cl. ............... 359/341; 359/341.1; 359/341.41; 359/341.12; 359/349; 359/341.4
(58) Field of Search ........................... 359/341.1, 341.2, 359/341.33

(56) References Cited

U.S. PATENT DOCUMENTS

| | | | | |
|---|---|---|---|---|
| 5,383,046 A | * | 1/1995 | Tomofuji et al. | 359/110 |
| 5,548,438 A | * | 8/1996 | Delavaux | 359/341.2 |
| 5,748,363 A | * | 5/1998 | Duck et al. | 359/143 |
| 6,049,417 A | * | 4/2000 | Srivastava et al. | 359/337.4 |
| 6,091,542 A | * | 7/2000 | Yang | 359/173 |
| 6,130,775 A | * | 10/2000 | Yang | 359/341.2 |
| 6,285,479 B1 | * | 9/2001 | Okazaki et al. | 359/124 |

OTHER PUBLICATIONS

Sun et al. "A Gain–Flattened Ultra Wide Band EDFA For High Capacity WDM Optical Communications Systems" Dep. 20–24, 1998, ECOCvol. 1 pp. 53–54.*

Yan Sun, et al., "Ultra Wide Band Erbium–Doped Silica Fiber Amplifier with 80 nm of Bandwidth", Postdeadline Papers 1997, Optical Amplifiers and Their Applications, Jul. 21–23, 1997.

M. Yamada, et al., "Recent Progress in Broadband and Gain–flattened Optical Fiber Amplifiers." Technical Report of IEICE, OCS97–42, ED97–132, OPE97–87, LQU97–87, Nov. 1997.

* cited by examiner

Primary Examiner—Thomas H. Tarcza
Assistant Examiner—Stephen Cunningham
(74) Attorney, Agent, or Firm—Staas & Halsey LLP

(57) ABSTRACT

An object of the invention is to provide, for an optical amplifier which performs amplification of optical signals of two wavelength bands, an optical amplifier and an optical amplification method of a simple configuration which can deal with restrictions on installation space, power consumption and the like. Hence with the optical amplifier of the invention, optical circulators are respectively connected to opposite ends of an optical amplifying means, and optical signals of the respective wavelength bands of a first wavelength band and a second wavelength band are input and output to the optical amplifying means via each of the optical circulators so that the propagation directions of the respective optical signals of the respective wavelength bands are in mutually opposite directions inside a rare earth element doped fiber. As a result, the optical signals of the respective wavelength bands can be collectively amplified with a simple configuration using a single rare earth element doped fiber.

16 Claims, 47 Drawing Sheets

OPTICAL AMPLIFIER AND OPTICAL AMPLIFICATION METHOD FOR AMPLIFYING WAVELENGTH DIVISION MULTIPLEXED SIGNAL LIGHT

BACKGROUND OF THE INVENTION

1. Field of the Invention

The present invention relates to an optical amplifier and optical amplification method for amplifying wavelength division multiplexed signal light. In particular, the invention relates to an optical amplifier and optical amplification method for collectively amplifying wavelength division multiplexed signal light which includes optical signals of two wavelength bands.

2. Description of the Related Art

With conventional long distance optical transmission systems, optical transmission is performed using optical regenerating repeaters which convert optical signals into electric signals to effect re-timing, re-shaping, and regenerating. However recently, with progress in the utilization of optical amplifiers, optical amplifying-and-repeating transmission systems which use optical amplifiers as linear repeaters are being investigated. By replacing an optical regenerating repeater with an optical amplifying repeater, the number of parts in the repeater can be greatly reduced, with the prospect of maintaining reliability and greatly reducing costs.

Furthermore, as one method of realizing a large capacity of an optical transmission system, a wavelength division multiplexed (WDM) optical transmission system which multiplexes two or more optical signals having different wavelengths to transmit on a single optical transmission path is attracting attention. In a WDM optical amplifying repeater transmission system with the aforementioned optical amplifying-and-repeating transmission system combined with a WDM optical transmission system, it is possible to collectively amplify WDM signal light using an optical amplifier, thus enabling the realization of large capacity and long distance transmission with a simple (economic) configuration.

For the wavelength band of the WDM signal light used in the aforementioned conventional optical transmission system, in addition to a so called C band of 1550 nm band, recently a so called L band of 1580 nm band is being investigated. Moreover, a WDM optical amplifying-and-repeating transmission system where both are transmitted along a single transmission path (a C/L band WDM optical amplifying-and-repeating transmission system) is being investigated.

As an optical amplifier having an optical amplification band in both the C band and the L band, there is known for example an article "Recent Research Direction Related to Optical Fiber Amplifiers and Wide Bands" by Yamada et al, Technical Report of IEICE. OCS 97-42, ED 97-132 OPE 97-87 LQE 97-87 (1997-11). This optical amplifier, as shown in the block diagram of FIG. 49, is of a simple parallel configuration where WDM signal light to be input thereto is demultiplexed by a demultiplexer into a C band and an L band, and after being respectively amplified in a C band optical amplifying section and an L band optical amplifying section, is multiplexed by a multiplexer and then output.

However, since the multiplexer is provided on the output side of the respective C band and the L band optical amplifying sections, there is a problem that the noise figure deteriorates by the insertion loss component. As a technique for coping with this, there is known for example an optical amplifier disclosed for example in "Optical Amplifiers and their Applications, Post deadline 2 of '97 published by Lucent. A schematic configuration of this is shown in the block diagram of FIG. 50. With the configuration of FIG. 50, a C/L band optical amplifying section having an amplifying band in both the C band and the L band is arranged before the demultiplexer in the configuration of FIG. 49. Hence at least a gain equal to or greater than the insertion loss component of the demultiplexer is ensured by the C/L band optical amplifying section, so that an improvement in the noise figure is achieved.

However, with the aforementioned conventional C/L band optical amplifier, in the case of the configuration shown in FIG. 50, since this has three or more optical fiber amplifying sections, the number of excitation light sources also increases. As a result, the power consumption of the overall optical amplifier increases. In particular, when as with optical amplifiers used for example as undersea repeaters or the like, there are restrictions from the view point of installation space, power consumption or other factors, it is difficult to realize a configuration such as shown in FIG. 50.

Furthermore, a system where the respective signal lights of the C/L band are transmitted in bi-directions of the ascending line and the descending line is also being investigated, and hence there is a strong demand for a C/L band optical amplifier of a simple configuration, which copes with even for such a system.

SUMMARY OF THE INVENTION

The present invention focuses on the above points, with an object of providing, for an optical amplifier and an optical amplification method which performs amplification of optical signals of two wavelength bands, an optical amplifier and an optical amplification method of a simple configuration which can deal with restrictions on installation space, power consumption and the like.

An optical amplifier according to the present invention for achieving the aforementioned object, as shown in FIG. 1, is constituted so that in an optical amplifier for amplifying wavelength division multiplexed signal light which contains respective optical signals of a first wavelength band and a second wavelength band, there is provided an optical amplifying means 1 for amplifying the wavelength division multiplexed signal light using a rare earth element doped fiber to which excitation light is supplied, a first optical circulator 2A having at least three ports, connected to one end of the rare earth element doped fiber, a second optical circulator 2B having at least three ports, connected to the other end of the rare earth element doped fiber, wherein an optical signal of the first wavelength band is input to the rare earth element doped fiber via the first optical circulator 2A and output from the rare earth element doped fiber via the second optical circulator 2B, and an optical signal of the second wavelength band is input to the rare earth element doped fiber via the second optical circulator 2B, and output from the rare earth element doped fiber via the first optical circulator 2A so that signal light of the respective wavelength bands is propagated in mutually opposite directions inside the rare earth element doped fiber.

With such a configuration, the respective signal lights of the first wavelength band and the second wavelength band are input and output to the rare earth element doped fiber via the respective optical circulators 2A and 2B so as to have mutually opposite propagation directions, then even with an optical amplifier which uses only one rare earth element doped fiber, the optical signals of the respective wavelength bands are collectively amplified. Moreover, the respective optical isolators 2A and 2B achieve a function equivalent to an optical isolator or the like conventionally used in order to prevent the influence of reflection light. As a result, the configuration of the optical amplifier can be simplified, and low power consumption achieved.

A specific configuration for the aforementioned optical amplifier may be such that the first optical circulator 2A outputs optical signals of the first wavelength band input to a first port P1 from a second port P2 connected to one end of the rare earth element doped fiber, and outputs optical signals of the second wavelength band which are propagated inside the rare earth element doped fiber and input to the second port P2 from a third port P3, and the second optical circulator 2B outputs optical signals of the second wavelength band input to a first port P1 from a second port P2 connected to the other end of the rare earth element doped fiber, and outputs optical signals of the first wavelength band which are propagated inside the rare earth element doped fiber and input to the second port P2 from a third port P3.

Moreover, the wavelength division multiplexed signal light may be specifically set such that the first wavelength band is a 1580 nm band and the second wavelength band is a 1550 nm band.

For the aforementioned optical amplifier, in the case where the wavelength band is set as above, then as shown in FIG. 2, the configuration may be such that there is provided an auxiliary optical amplifying means 1' having an optical amplifying band in the first wavelength band, for amplifying only optical signals of the first wavelength band output from the second optical circulator 2B to output.

With such a configuration, even in the case where optical amplification with respect to the first wavelength band in the optical amplifying means 1 is insufficient compared to that for the second wavelength band, this insufficiency is amplified by the auxiliary optical amplifying means 1', enabling optical signals of a substantially uniform level to be obtained for the respective wavelength bands.

A specific configuration for the aforementioned optical amplifier may be such that, at the time of amplifying wavelength division multiplexed signal light which contains respective optical signals of the first wavelength band and the second wavelength band transmitted in the same direction, there is provided a demultiplexing means for demultiplexing the wavelength division multiplexed signal light into respective signal lights of the first wavelength band and the second wavelength band, and outputting the demultiplexed signal light of the first wavelength band to a first port P1 of the first optical circulator 2A, and outputting the signal light of the second wavelength band to a first port P1 of the second optical circulator 2B, and a multiplexing means for multiplexing the optical signal of the second wavelength band output from the third port P3 of the first optical circulator 2A and the optical signal of the first wavelength band output from the third port P3 of the second optical circulator 2B.

Moreover, the configuration may be such that at the time of amplifying wavelength division multiplexed signal light which contains respective optical signals of the first wavelength band and the second wavelength band transmitted in opposite directions, there is provided first and second optical multiplexing/demultiplexing means respectively provided with a function for demultiplexing the wavelength division multiplexed signal light into respective signal lights of the first wavelength band and the second wavelength band, and for multiplexing the respective signal lights of the first wavelength band and the second wavelength band, and the first optical multiplexing/demultiplexing means demultiplexes the signal light of the first wavelength band to send to a first port P1 of the first optical circulator 2A, and multiplexes the signal light of the second wavelength band sent from a third port P3 of the first optical circulator 2A and outputs the multiplexed signal light, and the second optical multiplexing/demultiplexing means demultiplexes the signal light of the second wavelength band to send to a first port P1 of the second optical circulator 2B, and multiplexes the signal light of the first wavelength band sent from a third port P3 of the second optical circulator 2B and outputs the multiplexed signal light.

Other objects, characteristics and advantages of the present invention will become apparent from the following description of embodiments given in conjunction with the appended drawings.

BRIEF DESCRIPTION OF THE DRAWINGS

FIG. 50 is a block diagram showing the configuration of a conventional C/L band optical amplifier where insertion loss of a demultiplexer is compensated for.

DETAILED DESCRIPTION OF THE INVENTION

Hereunder is a description of embodiments of the present invention based on the drawings.

Figure 1:
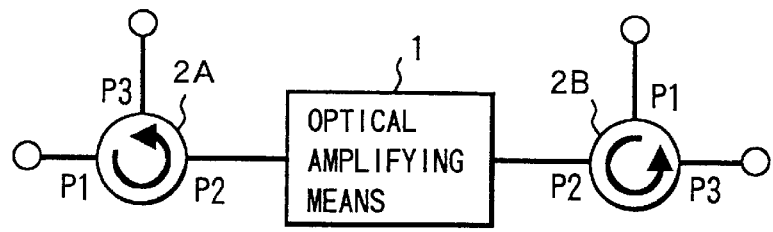
FIG. 1 is a block diagram showing a basic configuration of the present invention.
Figure 2:
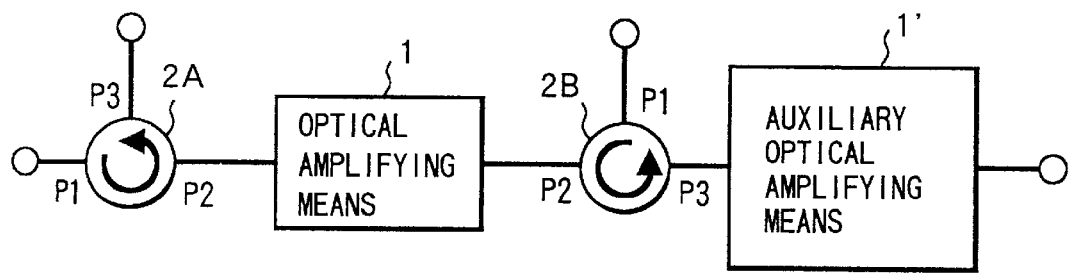
FIG. 2 is a block diagram showing another basic configuration of the present invention.
Figure 3:
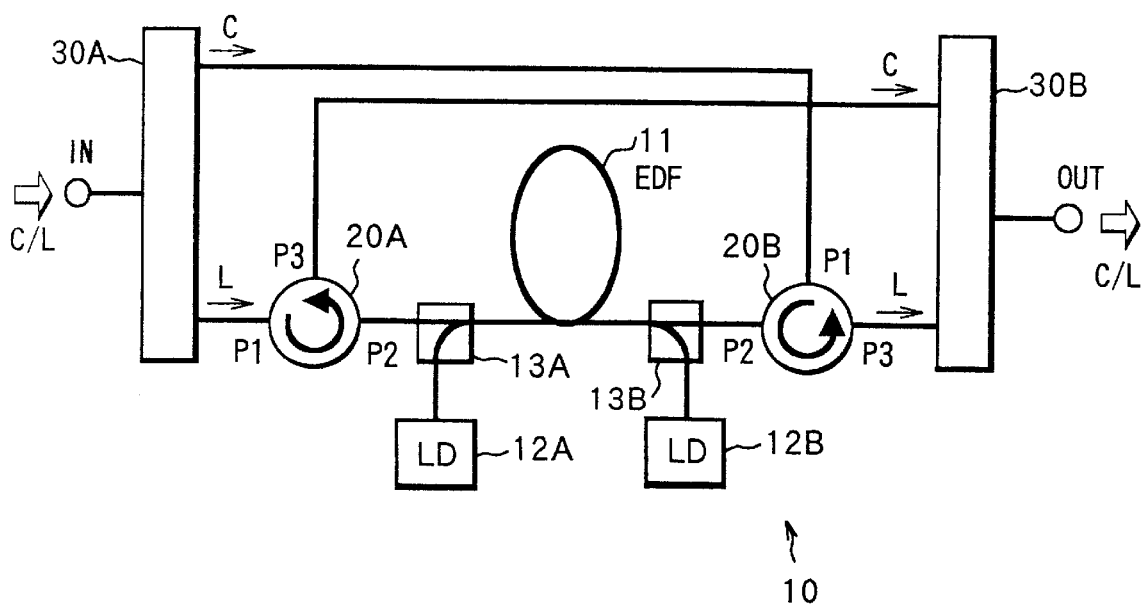
FIG. 3 is a block diagram showing the configuration of a first embodiment of the present invention.

FIG. 3 is a block diagram showing the configuration of an optical amplifier according to a first embodiment.

In FIG. 3, this optical amplifier has for example an optical fiber amplifying section 10 serving as a first optical amplifying means 1, optical circulators 20A and 20B serving as a first optical circulator 2A and a second optical circulator 2B, a demultiplexer 30A serving as a demultiplexing means, and a multiplexer 30B serving as a multiplexing means. Here, the L band corresponds to a first wavelength band. More specifically, this represents a wavelength band (1580 nm band) for example from 1565 to 1610 nm. Furthermore, the C band corresponds to a second wavelength band. More specifically, this represents a wavelength band (1550 nm band) for example from 1525 to 1565 nm. However, the first and second wavelength bands applicable to the present invention, are not limited to the aforementioned range.

The optical fiber amplifying section 10 includes for example an erbium doped optical fiber (EDF) 11, two excitation light sources (LD) 12A, 12B, and WDM couplers 13A, 13B.

The EDF 11 is a known rare earth element doped fiber with erbium (Er) doped into an optical fiber. Here this has an amplifying band for the L band and the C band. The respective excitation light sources 12A and 12B are standard light sources which produce excitation light of a wavelength band (for example, the 980 nm band or 1480 nm band) which can excite the erbium inside the EDF 11. A WDM coupler 13A is an optical coupler for supplying excitation light produced by the excitation light source 12A to the EDF 11 from the optical circulator 20A side. Furthermore, a WDM coupler 13B is an optical coupler for supplying excitation light produced by the excitation light source 12B to the EDF 11 from the optical circulator 20B side.

The optical circulator 20A is an optical passive element which only passes light in a specified direction as indicated by the arrow in the figures, having for example a first port P1, a second port P2, and a third port P3, with a low loss with respect to light traveling respectively in the forward direction from P1 to P2, from P2 to P3, and from P3 to P1, and a high loss with respect to light returning in the opposite direction to the aforementioned respective directions. Here, the port P1 is connected to an L band output port of the demultiplexer 30A, the port P2 is connected to the WDM coupler 13A of the optical fiber amplifying section 10, and the port P3 is connected to the C band input port of the multiplexer 30B. Moreover, the optical circulator 20B also, as with the optical circulator 20A, has three ports P1 to P3. Here, the port P1 is connected to the C band output port of the demultiplexer 30A, the port P2 is connected to the WDM coupler 13B of the optical fiber amplifying section 10, and the port P3 is connected to the L band input port of the multiplexer 30B.

The demultiplexer 30A branches the WDM signal light input to the input terminal IN of this optical amplifier, into respective optical signals of the L band and the C band, and outputs these from the ports corresponding to each wavelength band. The multiplexer 30B takes the input of the respective optical signals of the C band and the L band which have been amplified by the optical fiber amplifying section 10 and respectively output via the respective optical circulators 20A and 20B, and multiplexes these, and sends them to the output terminal OUT of the optical amplifier to output these to the outside.

With the optical amplifier of the above configuration, WDM signal light which has been wavelength division multiplexed and transmitted in the same direction is input to the input terminal IN, and this WDM signal light is demultiplexed into the L band and the C band in the demultiplexer 30A. Then, the demultiplexed L band optical signal is input to the port P1 of the optical circulator 20A, transmitted to the port P2, and then sent to the optical fiber amplifying section 10. Moreover, the demultiplexed C band optical signal is input to the port P1 of the optical circulator 20B, transmitted to the port P2, and then sent to the optical fiber amplifying section 10.

With the optical fiber amplifying section 10, the L band optical signal is input to the EDF 11 from the left side in FIG. 3 via the WDM coupler 13A, while the C band optical signal is input to the EDF 11 from the right side in FIG. 3 via the WDM coupler 13B. In the EDF 11, the respective excitation light produced by the excitation light sources 12A and 12B is supplied respectively via the WDM couplers 13A and 13B from both ends in bi-directions, to thereby excite the erbium inside the EDF 11. With the EDF 11 in the excited condition, the respective optical signals of the L band and the C band are propagated in mutually opposite directions, so that the EDF 11 has an optical amplifying effect with respect to each of the wavelength bands.

The L band optical signal which has been propagated inside the EDF 11 in the right direction in FIG. 3 and amplified, is input to the port P2 of the optical circulator 20B via the WDM coupler 13B, transmitted to the port P3, and then sent to the L band input port of the multiplexer 30B. Moreover, the C band optical signal which has been propagated inside the EDF 11 in the left direction in FIG. 3 and amplified, is input to the port P2 of the optical circulator 20A via the WDM coupler 13A, transmitted to the port P3, and then sent to the C band input port of the multiplexer 30B. Furthermore, in the multiplexer 30B, the respective optical signals of the L band and the C band input to the respective input ports, are multiplexed, and WDM signal light which has been amplified to a required level is output to the outside via the output terminal OUT.

In this way, with the optical amplifier of the first embodiment, the optical circulators 20A and 20B are respectively connected to the both ends of the optical fiber amplifying section 10, and the respective optical signals of the L band and the C band are supplied to the EDF 11 so that the propagation directions of the respective optical signals of the L band and the C band are in mutually opposite directions inside the EDF 11. As a result, the respective optical signals of the L band and the C band can be collectively amplified with a simple configuration using a single EDF 11. In this way, even in the case where there is a restriction on the number of excitation light sources or on power consumption, a C/L band optical amplifier can be easily realized. This is useful particularly for optical amplifiers used for example as undersea repeaters or the like. Furthermore, by respectively arranging the optical circulators 20A and 20B at the opposite end portions of the EDF 11, a function equivalent to an optical isolator or the like, conventionally inserted in order to prevent the influence due to reflection of the signal light, is realized by the respective optical circulators 20A and 20B. Therefore it is possible to provide an optical amplifier with a simpler configuration and with minimal losses.

Here, with the aforementioned first embodiment, the description has been for the case where the respective optical signals of the L band and the C band transmitted in the same direction are input and output in a wavelength multiplexed condition to the optical amplifier. However, in the case where the respective band optical signals are individually input and output with respect to the optical amplifier, it is possible to omit the demultiplexer 30A and the multiplexer 30B, so that the respective optical signals of the L band and the C band are input to the respective ports P1 of the optical circulators 20A and 20B, to take out the respective amplified optical signals of the L band and the C band from the respective ports P3 of the optical circulators 20B and 20A.

Next is a description of a second embodiment of the present invention.

Figure 4:
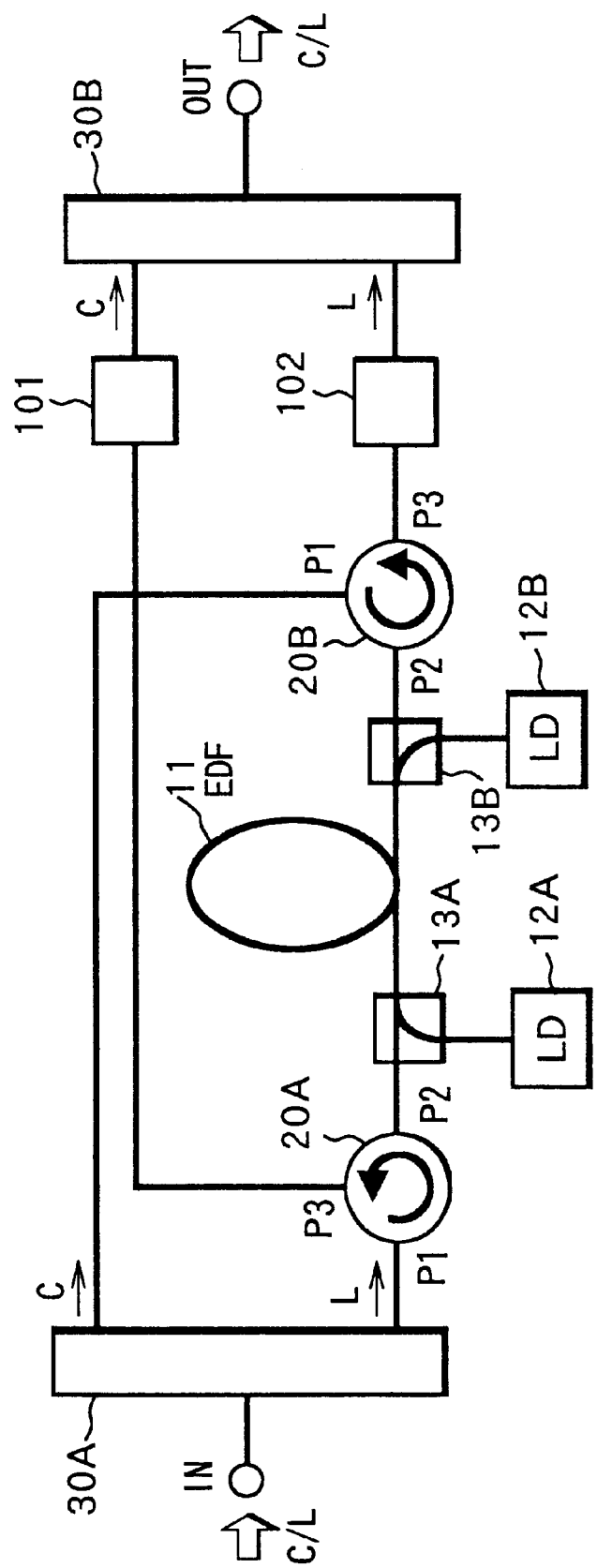
FIG. 4 is a block diagram showing the configuration of a second embodiment of the present invention.

FIG. 4 is a block diagram showing the configuration of an optical amplifier according to the second embodiment. Parts of the same configuration as for the first embodiment are denoted by the same reference symbols. The same applies for the subsequent embodiments.

In FIG. 4, with this optical amplifier, for example in the configuration of the aforementioned first embodiment, a C band compensation optical device 101 is provided between the port P3 of the optical circulator 20A and the C band input port of the multiplexer 30B, and an L band compensation optical device 102 is provided between the port P3 of the optical circulator 20B and the L band input port of the multiplexer 30B.

The C band compensation optical device 101 and the L band compensation optical device 102, may be for example standard optical passive elements such as dispersion compensation fibers (DCF) or fiber gratings used for compensating for wavelength dispersion (which may also include dispersion slope) which is generated and accumulates along the transmission path (not shown in the figure) connected to the present optical amplifier. Alternatively, these may be known gain equalizers having loss wavelength characteristics respectively corresponding to the gain wavelength characteristics of the respective bands in the optical fiber amplifying section 10. In the case where dispersion compensation and compensation of the gain wavelength characteristics are performed simultaneously, a DCF or the like, and a gain equalizer may be cascade connected for each of the respective bands. Here, the respective compensation optical devices 101 and 102 correspond to the wavelength dispersion compensation means or the gain equalizing means.

By having such a configuration, then in addition to the operational effect for the case of the first embodiment, the wavelength dispersion and the dispersion slope or the gain difference between the respective bands are compensated for inside the present optical amplifier, so that the transmission characteristics of the WDM signal light can be improved.

Here, with the second embodiment, the configuration is such that compensation optical devices are provided for each of the respective bands. However if there is a C/L band compensation optical device which can perform compensation for both the C band and the L band together, then while not shown in the figure, this C/L band compensation optical device may be provided between the multiplexer 30B and the output terminal OUT.

Next is a description of a third embodiment of the present invention.

With the third embodiment, the case is considered for where automatic level control (ALC) for controlling the output from the optical amplifier to be constant, is performed collectively with respect to the L band and the C band.

Figure 5:
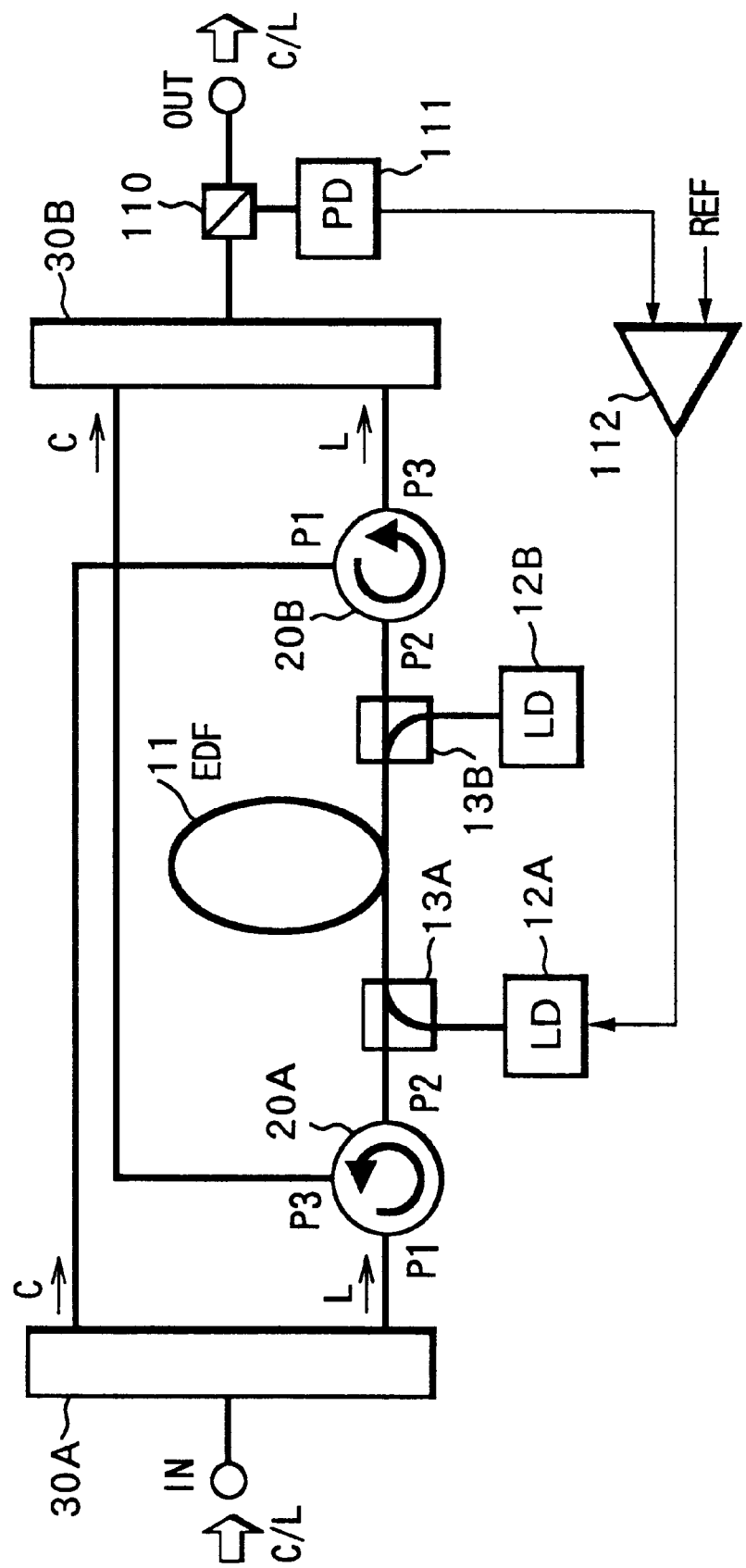
FIG. 5 is a block diagram showing the configuration of a third embodiment of the present invention.

FIG. 5 is a block diagram showing the configuration of the optical amplifier according to the third embodiment.

In FIG. 5, with this optical amplifier, for example in the configuration of the aforementioned first embodiment, a photocoupler 110, a photodetector (PD) 111 and an ALC circuit 112.

The photocoupler 110 is provided between the multiplexer 30B and the output terminal OUT, and branches part of the WDM signal light output from the multiplexer 30B and outputs the branched light to the photodetector 111. The photodetector 111 converts the light branched by the photocoupler 110, into electrical signals to output to the ALC circuit 112. The ALC circuit 112 compares the signals photo-electrically converted by the photodetector 111, with a previously set reference signal REF, and outputs to the optical fiber amplifying section 10, a control signal for controlling the amplification operation so that the WDM signal light level output from the present optical amplifier becomes constant. In the optical fiber amplifying section 10 which has received the control signal from the ALC circuit 112, the injection current or the like of for example the excitation light source 12A is adjusted in accordance with the control signal.

With the third embodiment as described above, in addition to the operational effect for the case of the first embodiment, the output light level is monitored to ALC operate the optical fiber amplifying section 10, so that even in the case where the input light level to the present optical amplifier is changed, WDM signal light of a constant level can be output. As a result, stabilized amplifying-and-repeating transmission of the WDM signal light becomes possible.

Figure 6:
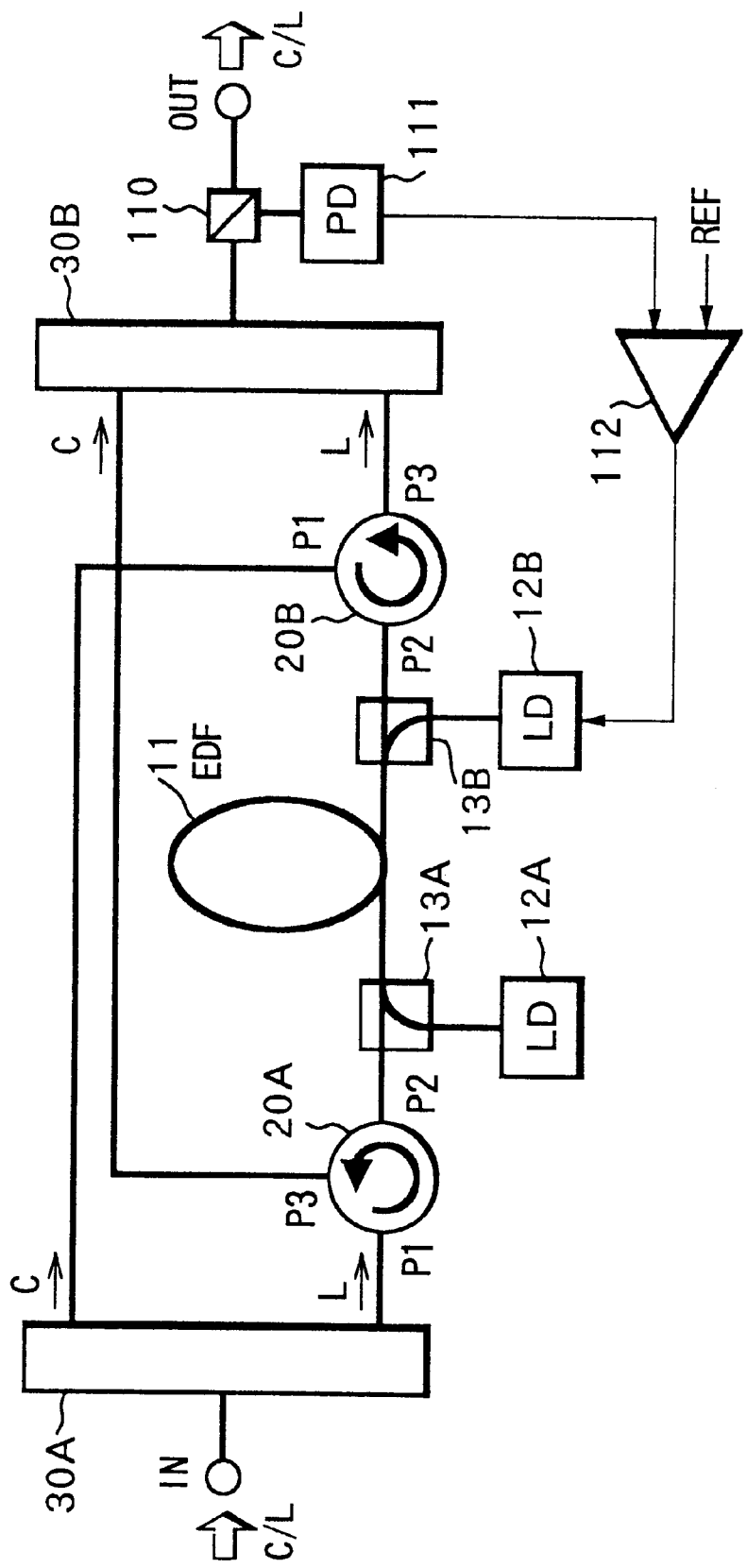
FIG. 6 is a block diagram showing another configuration example related to the third embodiment.

With the aforementioned third embodiment, the drive condition of the excitation light source 12A is controlled in accordance with a control signal from the ALC circuit 112, however as shown in FIG. 6, the drive condition of the excitation light source 12B may be controlled to realize ALC of the optical fiber amplifying section 10. Furthermore, while not shown in the figure, it is possible to respectively control the respective drive conditions of the excitation light sources 12A and 12B in accordance with a control signal from the ALC circuit 112.

Next is a description of a fourth embodiment of the present invention.

With the fourth embodiment, the case is considered for where automatic level control (ALC) for controlling the output from the optical amplifier to be constant, is performed individually with respect to the L band and the C band.

Figure 7:
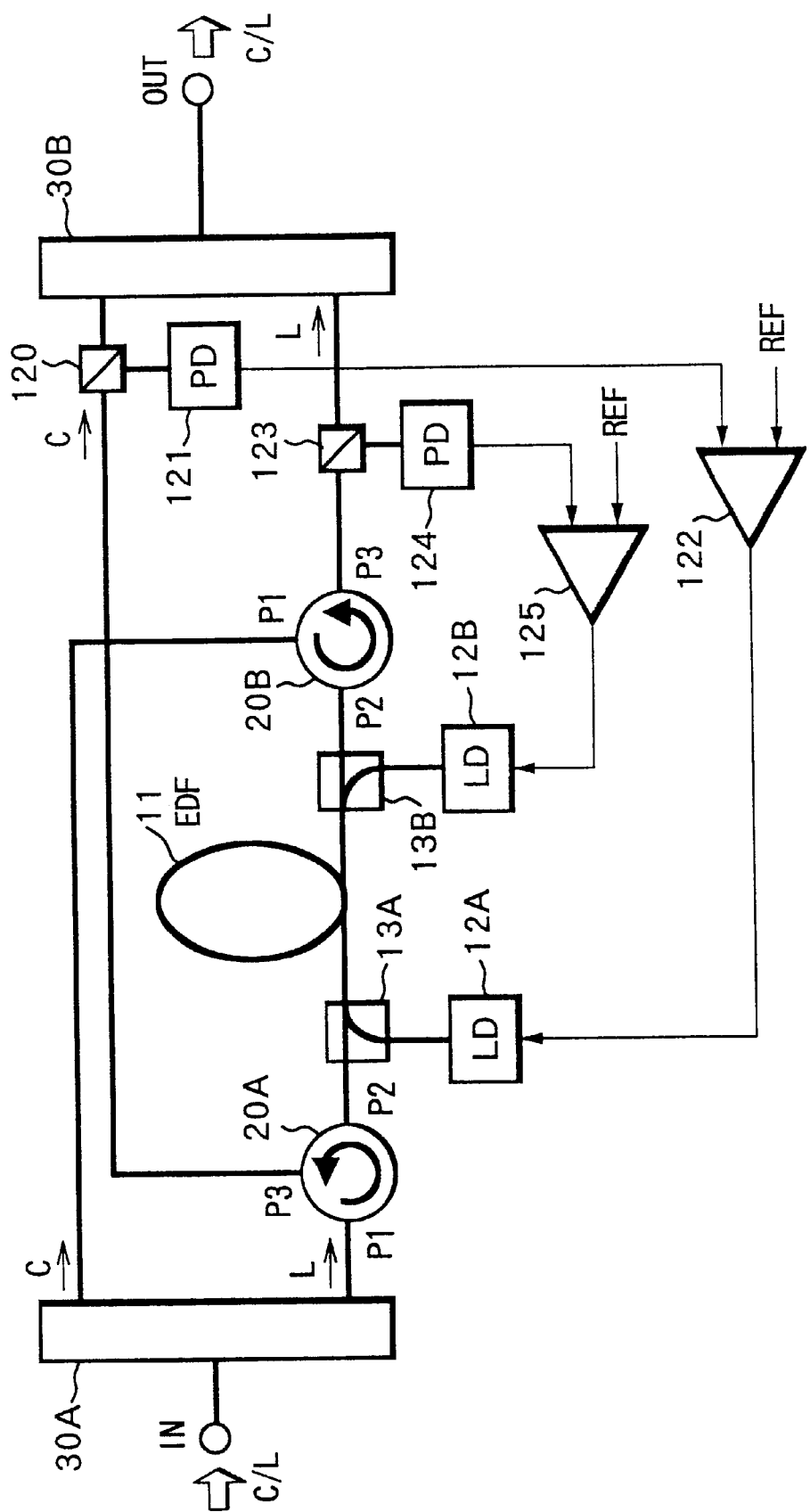
FIG. 7 is a block diagram showing the configuration of a fourth embodiment of the present invention.

FIG. 7 is a block diagram showing the configuration of the optical amplifier according to the fourth embodiment.

In FIG. 7, with this optical amplifier, for example in the configuration of the aforementioned first embodiment, a photocoupler 120, a photodetector 121 and an ALC circuit 122 are provided for the C band optical signal, and a photocoupler 123, a photodetector 124 and an ALC circuit 125 are provided for the L band optical signal.

The C band photocoupler 120 is provided between the port P3 of the optical circulator 20A and the C band input port of the multiplexer 30B, and branches part of the WDM signal light output from the port P3 of the optical circulator 20A and outputs the branched light to the photodetector 121. The photodetector 121 converts the light branched by the photocoupler 120, into electrical signals, to output to the ALC circuit 122. The ALC circuit 122 compares the signals photo-electrically converted by the photodetector 121, with a previously set reference signal REF, and outputs to the optical fiber amplifying section 10, a control signal for controlling the amplification operation so that the C band optical signal level output from the optical amplifier becomes constant. In the optical fiber amplifying section 10 which has received the control signal from the ALC circuit 122, the injection current or the like of for example the excitation light source 12A is adjusted in accordance with the control signal.

The L band photocoupler 123 is provided between the port P3 of the optical circulator 20B and the L band input port of the multiplexer 30B, and branches part of the WDM signal light output from the port P3 of the optical circulator 20B and outputs the branched light to the photodetector 124. The photodetector 124 converts the light branched by the photocoupler 123, into electrical signals, to output to the ALC circuit 125. The ALC circuit 125 compares the signals photoelectrically converted by the photodetector 124, with a previously set reference signal REF, and outputs to the optical fiber amplifying section 10, a control signal for controlling the amplification operation so that the L band optical signal level output from the optical amplifier becomes constant. In the optical fiber amplifying section 10 which has received the control signal from the ALC circuit 124, the injection current or the like of for example the excitation light source 12B is adjusted in accordance with the control signal.

Here, the reason why the drive condition of the excitation light source 12A is controlled with respect to the C band, and the drive condition of the excitation light source 12B is controlled with respect to the L band, is that it is better to control the excitation light source positioned on the rearward side (output side) with respect to the propagation direction of the respective band light inside the EDF 11 so that the optical signal level of each band can be effectively changed. ALC is also possible even if excitation light for different sides to the aforementioned case for each band is respectively controlled.

With the fourth embodiment as described above, in addition to the operational effect for the case of the first embodiment, the output light level of the L band and the C band is individually monitored to ALC operate the optical fiber amplifying section 10, so that even in the case where the input light level to the present optical amplifier is changed for each of the respective bands, a constant level WDM signal light can be output. As a result, stabilized amplifying-and- repeating transmission of the WDM signal light becomes possible.

Next is a description of a fifth embodiment of the present invention.

With the fifth embodiment, the case is considered for where the ratio between the L band optical signal level and the C band optical signal level can be controlled.

Figure 8:
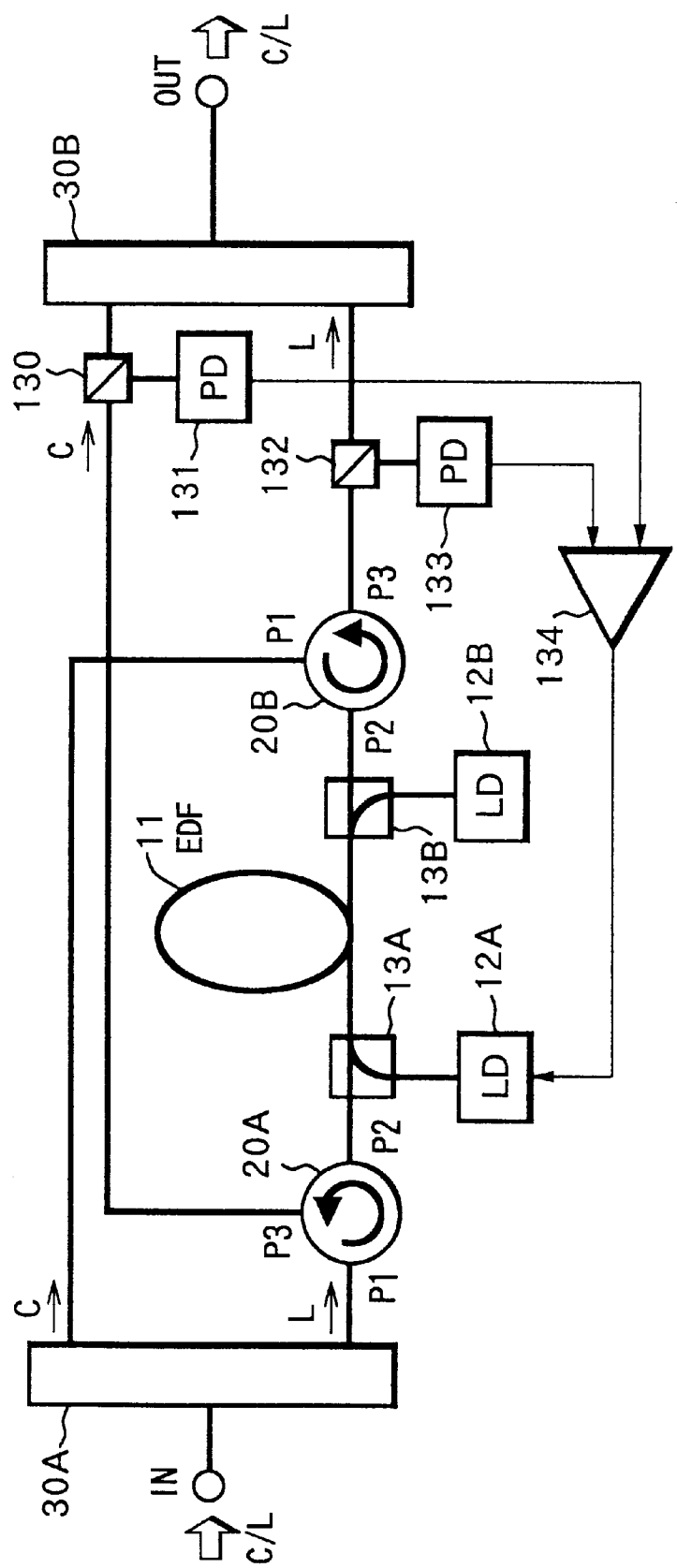
FIG. 8 is a block diagram showing the configuration of a fifth embodiment of the present invention.

FIG. 8 is a block diagram showing the configuration of the optical amplifier according to the fifth embodiment.

In FIG. 8, with this optical amplifier, for example in the configuration of the aforementioned first embodiment, photocouplers 130 and 132, and photodetectors 131 and 133 are provided respectively corresponding to the C/L band optical signals, and a C/L ratio control section 134 is provided for controlling the operation of the optical fiber amplifying section 10 based on the output signals from the respective photodetectors 131 and 133.

The photocoupler 130 corresponding to the C band is provided between the port P3 of the optical circulator 20A and the C band input port of the multiplexer 30B, and branches part of the WDM signal light output from the port P3 of the optical circulator 20A and outputs the branched light to the photodetector 131. The photodetector 131 converts the light branched by the photocoupler 130, into electrical signals to output to the C/L ratio control section 134.

The photocoupler 132 corresponding to the L band is provided between the port P3 of the optical circulator 20B and the L band input port of the multiplexer 30B, and branches part of the WDM signal light output from the port P3 of the optical circulator 20B and outputs the branched light to the photodetector 133. The photodetector 133 converts the light branched by the photocoupler 132, into electrical signals to output to the C/L ratio control section 134.

The C/L ratio control section 134 compares the signal photo-electrically converted by the photodetector 131, with the signal photo-electrically converted by the photodetector 133, and outputs a control signal for controlling the amplification operation of the optical fiber amplifying section 10 so that the optical signal power of the C band, and the optical signal power of the L band become a previously set ratio. More specifically, for example in the case of a situation where a 32 channel optical signal is used for the C band and a 16 channel optical signal is used for the L band (the optical power of the respective channels being the same), a control signal is produced for controlling the amplification operation of the optical fiber amplifying section 10 so that the ratio of the optical signal power of the C band to the optical signal power of the L band becomes constant at 2:1. In the optical fiber amplifying section 10 which has received the control signal from the C/L ratio control section 134, the injection current or the like of for example the excitation light source 12A is adjusted in accordance with the control signal.

With the fifth embodiment as described above, in addition to the operational effect for the case of the first embodiment, by enabling control of the balance of the optical powers of the C band and the L band, optical amplification of the respective bands can be more stably performed, and further, it is possible to flexibly cope with for example in changing the channel being used in the respective bands.

Figure 9:
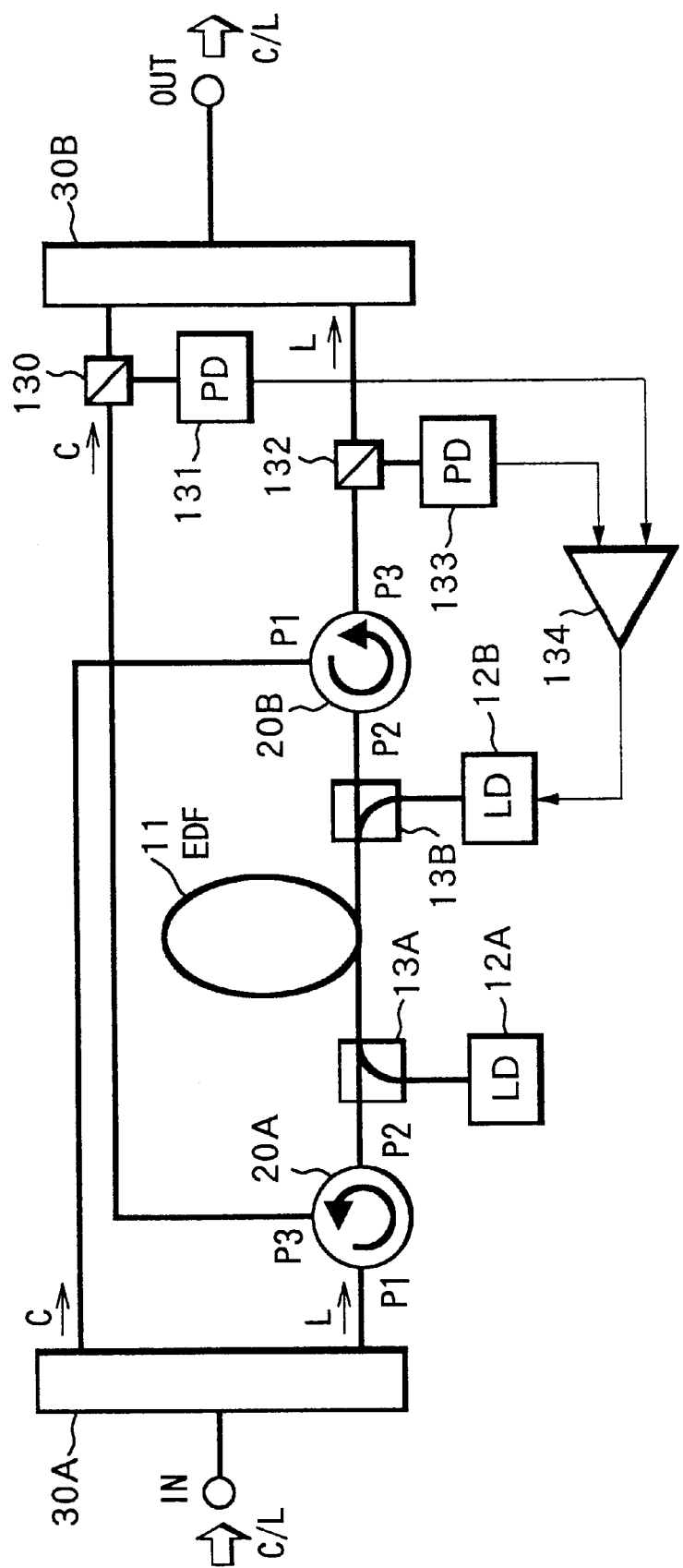
FIG. 9 is a block diagram showing another configuration example related to the fifth embodiment.

With the aforementioned fifth embodiment, the drive condition of the excitation light source 12A is controlled in accordance with a control signal from the C/L ratio control section 134, however as shown in FIG. 9, the drive condition of the excitation light source 12B may be controlled to realize balance control of the C/L bands. Furthermore, while not shown in the figure, it is possible to respectively control the respective drive conditions of the excitation light sources 12A and 12B in accordance with a control signal from the C/L ratio control section 134.

Next is a description of a sixth embodiment of the present invention.

With the sixth embodiment, the case is considered for where automatic gain control (AGC) for controlling a gain of the optical amplifier to be constant, is performed.

Figure 10:
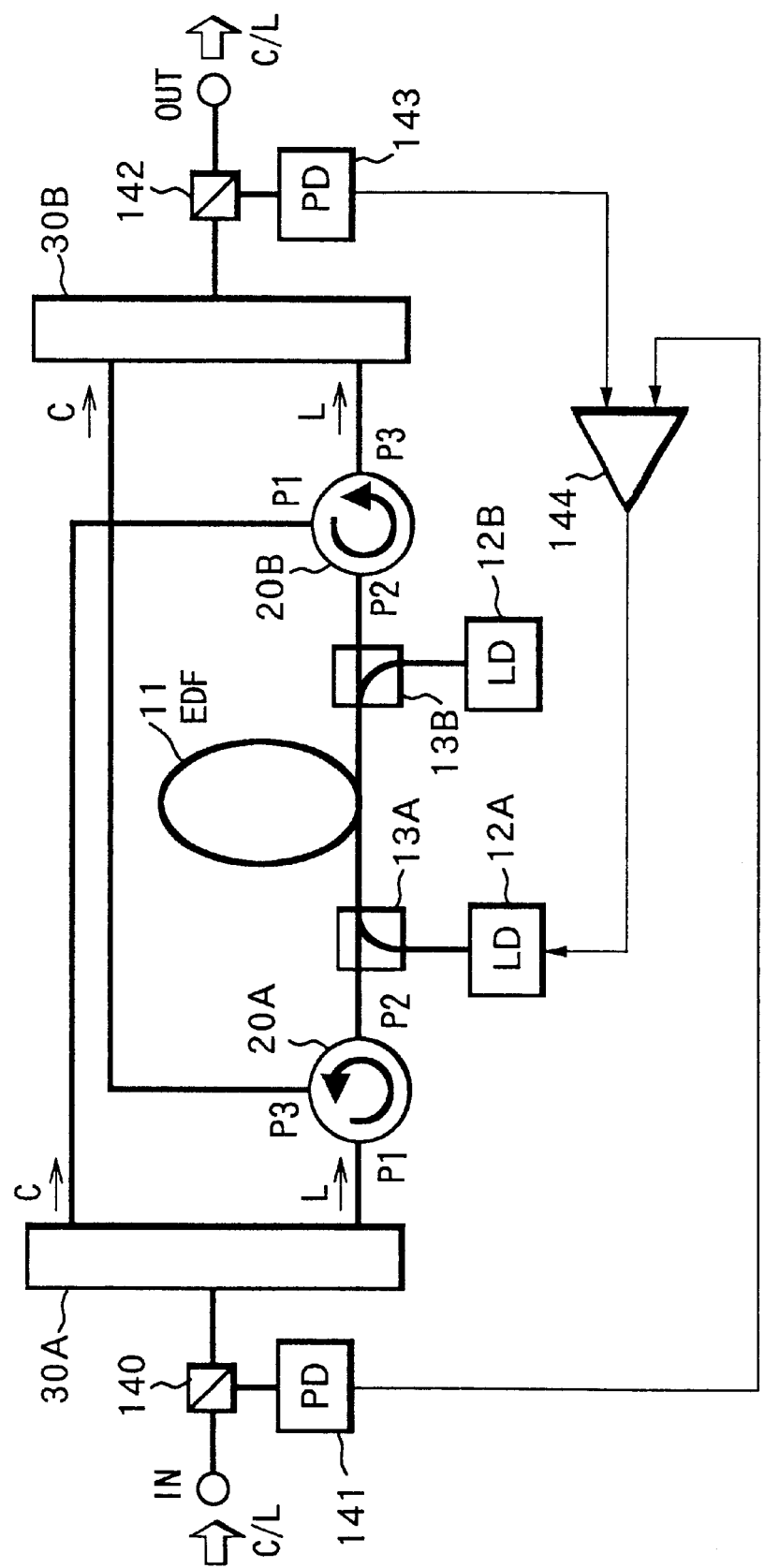
FIG. 10 is a block diagram showing the configuration of a sixth embodiment of the present invention.

FIG. 10 is a block diagram showing the configuration of the optical amplifier according to the sixth embodiment.

In FIG. 10, with this optical amplifier, for example in the configuration of the aforementioned first embodiment, photocouplers 140 and 142, a photodetector 141, and an AGC circuit 144 are added.

The photocoupler 140 is provided between the input terminal IN and the demultiplexer 30A, and branches part of the WDM signal light input via the input terminal IN, and outputs branched light to the photodetector 141. The photodetector 141 converts the light branched by the photocoupler 140, into electrical signals to output to the AGC circuit 144. Moreover, the photocoupler 142 is provided between the multiplexer 30B and the output terminal OUT, and branches part of the WDM signal light output from the multiplexer 30B, and outputs the branched light to the photodetector 143. The photodetector 143 converts the light branched by the photocoupler 142, into electrical signals to output to the AGC circuit 144.

The AGC circuit 144 uses the respective signals photo-electrically converted by the photodetectors 141 and 143, to compute a gain in the optical fiber amplifying section 10, and outputs a control signal to the optical fiber amplifying section 10 for controlling the amplification operation so that the gain becomes constant. In the optical fiber amplifying section 10 which has received the control signal from the AGC circuit 144, the injection current or the like of for example the excitation light source 12A is adjusted in accordance with the control signal.

Figure 11:
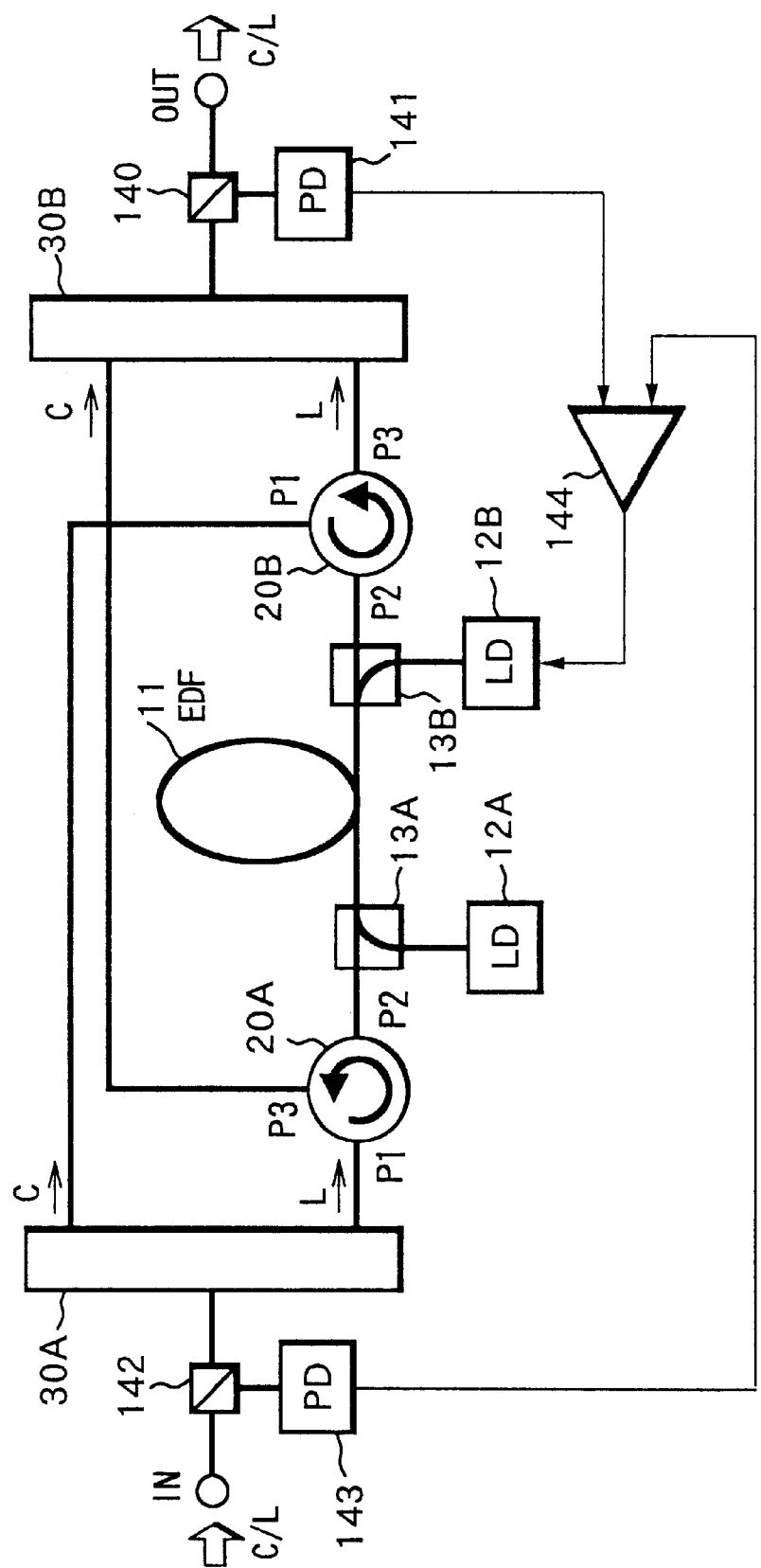
FIG. 11 is a block diagram showing another configuration example related to the sixth embodiment.

Here, the drive condition of the excitation light source 12A is controlled in accordance with a control signal from the AGC circuit 144, however as shown in FIG. 11, the drive condition of the excitation light source 12B may be controlled to realize the AGC of the optical fiber amplifying section 10. Furthermore, while not shown in the figure, it is possible to respectively control the respective drive conditions of the excitation light sources 12A and 12B in accordance with a control signal from the AGC circuit 144.

With the sixth embodiment as described above, in addition to the operational effect for the case of the first embodiment, by AGC operating the optical fiber amplifying section 10, then even in the case where the input light level to the present optical amplifier is changed, fluctuations in the gain wavelength characteristics can be suppressed, thus enabling stabilized optical amplification to be performed.

Figure 12:
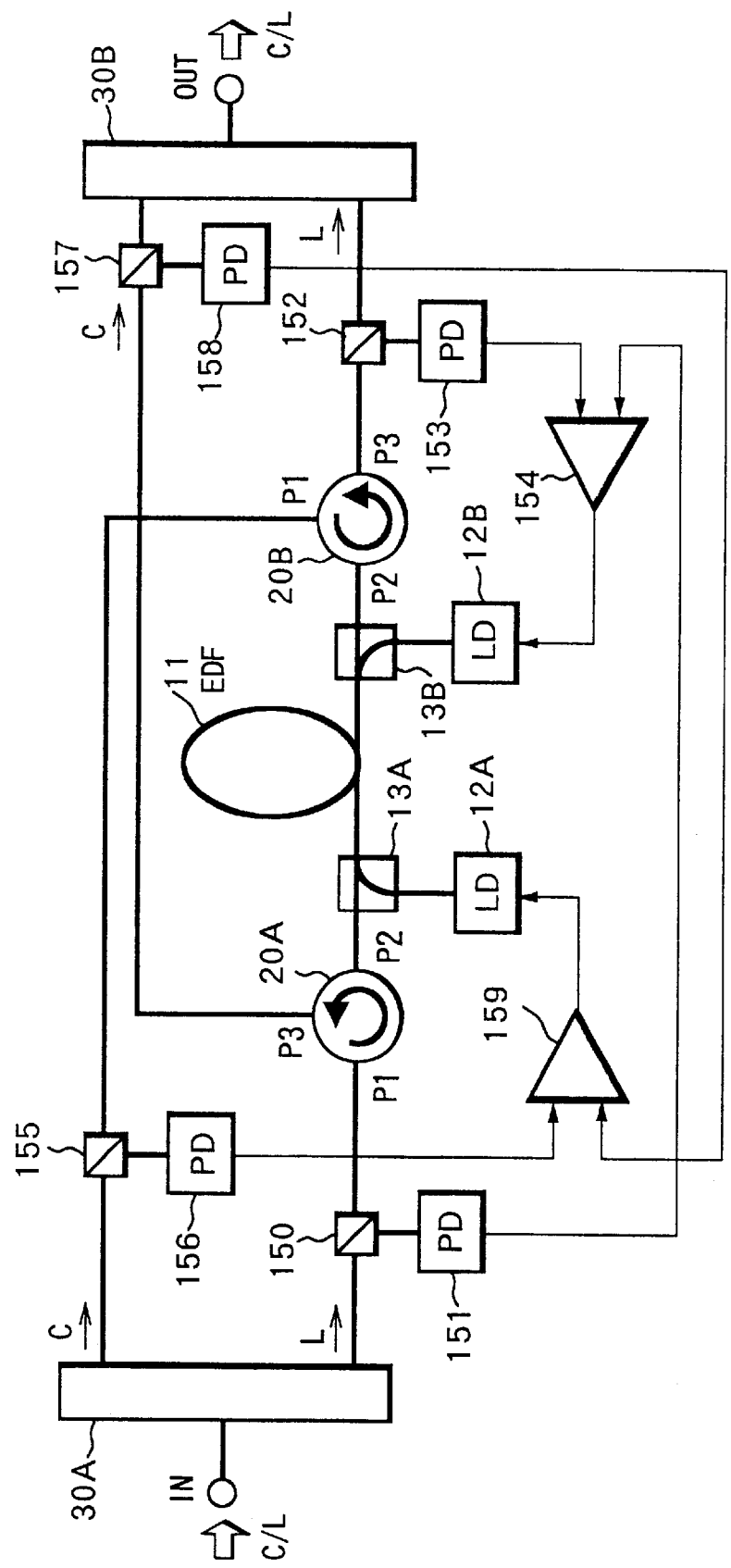
FIG. 12 is a block diagram further showing a separate configuration example related to the sixth embodiment.

With the aforementioned sixth embodiment, AGC is performed by monitoring collectively the input and output levels for the L band and the C band. However AGC may be performed by monitoring individually the input and output levels for the respective bands. More specifically, for example as shown in FIG. 12, for the L band, a photocoupler 150 and a photodetector 151 for monitoring the input optical signal are provided between the demultiplexer 30A and the port P1 of the optical circulator 20A, and a photocoupler 152 and a photodetector 153 for monitoring the output optical signal are provided between the port P3 of the optical circulator 20B and the L band input port of the multiplexer 30B, and an AGC circuit 154 which uses the output signals from the respective photodetectors 151 and 153, and controls for example the drive condition of the excitation light source 12B to realize AGC for the L band is provided. Furthermore, for the C band, a photocoupler 155 and a photodetector 156 for monitoring the input optical signal are provided between the demultiplexer 30A and the port P1 of the optical circulator 20B, and a photocoupler 157 and a photodetector 158 for monitoring the output optical signal are provided between the port P3 of the optical circulator 20A and the C band input port of the multiplexer 30B, and an AGC circuit 159 which uses the output signals from the respective photodetectors 156 and 158, and controls for example the drive condition of the excitation light source 12A to realize AGC for the C band is provided.

Next is a description of a seventh embodiment of the present invention.

With the seventh embodiment, the case is considered for where the optical amplifier incorporates a processing function for supervisory control signals, to cope with a WDM optical repeating transmission system which transmits supervisory control signals from an optical transmitting station or the like to a repeater station.

Figure 13:
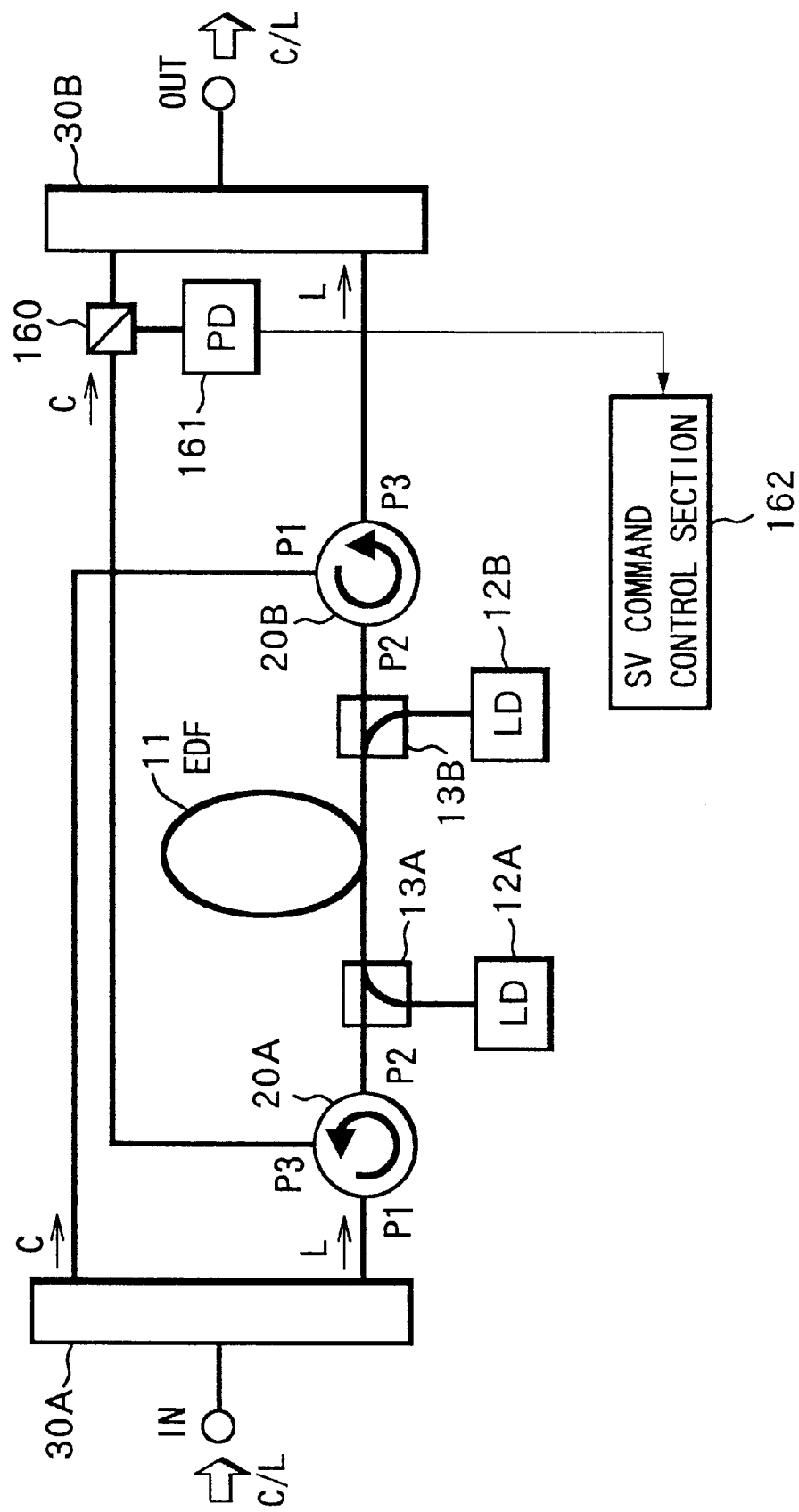
FIG. 13 is a block diagram showing a configuration incorporating a receiving function for supervisory control signals for a seventh embodiment of the present invention.

FIG. 13 is a block diagram showing a configuration example of an optical amplifier equipped with a receiving function for supervisory control signals.

The optical amplifier shown in FIG. 13 is one where supervisory signals (SV command signals) which have been sent from an optical transmitting station to a repeater station, are subjected to receive processing thereinside. More specifically, for example in the aforementioned first embodiment, a photocoupler 160, a photodetector 161 and an SV command control section 162 are added.

The photocoupler 160 is provided for example between the port P3 of the optical circulator 20A and the C band input port of the multiplexer 30B, and branches part of the C band optical signal amplified by the optical fiber amplifying section 10 and sends the branched light to the photodetector 161. The photodetector 161 converts the signal light branched by the photocoupler 160, into an electrical signal to send to the SV command control section 162. The SV command control section 162 detects the supervisory signals from the signals from the photodetector 161, and identifies information related to the transmission conditions of the WDM signal light (for example the channel number being used, or the number of channels etc.), based on the supervisory signals to transmit to the respective sections inside the optical amplifier.

Figure 14:
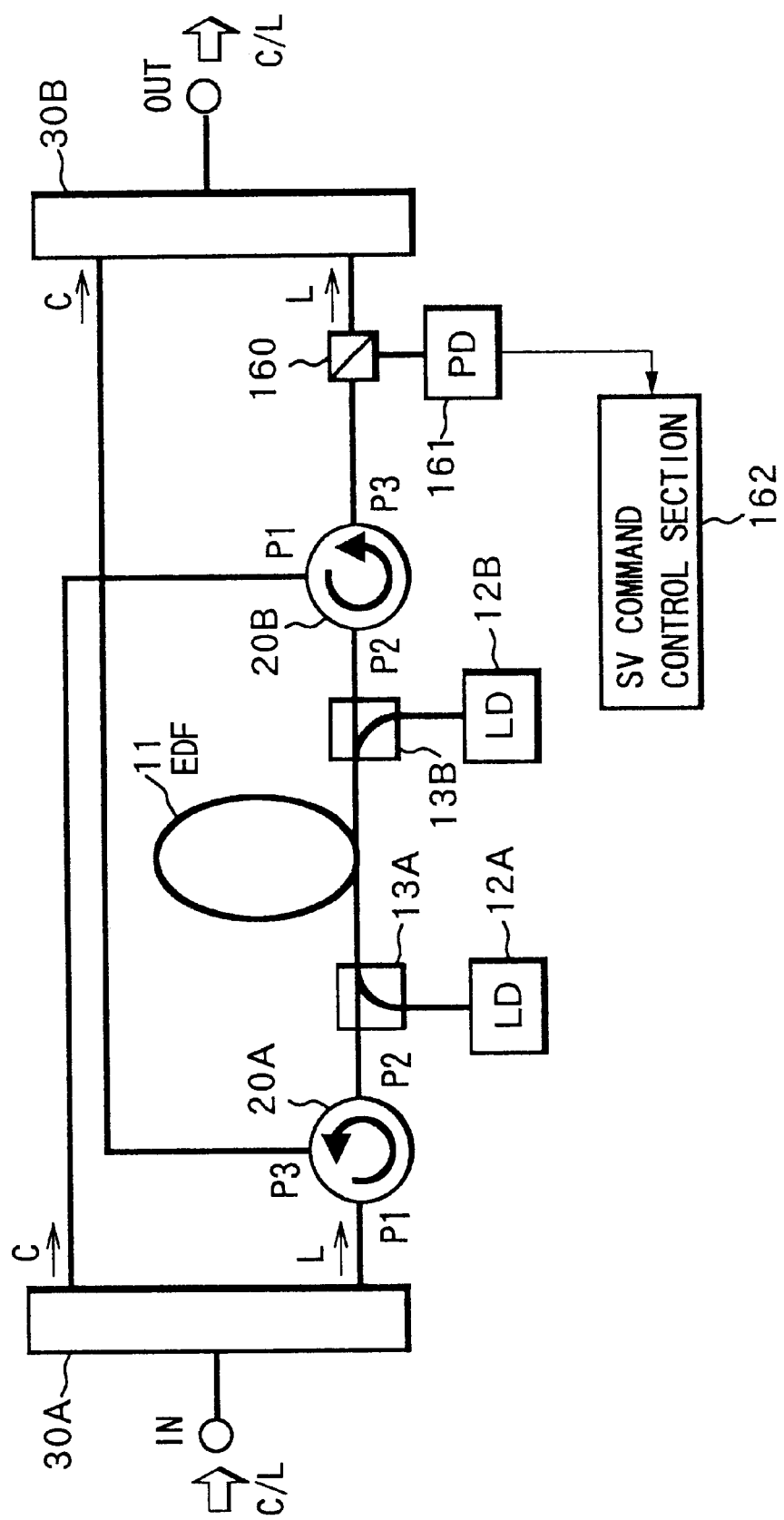
FIG. 14 is a block diagram showing another configuration example related to FIG. 13.

Here, the case is shown for where the SV command signal superimposed on the C band optical signal is subjected to receive processing. However, for example as shown in FIG. 14, the photocoupler 160 may be provided between the port P3 of the optical circulator 20B and the L band input port of the multiplexer 30B, so that the SV command signal which is superimposed on the L band optical signal and transmitted to be subjected to receive processing.

Figure 15:
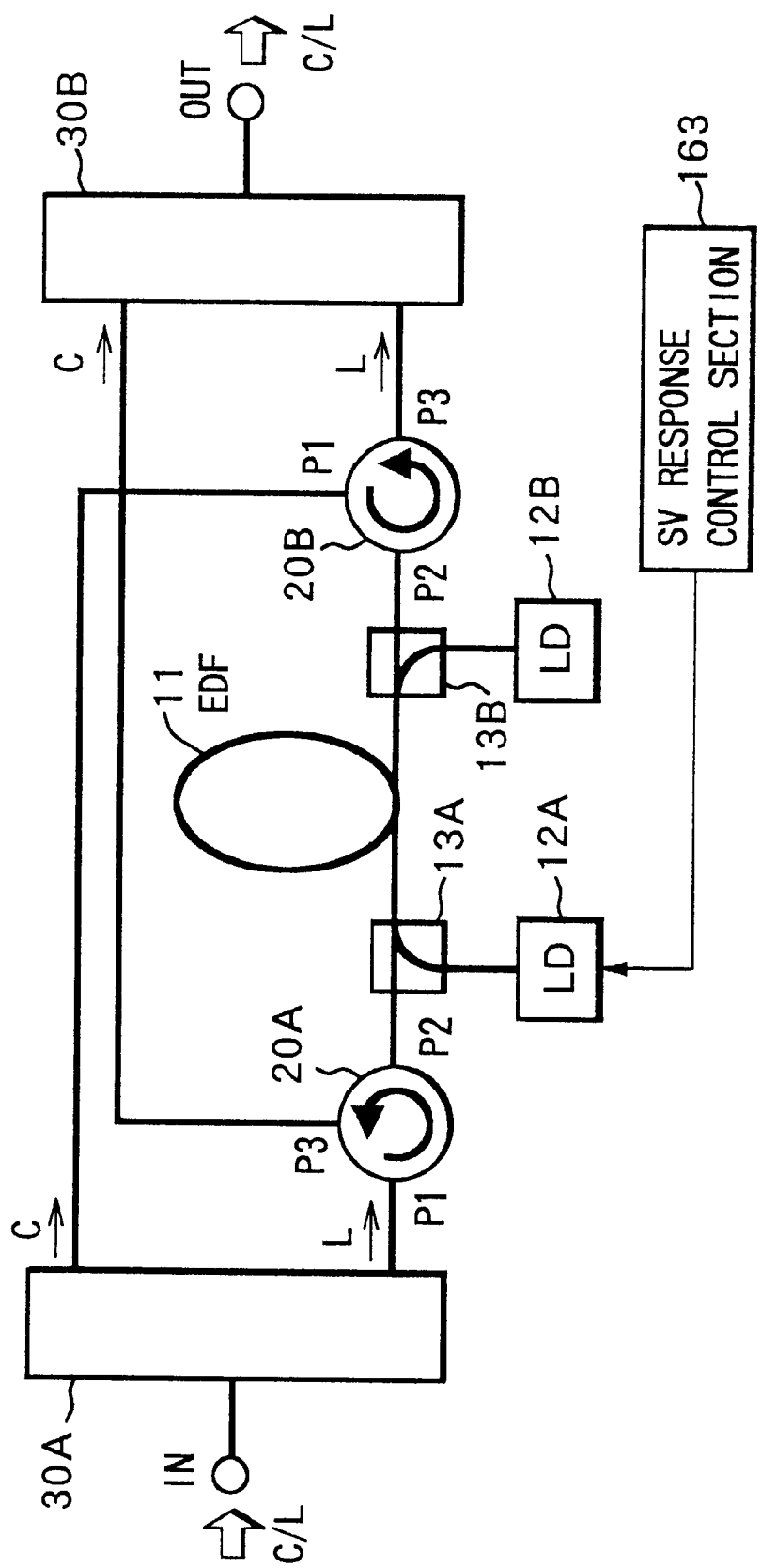
FIG. 15 is a block diagram showing a configuration incorporating a sending function for supervisory control signals for the seventh embodiment of the present invention.

FIG. 15 is a block diagram showing a configuration example of an optical amplifier equipped with a sending function for supervisory control signals.

The optical amplifier shown in FIG. 15is one where response signals (SV response signals) which have been sent from a repeater station to an optical receiving station side, are subjected to send processing thereinside. More specifically, an SV response control section 163 is added to for example the aforementioned first embodiment,.

The SV response control section 163 produces a modulation signal in response to the response signal showing for example the operating conditions of the local station, and for example the excitation light source 12A is modulated in accordance with this modulation signal to thereby superimpose the response signal on the WDM signal light.

Figure 16:
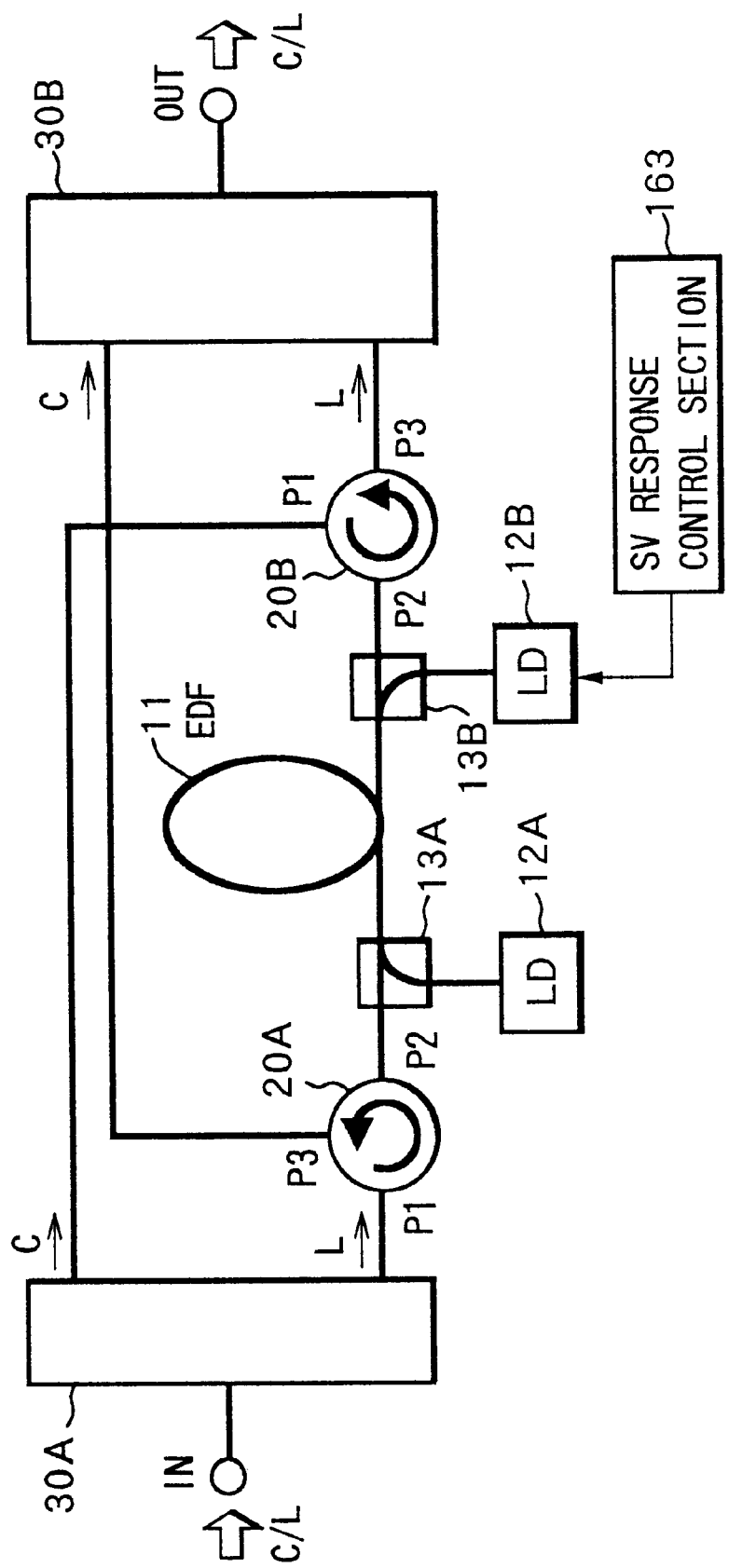
FIG. 16 is a block diagram showing another configuration example related to FIG. 15.

Here, the case for where the excitation light source 12A is modulation operated is shown, however, for example as shown in FIG. 16, the excitation light source 12B may be modulated in accordance with a modulation signal produced by the SV response control section 163. Moreover, while not shown in the figure, both of the excitation light sources 12A and 12B may be respectively modulation operated. Furthermore, here the configuration is shown for where the optical amplifier has the receiving function or the sending function of the supervisory control signal separately. However, the sending and receiving functions for the supervisory control signals may be provided inside a single optical amplifier.

In this way, with the seventh embodiment, by providing the function where the optical amplifier processes the supervisory control signals, optical amplification according to the transmission conditions of the WDM signal light can be performed.

Next is a description of an eighth embodiment of the present invention.

With the eighth embodiment, the description is given for an optical amplifier which copes with an ascending line and a descending line.

Figure 17:
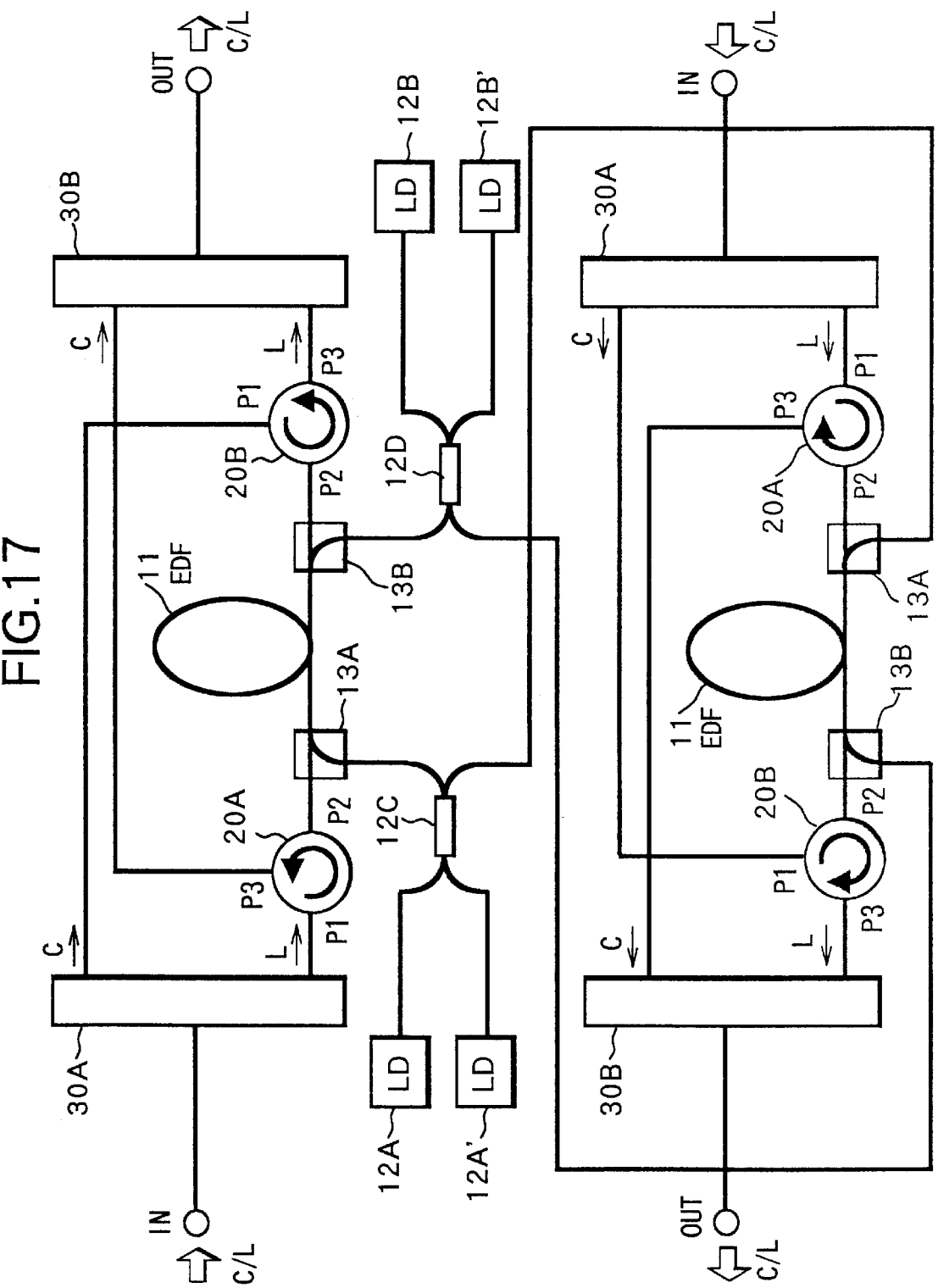
FIG. 17 is a block diagram showing the configuration of an eighth embodiment of the present invention.

FIG. 17 is a block diagram showing the configuration of an optical amplifier according to the eighth embodiment. Here, the configuration of the descending line corresponding to that of the ascending line is denoted by the same reference symbols.

In FIG. 17, with this optical amplifier, for example, two of the configuration of the aforementioned first embodiment are combined with each other, and respectively correspond to the ascending line and the descending line, while the excitation light source is shared with the ascending and descending lines to realize a redundant configuration.

With the redundant configuration of the excitation light sources, the light source for excitation light supplied to the EDF 11 via the WDM coupler 13A on the optical circulator 20A side is shared with the ascending and descending lines, and the light source for excitation light supplied to the EDF 11 via the WDM coupler 13B on the optical circulator 20B side is shared with the ascending and descending lines.

More specifically, for the optical circulator 20A side, excitation light of the same wavelength respectively produced by the two excitation light sources 12A and 12A', is once multiplexed by the photocoupler 12C, and then branched into two, and each of the branched lights is respectively sent to the WDM couplers 13A and 13A of the ascending line and the descending line. Also for the optical circulator 20B side, excitation light of the same wavelength respectively produced by the two excitation light sources 12B and 12B', is once multiplexed by the photocoupler 12D, and then branched into two, and each of the branched lights is respectively sent to the WDM couplers 13B and 13B of the ascending line and the descending line.

In this way, with the eighth embodiment, optical amplification for the C band and the L band can be realized with a comparatively small number of excitation light sources, namely only four, for the ascending and descending lines. Moreover, by having the excitation light sources with a redundant configuration, it is possible to achieve an improvement in the reliability of the optical amplifier.

With the aforementioned second through eighth embodiments, the description has been for where various functions are respectively added to the basic configuration of the first embodiment. However, it is also possible to optionally combine the configurations of the respective embodiments to make up a single optical amplifier.

Next is a description of a ninth embodiment of the present invention.

In the aforementioned first through eighth embodiments, the respective optical signals of the L band and the C band are collectively amplified by the optical fiber amplifying section 10. However, there is also the case where it is difficult to amplify optical signals of both bands to a substantially uniform level with a single optical fiber amplifying section 10. More specifically, compared to the optical signal of the C band, optical amplification with respect to the optical signal of the L band is insufficient. Therefore, with the ninth embodiment, an application example is considered for where even in the aforementioned case, the optical signals of each band can be amplified to a substantially uniform level.

Figure 18:
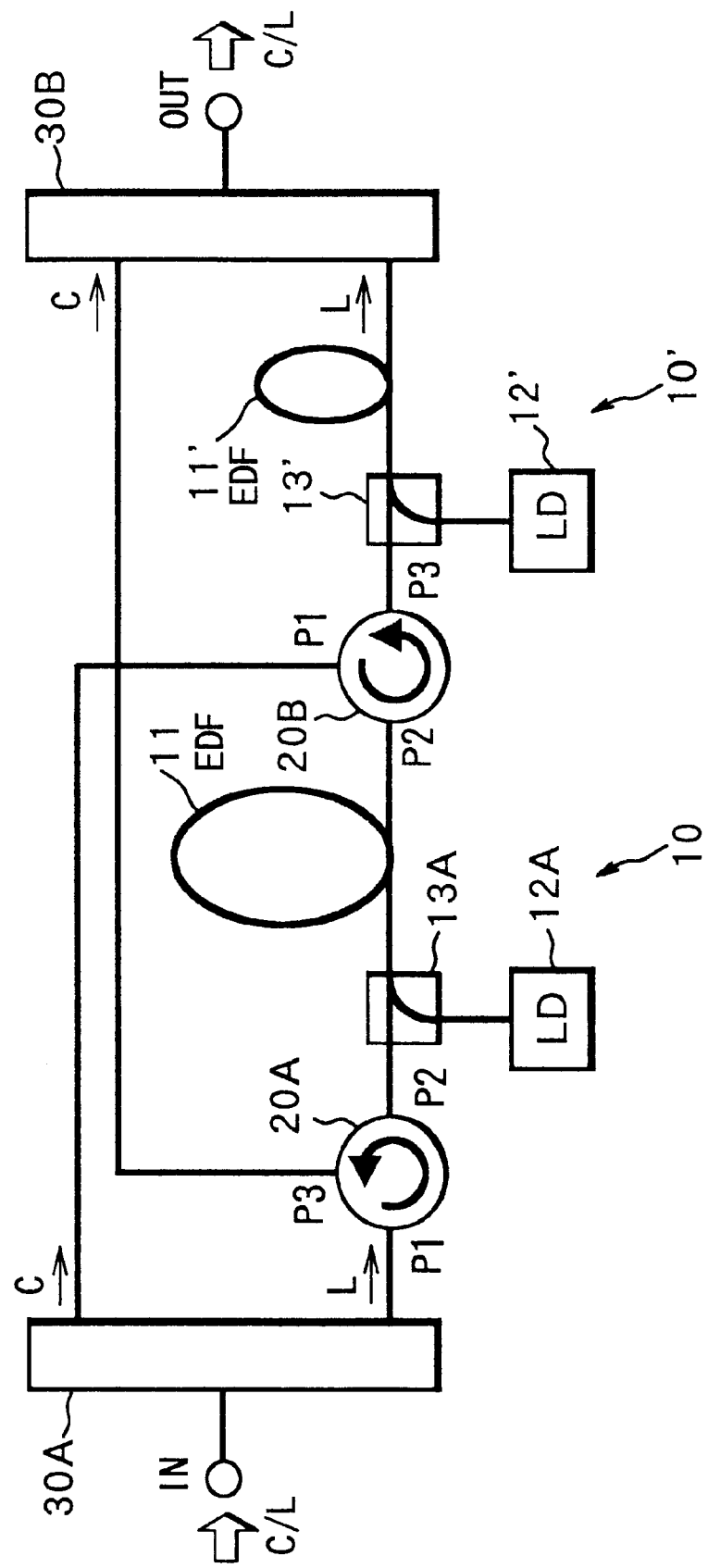
FIG. 18 is a block diagram showing the configuration of a ninth embodiment of the present invention.

FIG. 18 is a block diagram showing the configuration of an optical amplifier according to the ninth embodiment.

In FIG. 18, this optical amplifier is one where an optical fiber amplifying section 10' serving as an auxiliary optical amplifying means 1', is provided in the configuration of for example the first embodiment. This optical fiber amplifying section 10' performs supplementary amplification only for the L band optical signal. Here, this is arranged between the port P3 of the optical circulator 20B and the L band input port of the multiplexer 30B. More specifically, this has for example an erbium doped optical fiber (EDF) 11', an excitation light source (LD) 12' and a WDM coupler 13'.

With the EDF 11', the length and the like thereof is optimized so as to have an amplifying band in the L band. The excitation light source 12' is a standard light source for producing excitation light of a wavelength band which can excite the erbium inside the EDF 11' (for example the 980 nm band or the 1480 nm band). The WDM coupler 13' is a photocoupler for supplying excitation light produced by the excitation light source 12' to the EDF 11'.

Here, a forward excitation type configuration for supplying excitation light from the input side of the L band optical signal (the optical circulator 20B side) to the EDF 11' is given. However, this may be a backward excitation type or a bi-directional excitation type. Moreover, for the optical fiber amplifying section 10 for collectively amplifying the respective optical signals of the L band and the C band, here the configuration is such that excitation light is supplied to the EDF 11 only from the optical circulator 20A side. However, as with the case of the aforementioned first embodiment, excitation light may also be supplied from the optical circulator 20B side. Furthermore, a configuration is also possible where excitation light is supplied to the EDF 11 only from the optical circulator 20B side.

With the optical amplifier of the above described configuration, as with the case of the first embodiment, the WDM signal light input to the input terminal IN is demultiplexer by the demultiplexer 30A into the L band and the C band, and the L band optical signal is input to the port P1 of the optical circulator 20A and transmitted to the port P2 and then sent to the optical fiber amplifying section 10, while the C band optical signal is input to the port P1 of the optical circulator 20B and transmitted to the port P2 and then sent to the optical fiber amplifying section 10, and the optical signals of the respective bands are propagated in mutually opposite directions inside the EDF 11 to be respectively amplified.

Furthermore, for the L band optical signal, after being amplified by the optical fiber amplifying section 10, this is passed from the port P2 to the port P3 of the optical circulator 20B, and then sent to the optical fiber amplifying section 10'. In the optical fiber amplifying section 10', the signal light from the port P3 of the optical circulator 20B is sent to the EDF 11' via the WDM coupler 13'. With the EDF 11', excitation light produced by the excitation light source 12' is supplied via the WDM coupler 13', and the L band optical signal is propagated inside the EDF 11' which has attained the excited condition, the optical signal is amplified to the required level. The L band optical signal amplified by the optical fiber amplifying section 10' is sent to the L band input port of the multiplexer 30B. With the multiplexer 30B, the C band optical signal amplified by the optical fiber amplifying section 10 to the required level, is passed from the port P2 to the port P3 of the optical circulator 20A, and is input to the C band input port. The respective optical signals of the L band and the C band amplified to the required level, are multiplexed by the multiplexer 30B and then output to the outside via the output terminal OUT.

In this way with the ninth embodiment, in the case where the optical amplification with respect to the optical signal of the L band in the optical fiber amplifying section 10 is insufficient, by providing the optical fiber amplifying section 10' for amplifying the L band optical signal output from the port P3 of the optical circulator 20B, the respective optical signals of the L band and the C band can be amplified to a substantially uniform required level.

Here with the ninth embodiment, the optical fiber amplifying section 10' for the L band is provided in the configuration of the first embodiment. However, A is possible to similarly adopt this for the respective configurations of the aforementioned second through eighth embodiments. Hereunder specific configuration examples are given respectively corresponding to the second through eighth embodiments.

Figure 19:
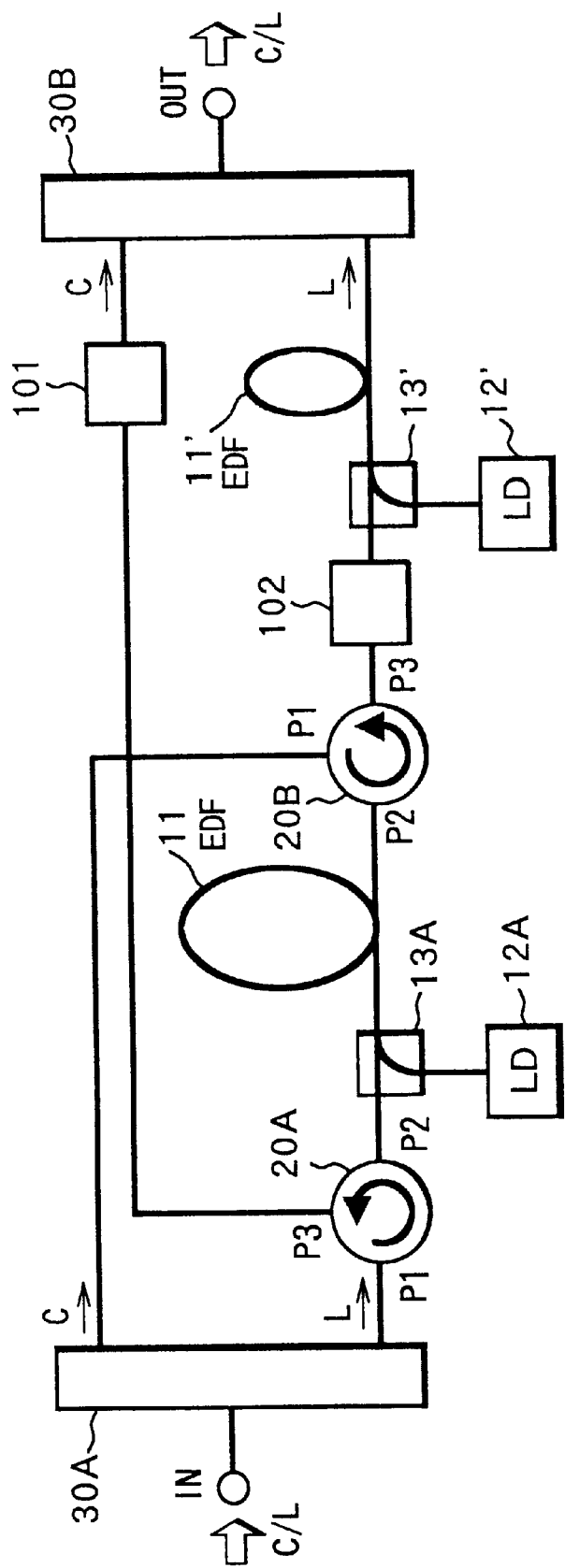
FIG. 19 is a diagram showing an example of where a configuration the same as for the ninth embodiment is applied to the configuration of the second embodiment.
Figure 20:
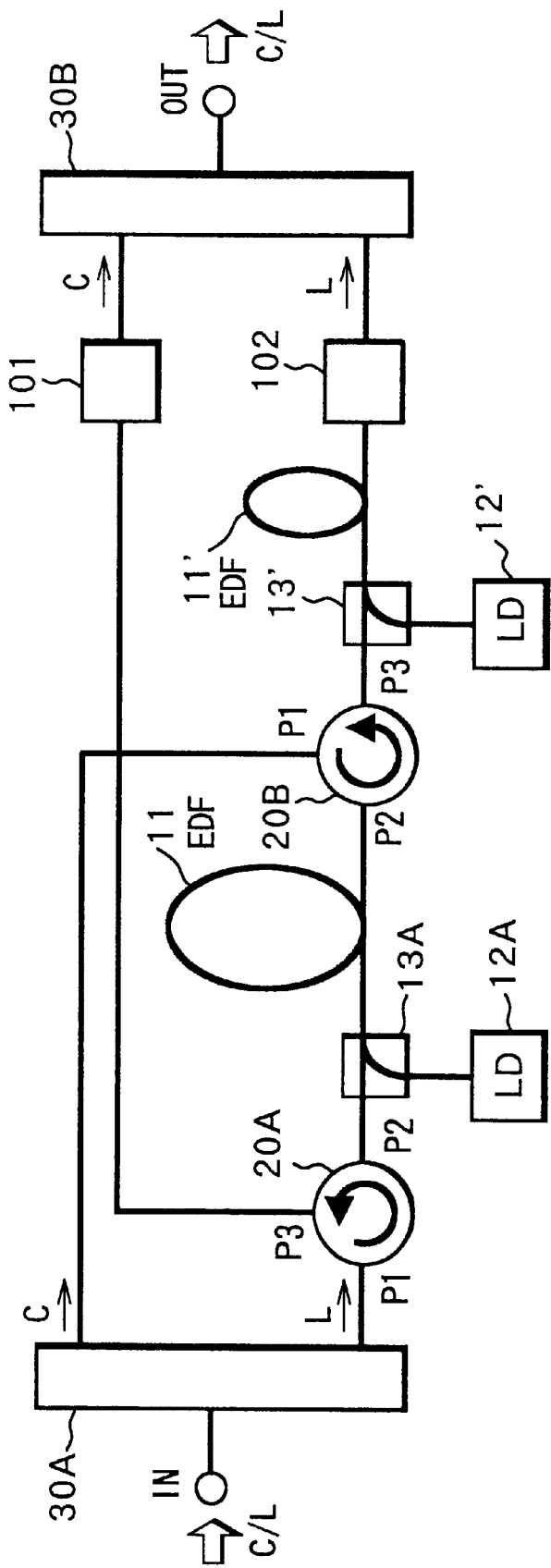
FIG. 20 is a diagram showing another configuration example related to FIG. 19.

FIG. 19 is an example for where a similar configuration to the case of the ninth embodiment is adopted in the configuration of the second embodiment (refer to FIG. 4). With the configuration example of FIG. 19, the optical fiber amplifying section 10' is arranged between an L band compensation optical device 102 and the L band input port of the multiplexer 30B. Besides this, for example as shown in FIG. 20, the optical fiber amplifying section 10' may be provided between the port P3 of the optical circulator 20B and the L band compensation optical device 102.

Figure 21:
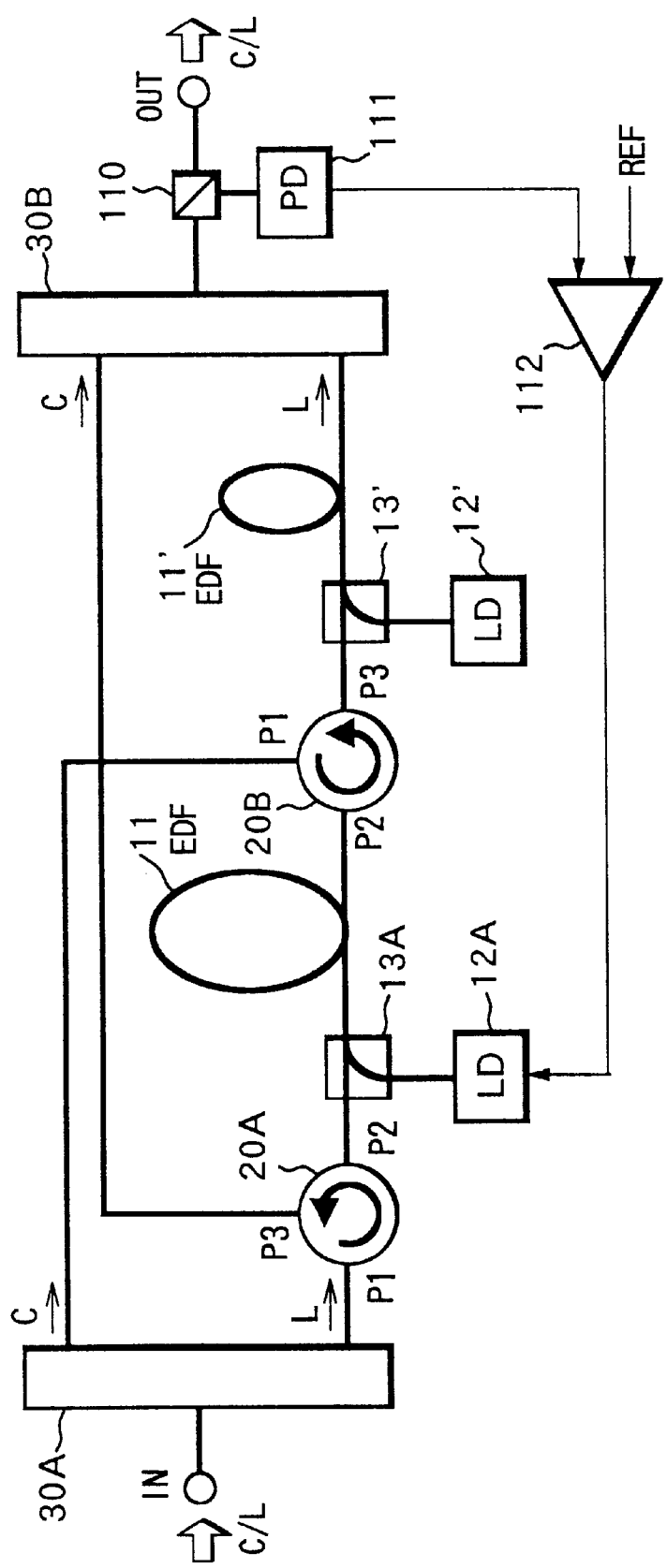
FIG. 21 is a diagram showing an example of where a configuration the same as for the ninth embodiment is applied to the configuration of the third embodiment.

FIG. 21 is an example for where a similar configuration to the case of the ninth embodiment is adopted to the configuration of the third embodiment (refer to FIG. 5). Here, by controlling the drive condition of the excitation light source 12A in accordance with a control signal from the ALC circuit 112, the respective optical signal levels of the L band and the C band are adjusted. While not shown in the figure, it is also possible to control the drive condition of the excitation light source 12' in accordance with a control signal from the ALC circuit 112. However in this case, it is necessary to take care that only the optical signal level of the L band is adjusted.

Figure 22:
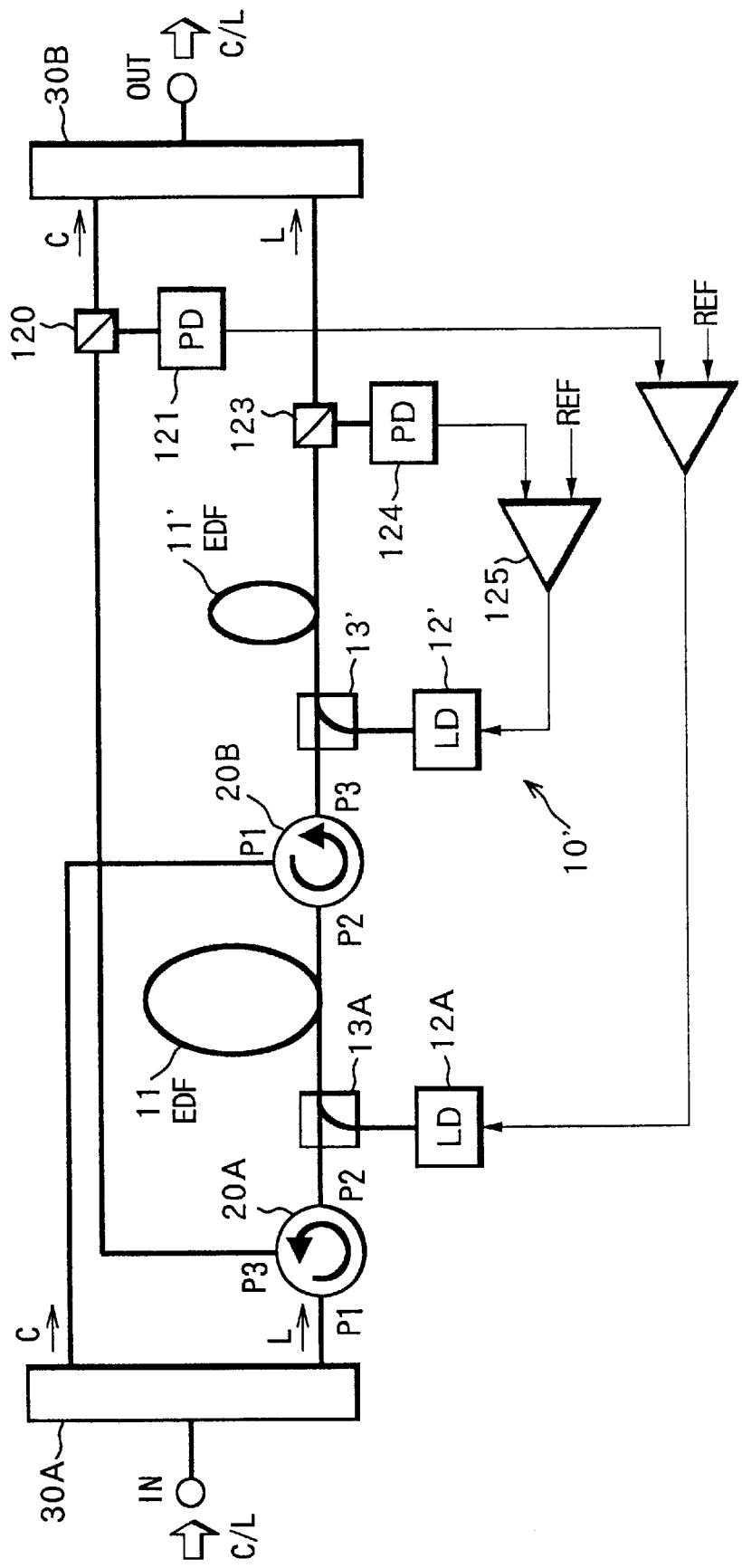
FIG. 22 is a diagram showing an example of where a configuration the same as for the ninth embodiment is applied to the configuration of the fourth embodiment.

FIG. 22 is an example for where a similar configuration to the case of the ninth embodiment is adopted to the configuration of the fourth embodiment (refer to FIG. 7). Here, the optical fiber amplifying section 10' is arranged between the port P3 of the optical circulator 20B and the photocoupler 123, and the drive condition of the excitation light source 12' is controlled in accordance with a control signal from the ALC circuit 125.

Figure 23:
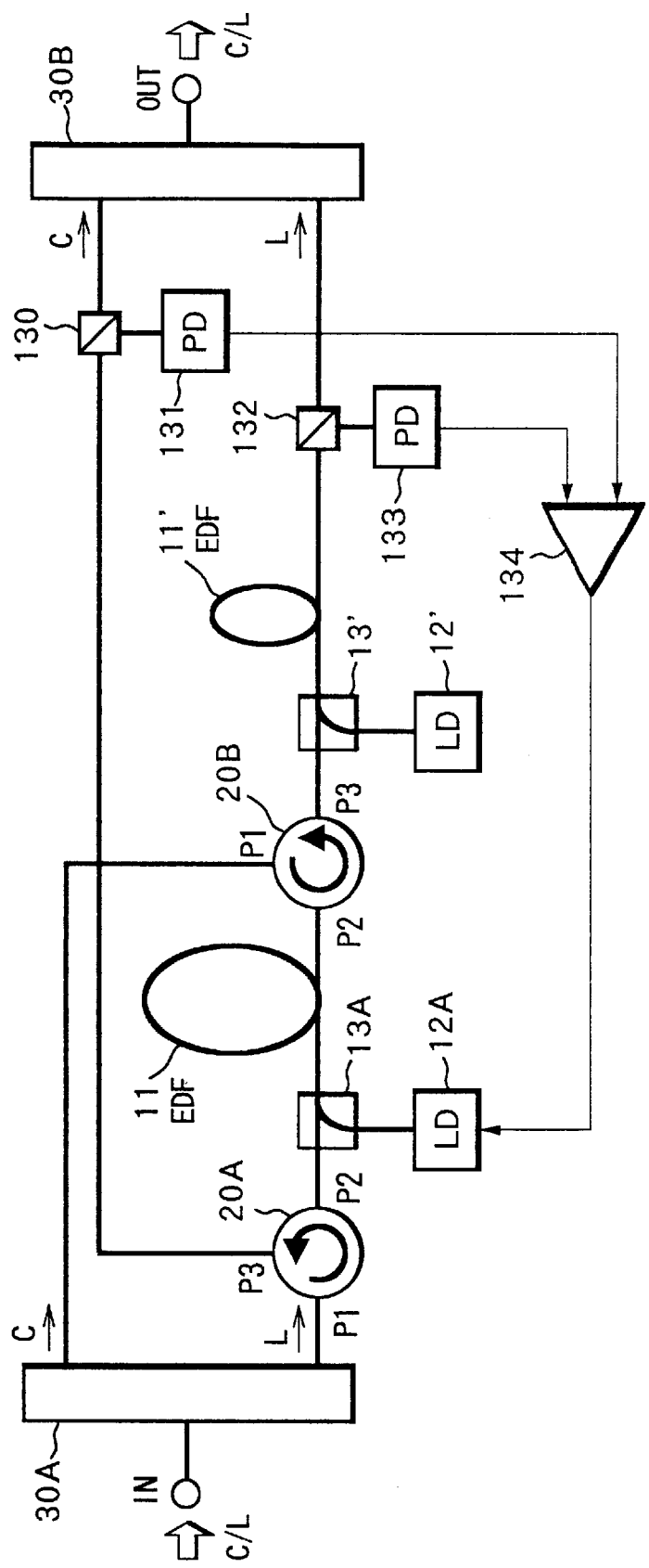
FIG. 23 is a diagram showing an example of where a configuration the same as for the ninth embodiment is applied to the configuration of the fifth embodiment.
Figure 24:
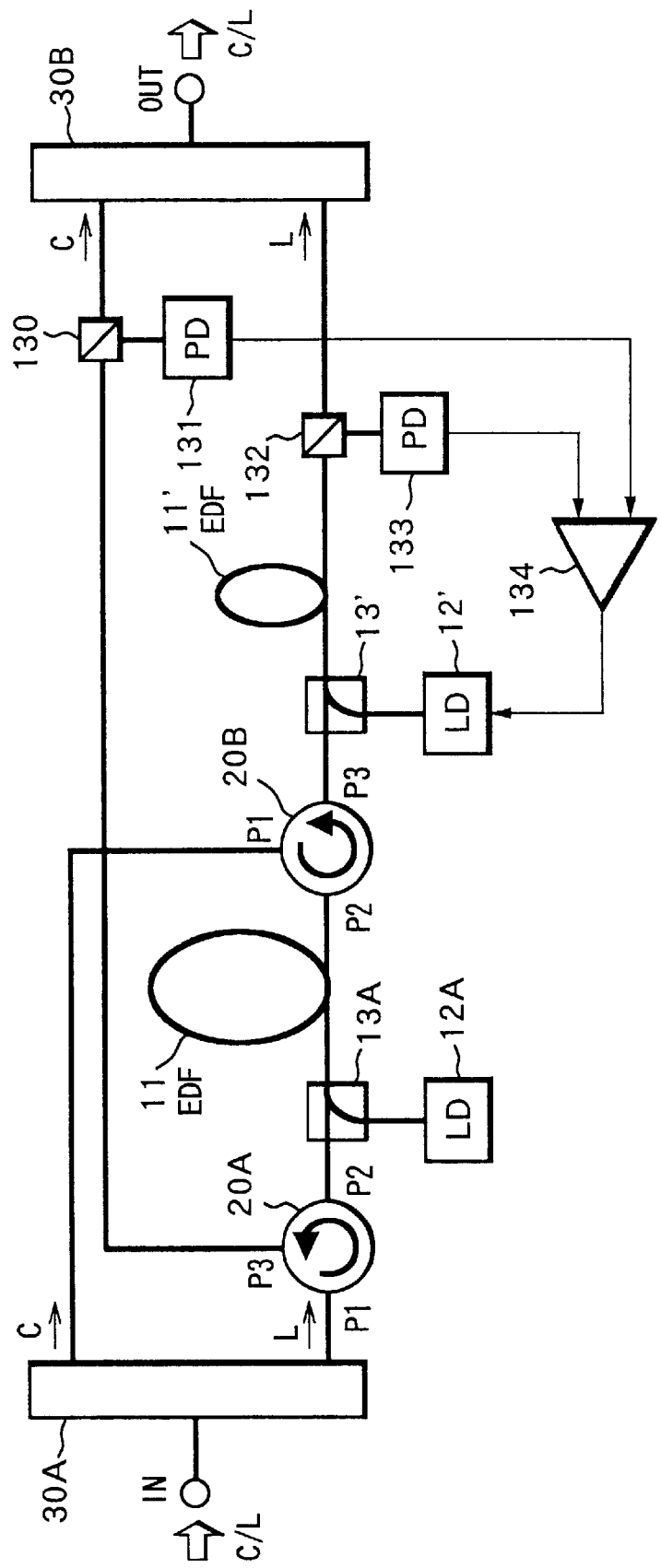
FIG. 24 is a diagram showing another configuration example related to FIG. 23.

FIG. 23 is an example for where a similar configuration to the case of the ninth embodiment is adopted to the configuration of the fifth embodiment (refer to FIG. 8). With the configuration example of FIG. 23, the drive condition of the excitation light source 12A is controlled in accordance with a control signal from the C/L ratio control section 134. Besides this, for example as shown in FIG. 24, the drive condition of the excitation light source 12' may be controlled in accordance with a control signal from the C/L ratio control section 134.

Figure 25:
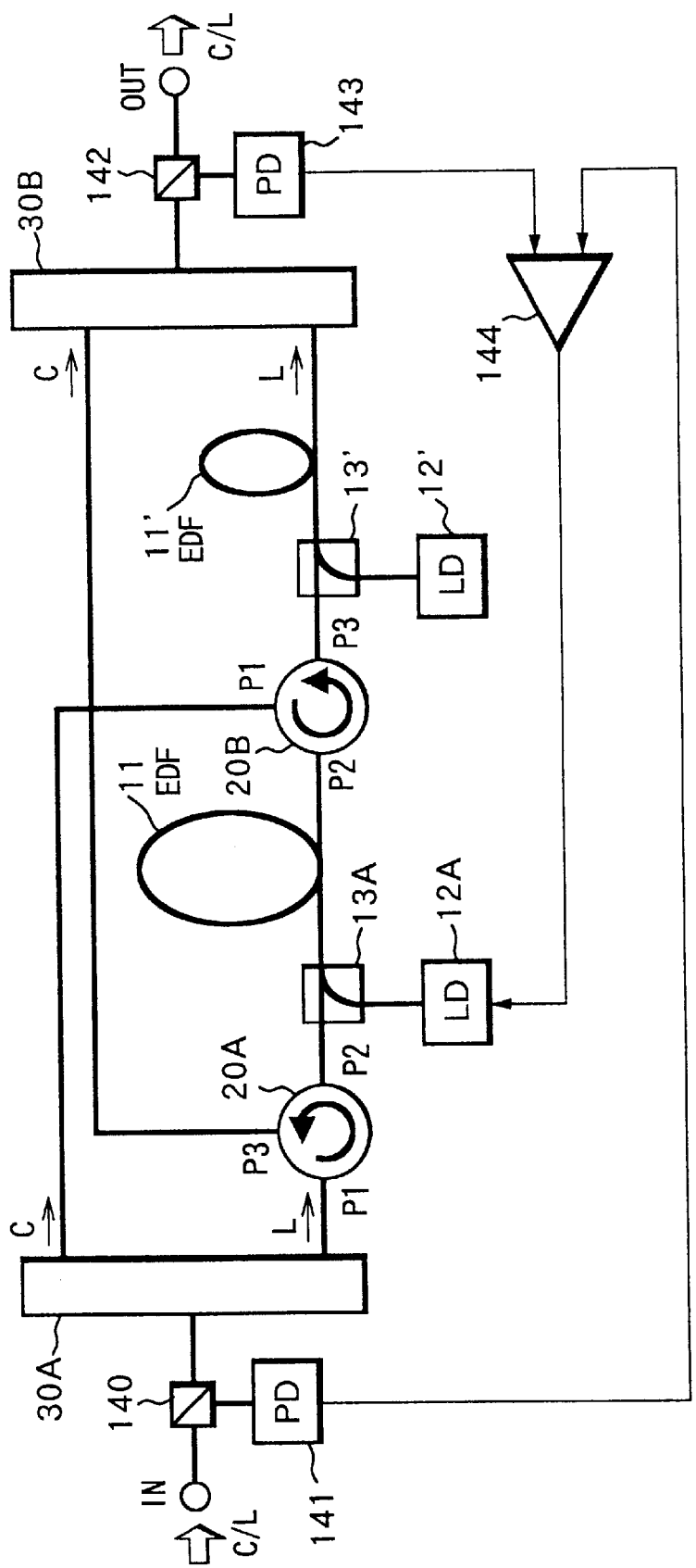
FIG. 25 is a diagram showing an example of where a configuration the same as for the ninth embodiment is applied to the configuration of the sixth embodiment.
Figure 26:
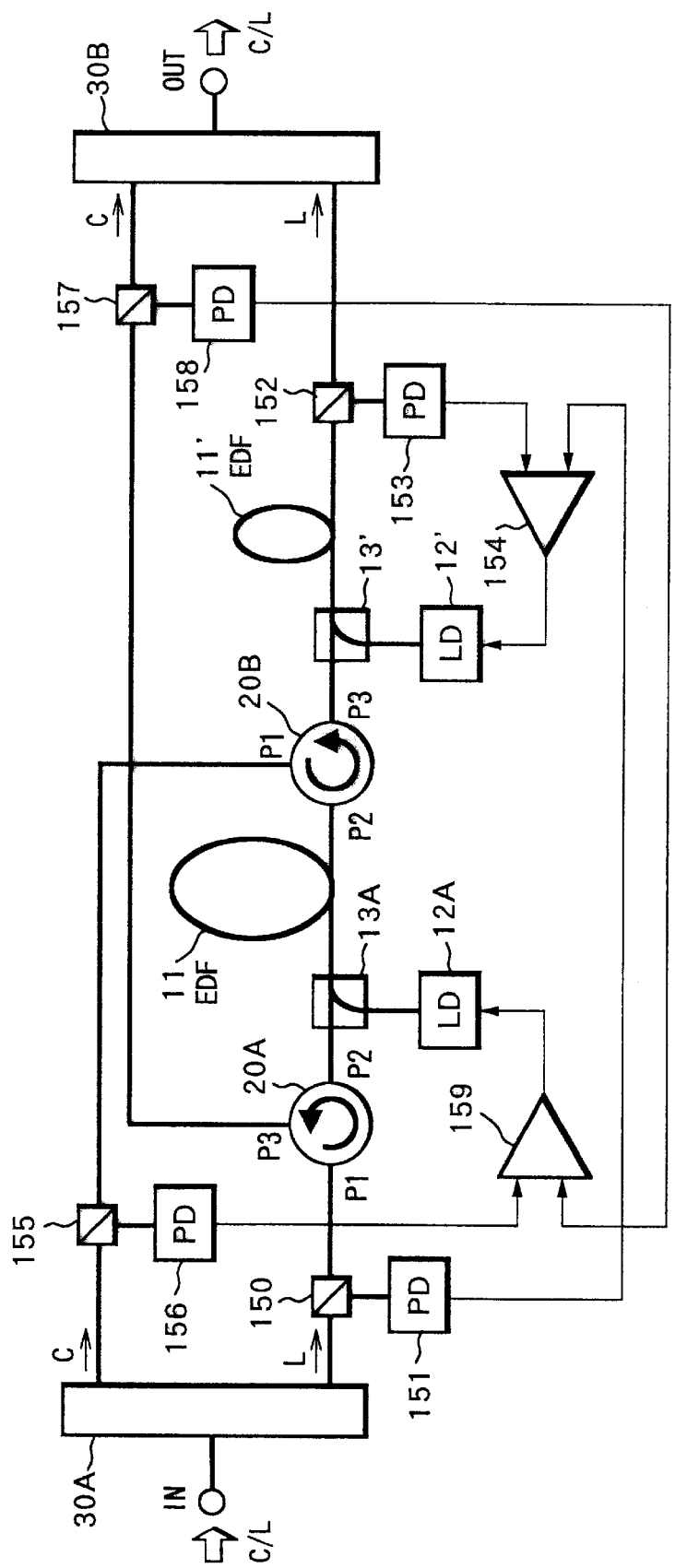
FIG. 26 is a diagram showing another configuration example related to FIG. 25.
Figure 27:
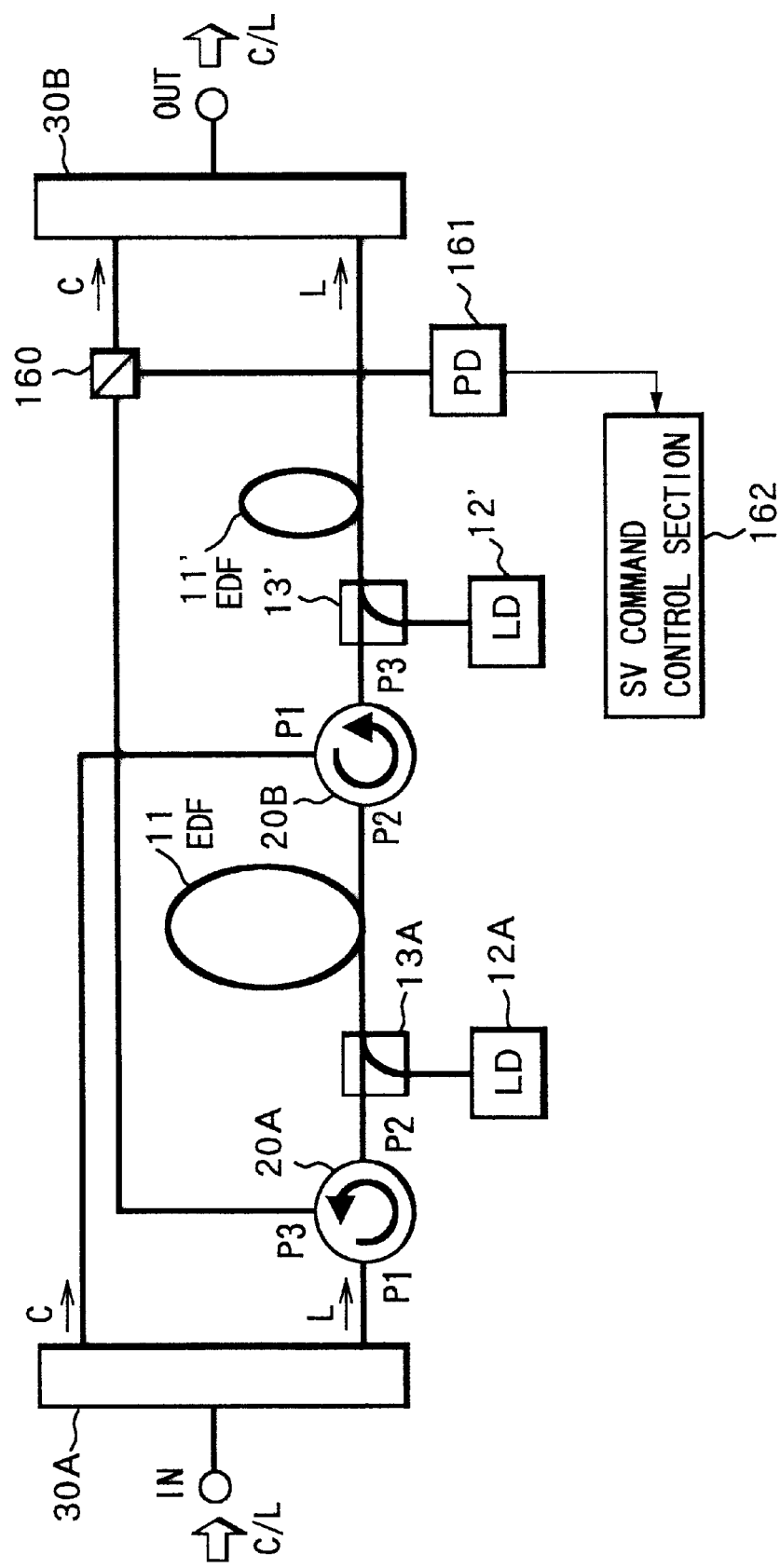
FIG. 27 is a diagram showing an example of where a configuration the same as for the ninth embodiment is applied to the configuration of the seventh embodiment shown in FIG. 13.
Figure 28:
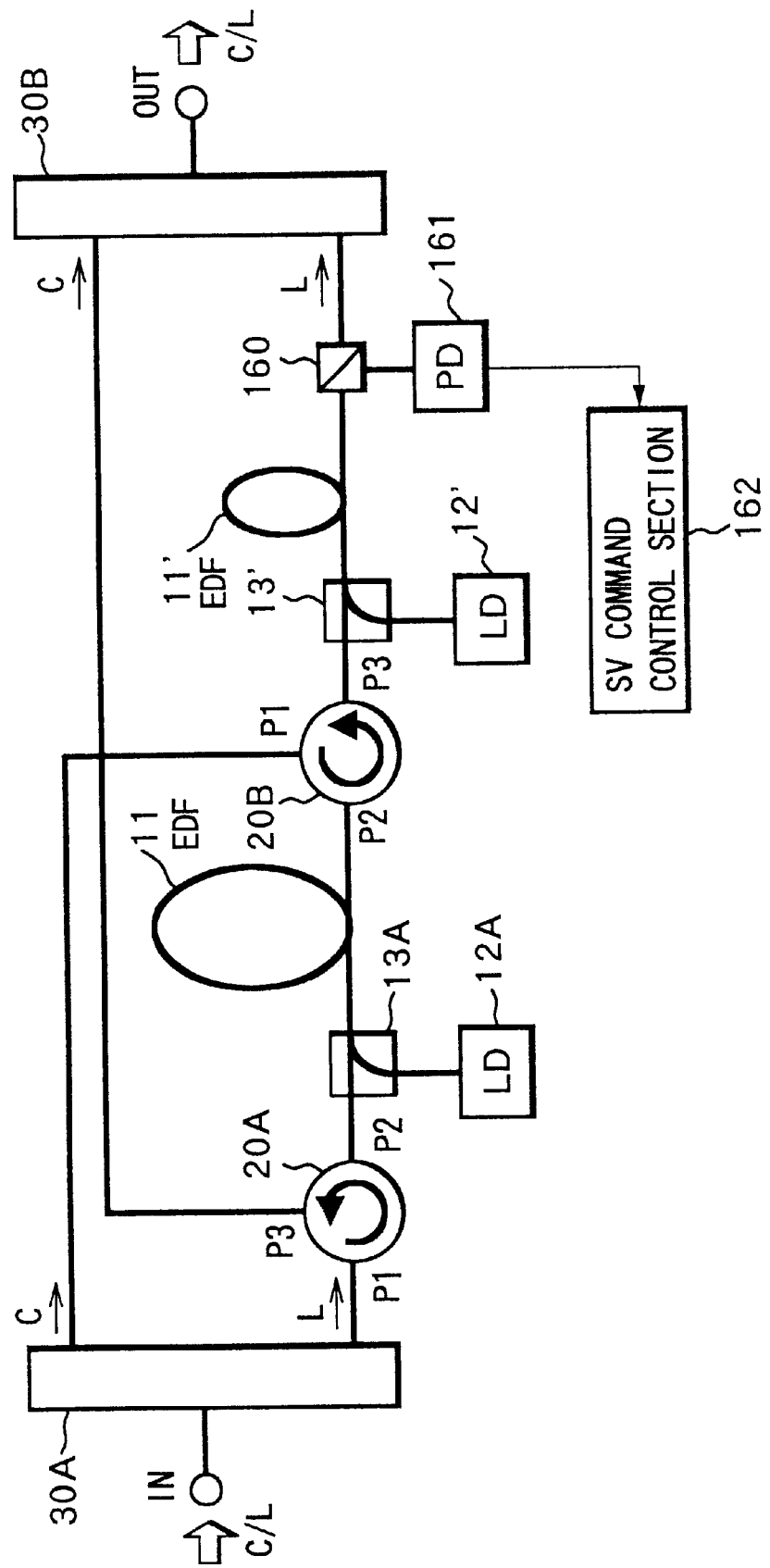
FIG. 28 is a diagram showing an example of where a configuration the same as for the ninth embodiment is applied to the configuration of the seventh embodiment shown in FIG. 14.
Figure 29:
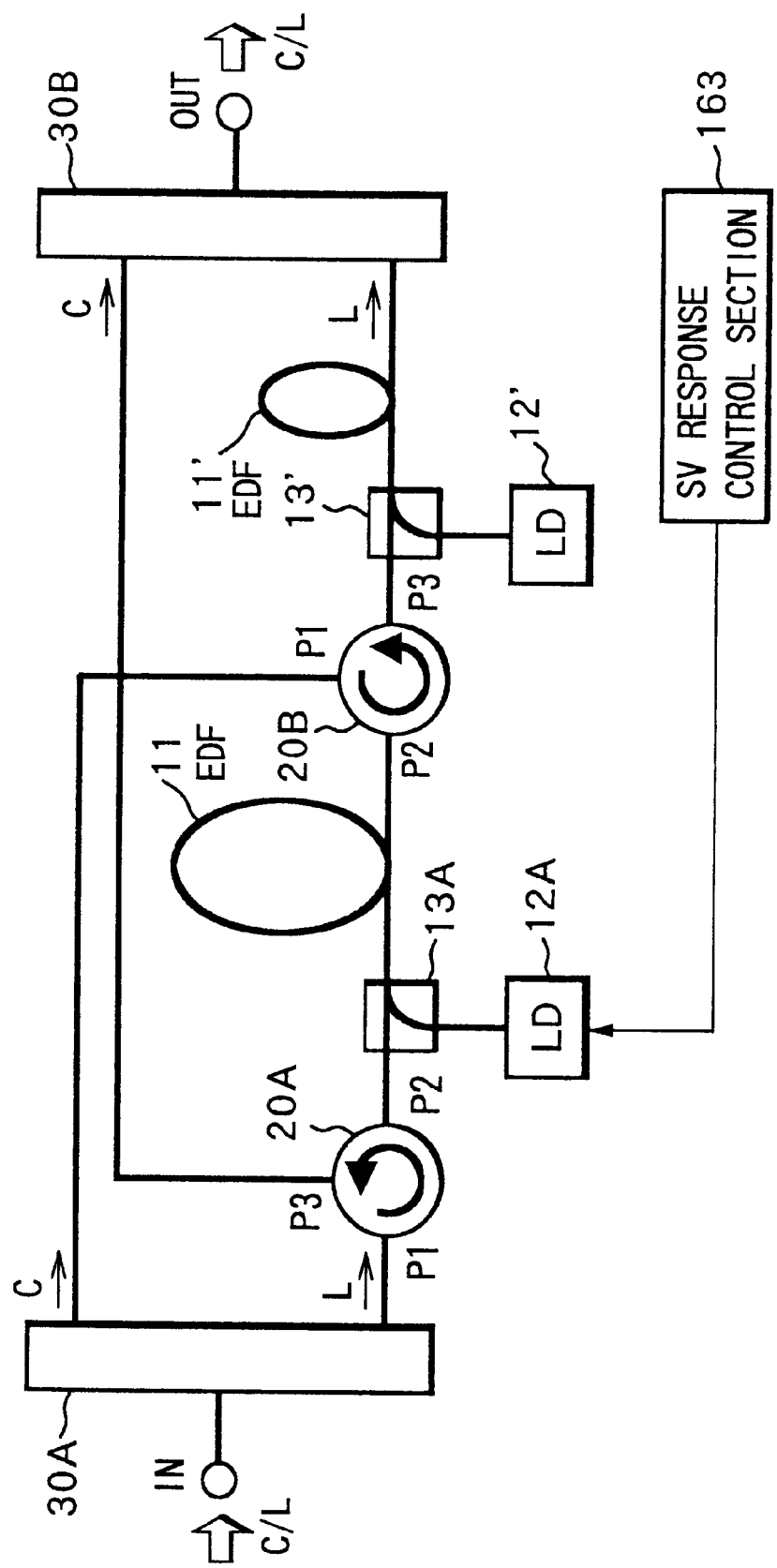
FIG. 29 is a diagram showing an example of where a configuration the same as for the ninth embodiment is applied to the configuration of the seventh embodiment shown in FIG. 15.

FIG. 25 is an example for where a similar configuration to the case of the ninth embodiment is applied to the configuration of the sixth embodiment (refer to FIG. 10). Here, by controlling the drive condition of the excitation light source 12A in accordance with a control signal from the AGC circuit 144, the respective gains of the L band and the C band are adjusted. While not shown in the figure, it is also possible to control the drive condition of the excitation light source 12' in accordance with a control signal from the AGC circuit 144. However in this case, it is necessary to take care that only the optical signal level of the L band is adjusted. Furthermore, as shown in the aforementioned FIG. 12, in the case where the input/output level is individually monitored for the respective bands and subjected to AGC, then the configuration as shown for example in FIG. 26 is possible. With the configuration example of FIG. 26, for the L band, the drive condition of the excitation light source 12' is controlled in accordance with a control signal from the AGC circuit 154, while for the C band, the drive condition of the excitation light source 12A is controlled in accordance with a drive signal from the AGC circuit 159.

Figure 30:
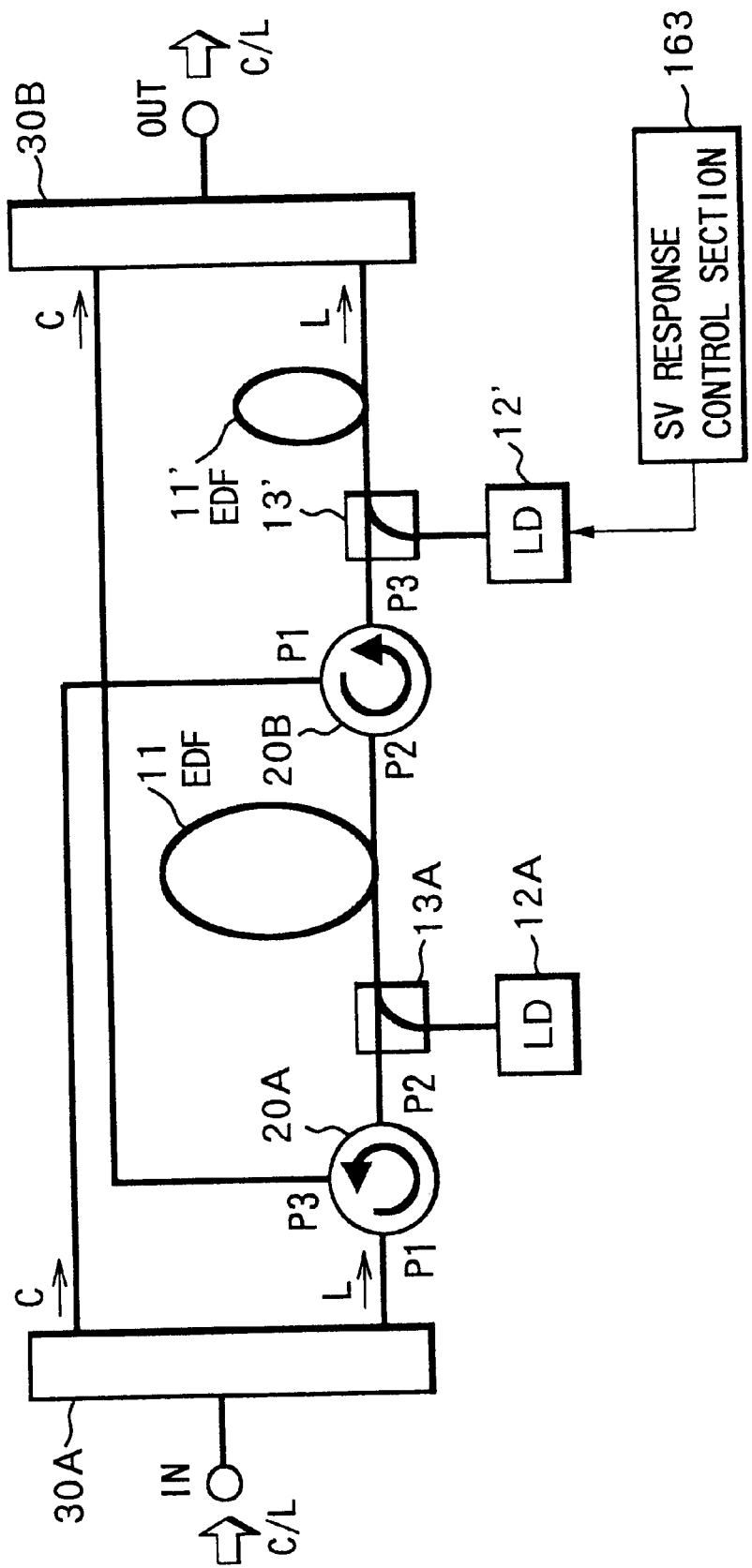
FIG. 30 is a diagram showing an example of where a configuration the same as for the ninth embodiment is applied to the configuration of the seventh embodiment shown in FIG. 16.

FIG. 27 to FIG. 30 are examples for where a similar configuration to the case of the ninth embodiment is adopted to the configuration of the seventh embodiment (refer to FIGS. 13 to 16). With the configuration example of FIG. 27, the case is shown for where the SV command signal superimposed on the C band optical signal is subjected to receive processing. With the configuration example of FIG. 28, the case is shown for where the SV command signal superimposed on the L band optical signal is subjected to receive processing. Here, the configuration is such that the output from the optical fiber amplifying section 10' is monitored. With the configuration example of FIG. 29, the case is shown for where the excitation light source 12A is modulated in accordance with a modulation signal generated by the SV response control section 163. As shown in FIG. 30, the excitation light source 12' may also be modulated in accordance with a modulation signal from the SV response control section 163. However in this case, the SV response signal is superimposed only on the L band optical signal.

Figure 31:
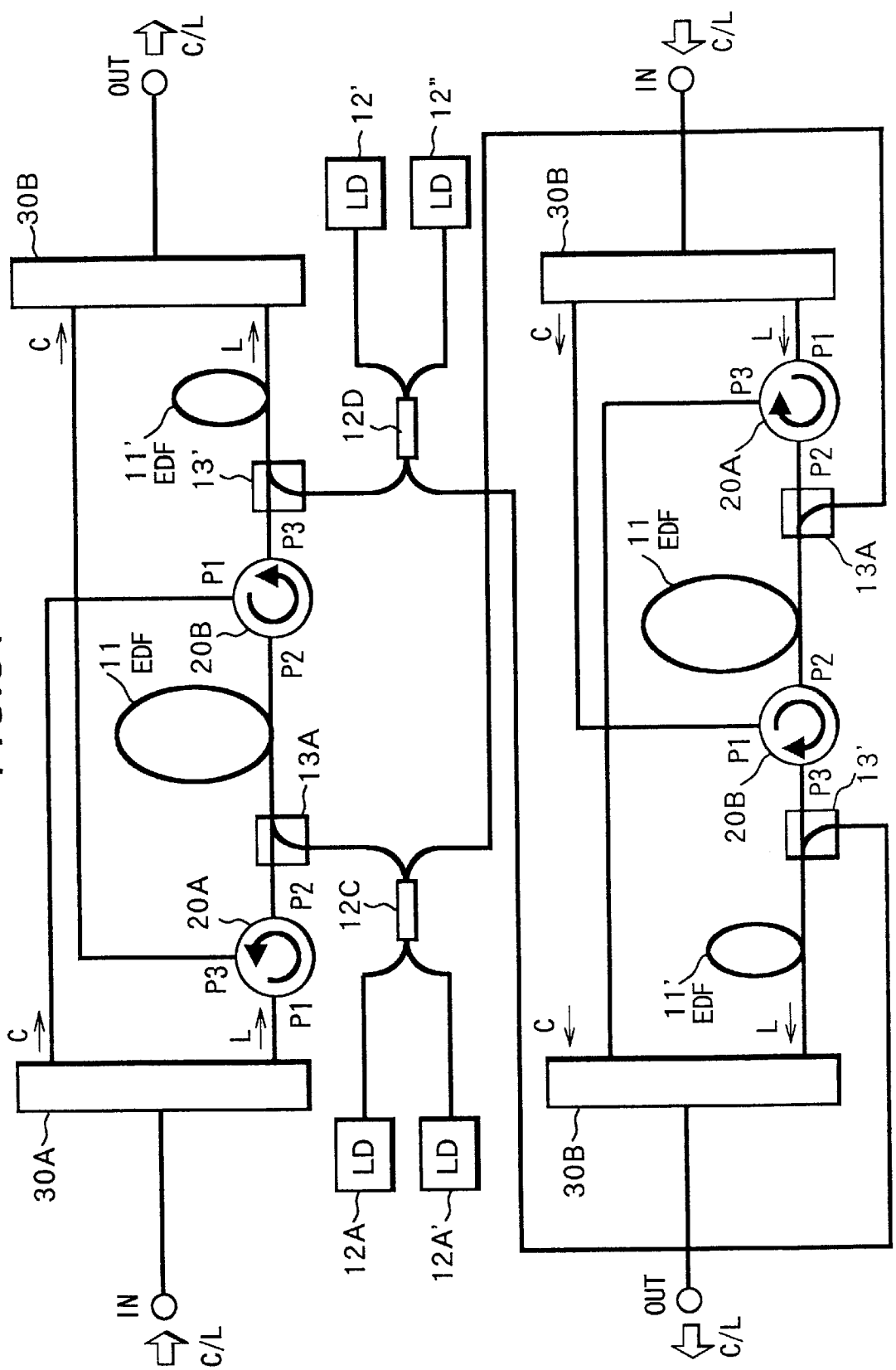
FIG. 31 is a diagram showing an example of where a configuration the same as for the ninth embodiment is applied to the configuration of the eighth embodiment.

FIG. 31 is an example for where a similar configuration to the case of the ninth embodiment is adopted to the configuration of the eighth embodiment (refer to FIG. 17). Also in the configuration example of FIG. 31, excitation light sources 12' and 12" of the optical fiber amplifying section 10' are shared with the ascending line and the descending line by means of the photocoupler 12D, to give a redundant configuration.

Next is a description of a tenth embodiment of the present invention.

With the aforementioned first through ninth embodiments, the case is shown for where the L band optical signal and the C band optical signal for input and output with respect to the optical amplifier, are transmitted in the same direction. With the tenth embodiment, the case is considered for where the L band optical signal and the C band optical signal for input and output with respect to the optical amplifier, are transmitted in opposite directions.

Figure 32:
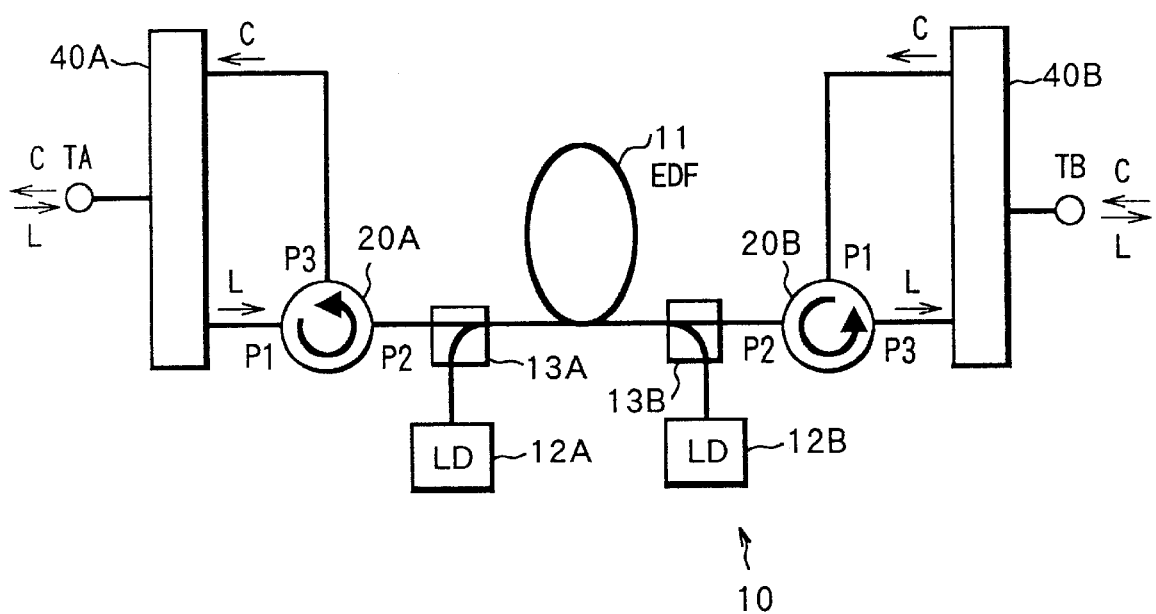
FIG. 32 is a block diagram showing the configuration of a tenth embodiment of the present invention.

FIG. 32 is a block diagram showing the configuration of an optical amplifier according to the tenth embodiment.

In FIG. 32, this optical amplifier has two terminals TA and TB. Here, the L band optical signal is input to the terminal TA and output from the terminal TB, while the C band optical signal is input to the terminal TB and output from the terminal TA. Multiplexer/demultiplexers 40A and 40B serving as optical multiplexing/demultiplexing means incorporating functions for multiplexing and demultiplexing the respective signal lights of the L band and the C band, are respectively connected to the terminals TA and TB. The multiplexer/demultiplexer 40A outputs the L band optical signal input to the terminal TA, from an L band port and sends this to the port P1 of the optical circulator 20A, and receives the C band optical signal output from the port P3 of the optical circulator 20A at a C band port, and outputs this to the outside from the terminal TA. Moreover, the multiplexer/demultiplexer 40B outputs the C band optical signal input to the terminal TB, from a C band port and sends this to the port P1 of the optical circulator 20B, and receives the L band optical signal output from the port P3 of the optical circulator 20B at an L band port, and outputs this to the outside from the terminal TB. Here, the configurations of the respective optical circulators 20A and 20B and of the optical fiber amplifying section 10 are the same as for the case of the first embodiment.

With the optical amplifier of the aforementioned configuration, the respective optical signals of the L band and the C band transmitted in opposite directions, are respectively input from the terminal TA and the terminal TB. The L band optical signal is passed through the multiplexer/demultiplexer 40A and is input to the port P1 of the optical circulator 20A and transmitted to the port P2, and then sent to the optical fiber amplifying section 10. On the other hand, the C band optical signal is passed through the multiplexer/demultiplexer 40B and is input to the port P1 of the optical circulator 20B and transmitted to the port P2, and then sent to the optical fiber amplifying section 10.

In the optical fiber amplifying section 10, the L band optical signal is input to the EDF 11 via the WDM coupler 13A, while the C band optical signal is input to the EDF 11 via the WDM coupler 13B. In the EDF 11, the respective excitation lights produced in the excitation light sources 12A and 12B are supplied in bi-directions from the both ends respectively via the WDM couplers 13A and 13B, so that the erbium inside the EDF 11 is excited. The respective optical signals of the L band and the C band are propagated in mutually opposite directions so that the EDF 11 in the excited condition has an optical amplifying effect with respect to each wavelength band.

The L band optical signal which has been propagated inside the EDF 11 and amplified, is input to the port P2 of the optical circulator 20B via the WDM coupler 13B and transmitted to the port P3, and then sent to the L band port of the multiplexer/demultiplexer 40B and output to the outside from the terminal TB. Furthermore, the C band optical signal which has been propagated inside the EDF 11 and amplified, is input to the port P2 of the optical circulator 20A via the WDM coupler 13A and transmitted to the port P3, and then sent to the C band port of the multiplexer/demultiplexer 40A and output to the outside from the terminal TA.

Next is a description of an eleventh embodiment of the present invention.

Figure 33:
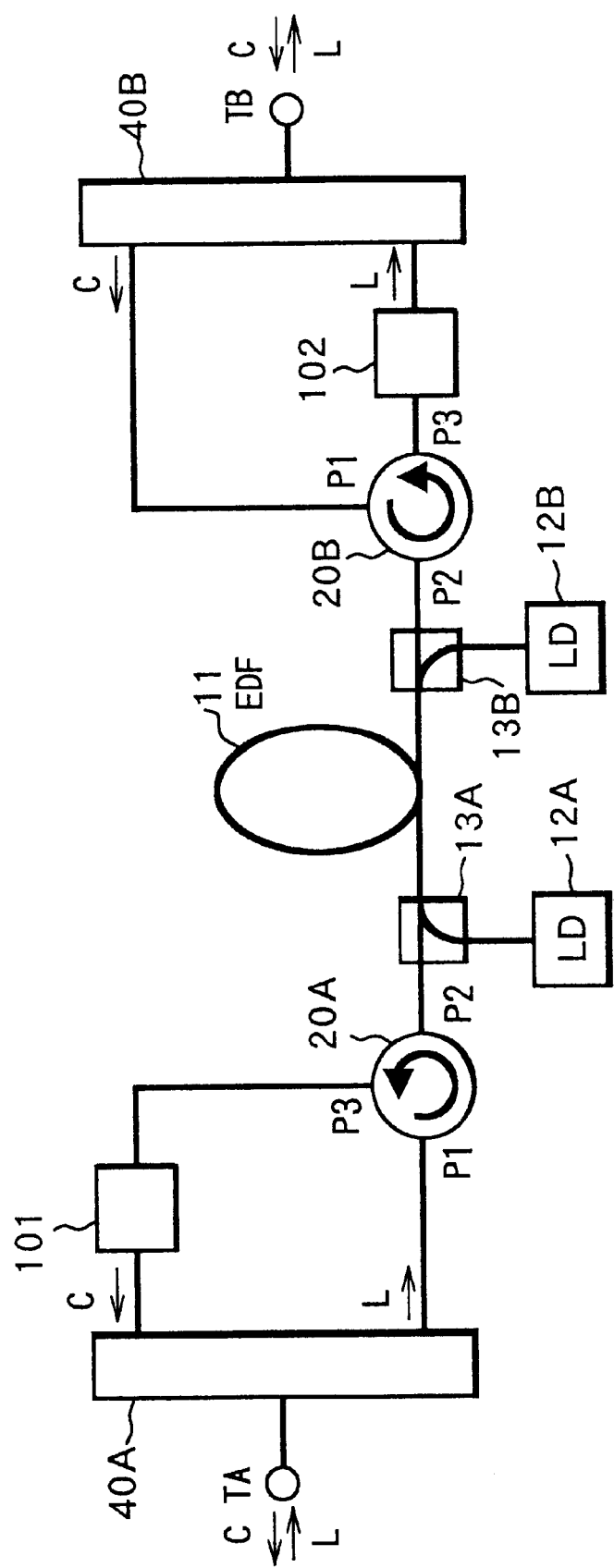
FIG. 33 is a block diagram showing the configuration of an eleventh embodiment of the present invention.

FIG. 33 is a block diagram showing the configuration of an optical amplifier according to the eleventh embodiment.

In FIG. 33, with this optical amplifier, in the configuration of the aforementioned tenth embodiment, the C band compensation optical device 101 is provided between the port P3 of the optical circulator 20A and the C band port of the multiplexer/demultiplexer 40A and the L band compensation optical device 102 is provided between the port P3 of the optical circulator 20B and the L band port of the multiplexer/demultiplexer 40B. The C band compensation optical device 101 and the L band compensation optical device 102 are the same as those used in the aforementioned second embodiment (for example dispersion compensators, gain equalizers or the like).

By having such a configuration, the wavelength dispersion and the dispersion slope or the gain difference between the respective bands are compensated for inside the optical amplifier, so that the transmission characteristics of the WDM signal light can be improved.

Next is a description of a twelfth embodiment of the present invention.

With the twelfth embodiment, the case is considered for where in the aforementioned tenth embodiment, the automatic level control (ALC) for controlling the output from the optical amplifier to be constant, is performed individually with respect to the L band and the C band.

Figure 34:
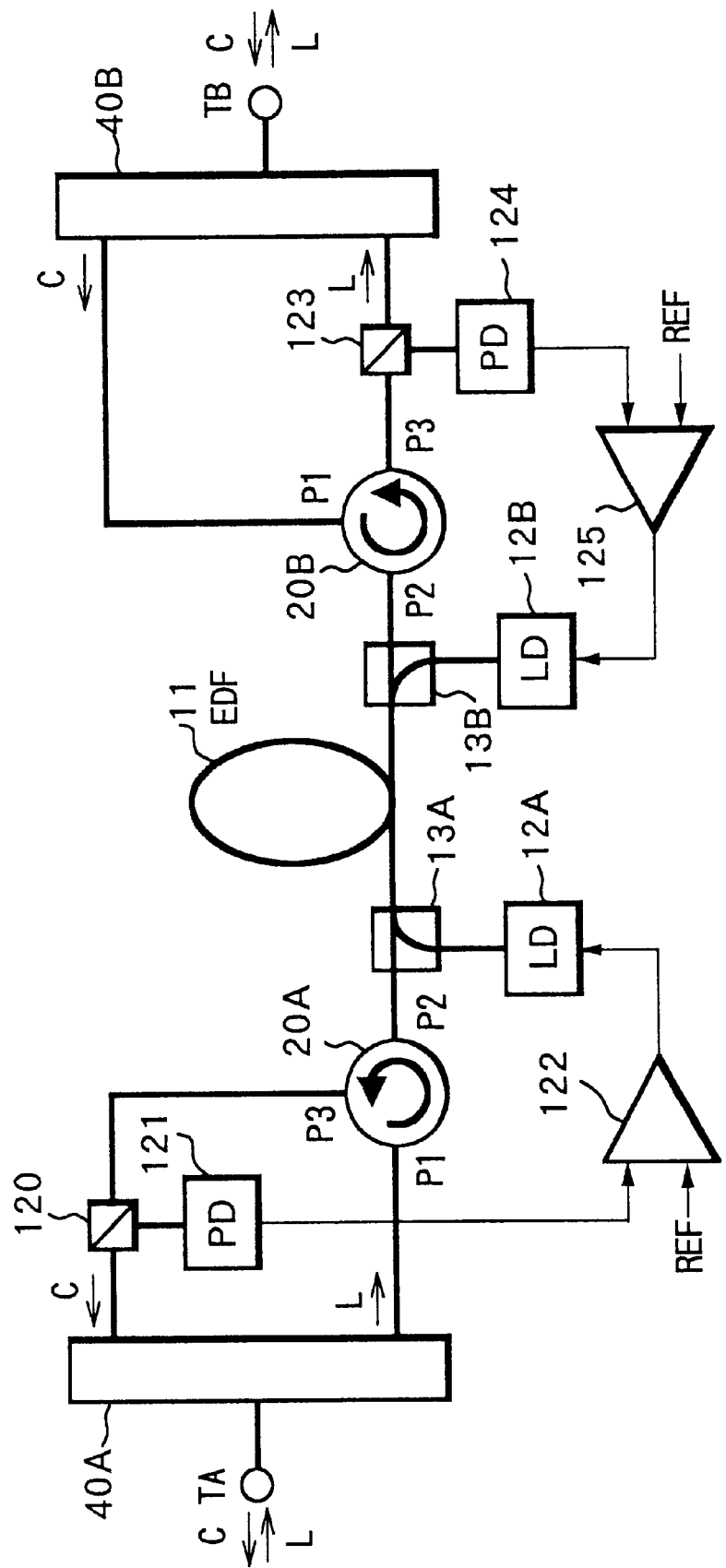
FIG. 34 is a block diagram showing the configuration of a twelfth embodiment of the present invention.

FIG. 34 is a block diagram showing the configuration of an optical amplifier according to the twelfth embodiment.

In FIG. 34, with this optical amplifier, the configuration is basically the same as that of the aforementioned fourth embodiment (refer to FIG. 7), with the photocoupler 120, the photodetector 121 and the ALC circuit 122 provided for the C band optical signal, and the photocoupler 123, the photodetector 124 and the ALC circuit 125 provided for the L band optical signal. The point which is different from the configuration of the fourth embodiment is in that the C band photocoupler 120 is provided between the port P3 of the optical circulator 20A and the C band port of the multiplexer/demultiplexer 40A and the L band photocoupler 123 is provided between the port P3 of the optical circulator 20B and the L band port of the multiplexer/demultiplexer 40B.

By having the aforementioned configuration, the output light level of the L band and the C band is individually monitored, and the optical fiber amplifying section 10 is ALC operated. Therefore, even in the case where the input light level to the present optical amplifier is changed for each of the respective bands, a constant level WDM signal light can be output. As a result, amplifying-and-repeating transmission where the WDM signal light is even more stable is possible.

Next is a description of a thirteenth embodiment of the present invention.

With the thirteenth embodiment, the case is considered for where in the aforementioned tenth embodiment, automatic gain control (AGC) for controlling the gain of the optical amplifier to be constant, is performed.

Figure 35:
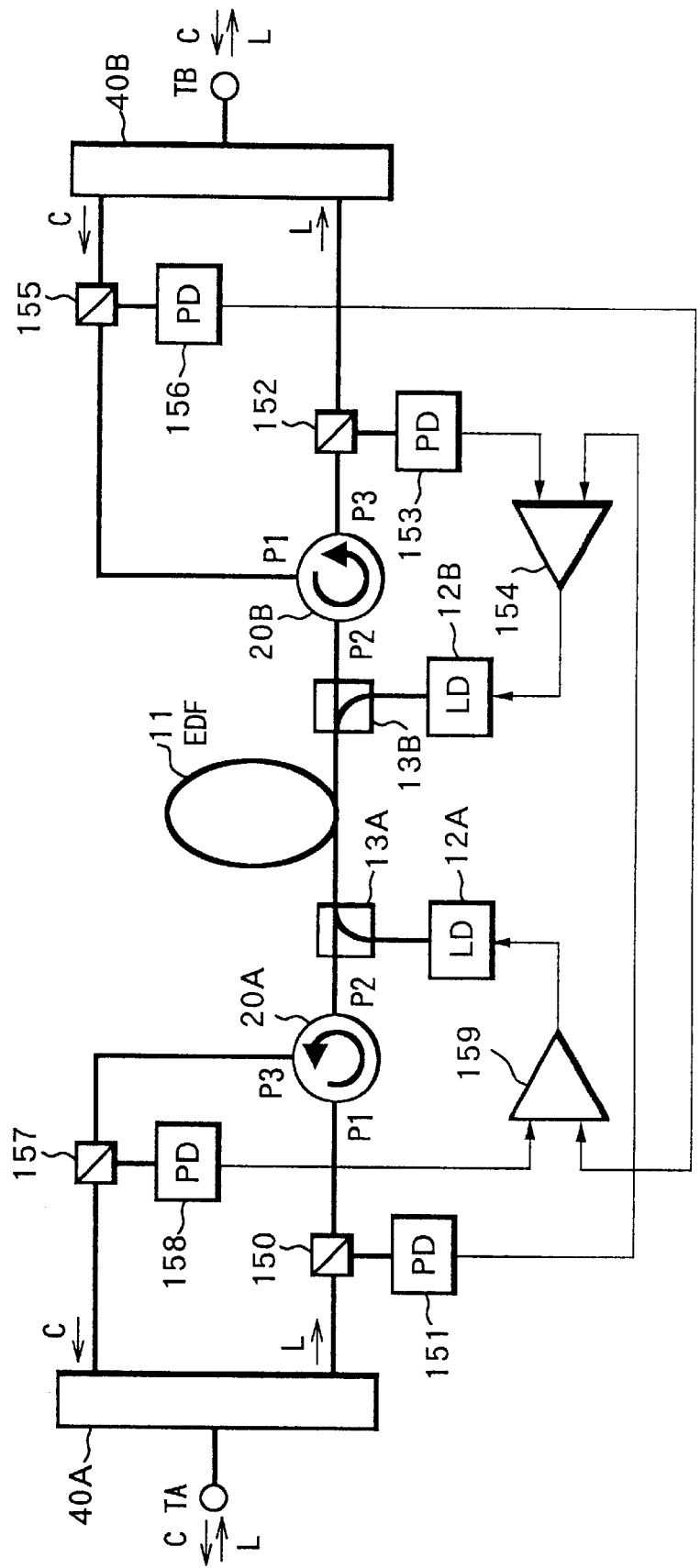
FIG. 35 is a block diagram showing the configuration of a thirteenth embodiment of the present invention.

FIG. 35 is a block diagram showing the configuration of the optical amplifier according to the thirteenth embodiment.

In FIG. 35, with this optical amplifier, the configuration is basically the same as that related to the aforementioned sixth embodiment shown in FIG. 12. The point which is different is in that the photocoupler 155 for monitoring the C band input optical signal is provided between the C band port of the multiplexer/demultiplexer 40B and the port P1 of the optical circulator 20B, and the photocoupler 157 for monitoring the C band output optical signal is provided between the port P3 of the optical circulator 20A and the C band port of the multiplexer/demulfiplexer 40A.

By having the aforementioned configuration, the optical fiber amplifying section 10 is AGC operated. Therefore, even in the case where the input light levels of the respective bands input to the present optical amplifier are changed, fluctuations in the gain wavelength characteristics can be suppressed, enabling stabilized optical amplification to be performed.

Next is a description of a fourteenth embodiment of the present invention.

With the fourteenth embodiment, the case is considered for where in the aforementioned tenth embodiment, the optical amplifier incorporates a processing function for supervisory control signals.

Figure 36:
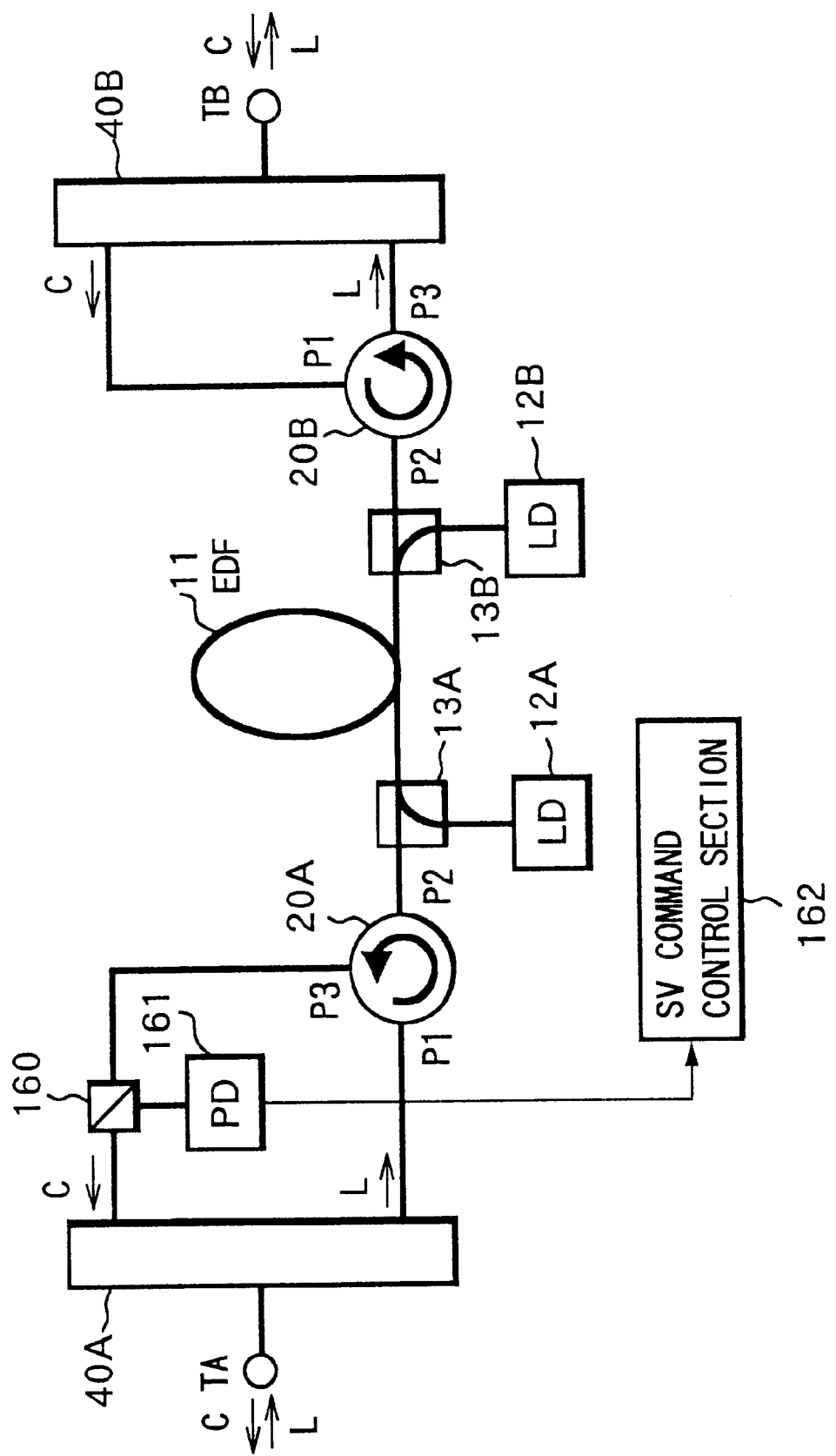
FIG. 36 is a block diagram showing a configuration incorporating a receiving function for supervisory control signals for a fourteenth embodiment of the present invention.

FIG. 36 is a block diagram showing a configuration example of an optical amplifier equipped with a receiving function for supervisory control signals.

Figure 37:
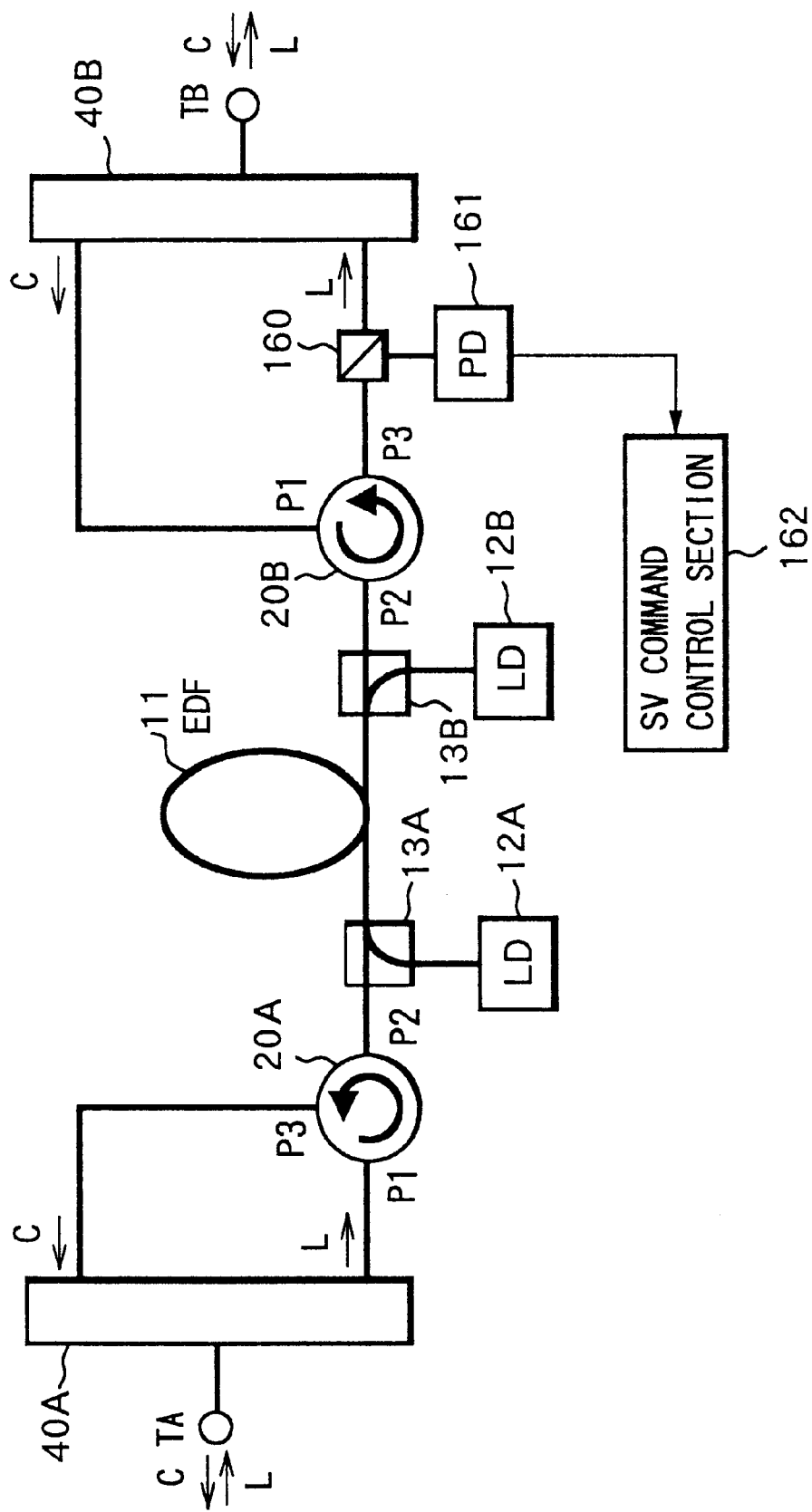
FIG. 37 is a block diagram showing another configuration example related to FIG. 36.

With the optical amplifier shown in FIG. 36, the configuration is basically the same as that for the aforementioned seventh embodiment shown in FIG. 13. The point that is different is in that the photocoupler 160 is provided between the port P3 of the optical circulator 20A and the C band port of the multiplexer/demultiplexer 40A. Here, as with the aforementioned case shown in FIG. 14, in the case where an SV command signal which is superimposed and transmitted on the L band optical signal, is subjected to receive processing, then as shown in FIG. 37, the photocoupler 160 may be provided between the port P3 of the optical circulator 20B and the L band port of the multiplexer/demultiplexer 40B.

Figure 38:
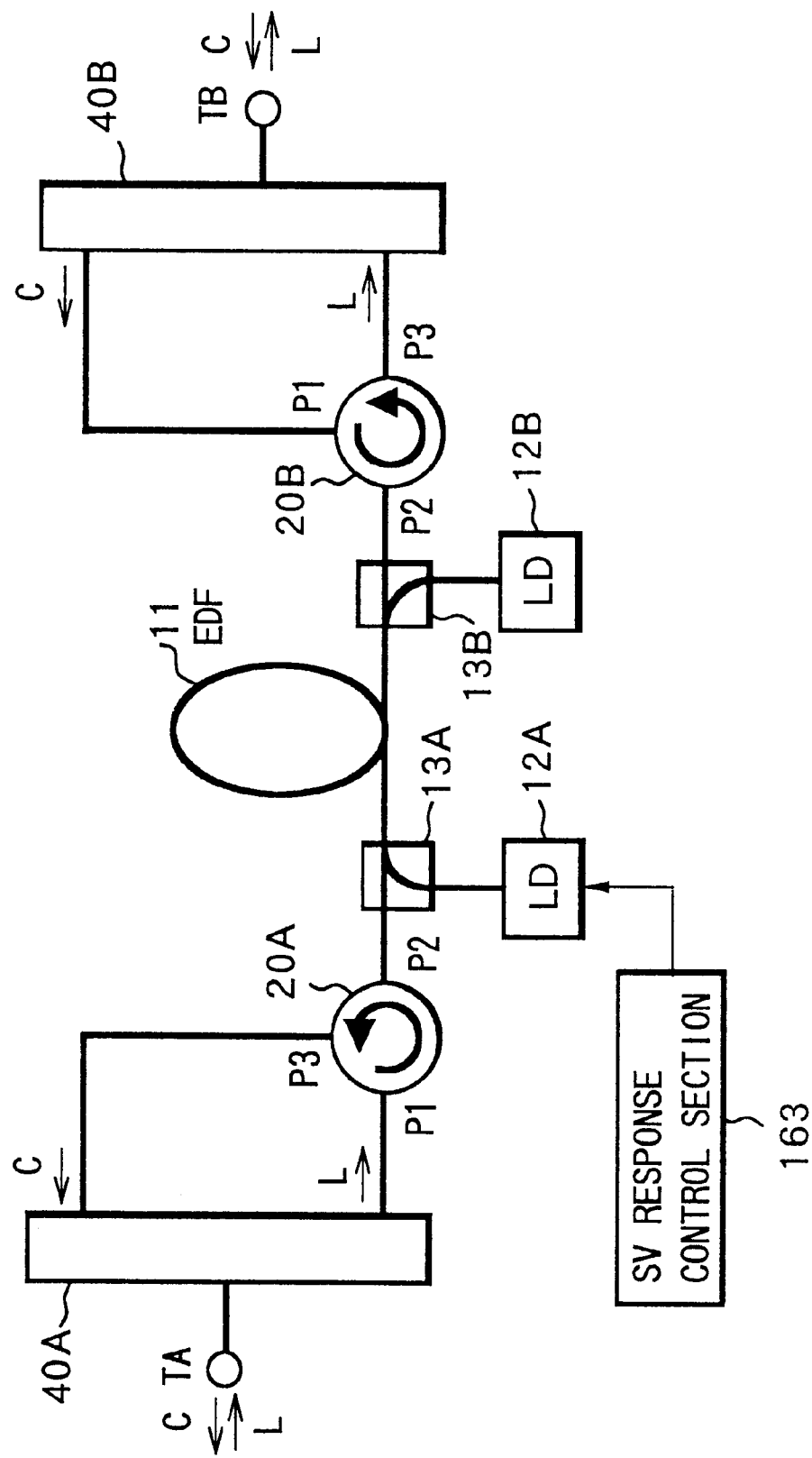
FIG. 38 is a block diagram showing a configuration incorporating a sending function for supervisory control signals for the fourteenth embodiment of the present invention.

Furthermore, FIG. 38 is a block diagram showing a configuration example of an optical amplifier equipped with a sending function for supervisory control signals.

Figure 39:
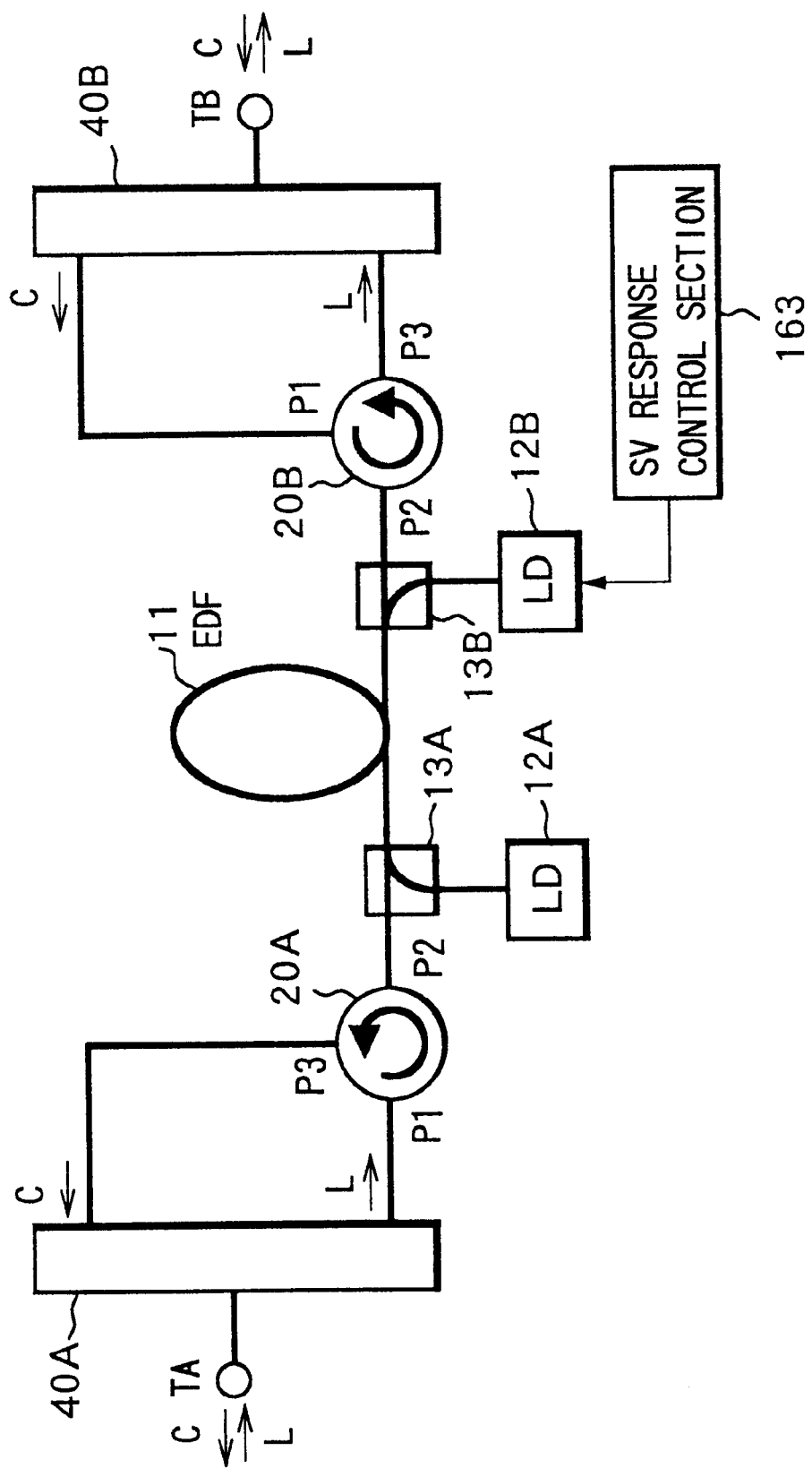
FIG. 39 is a block diagram showing another configuration example related to FIG. 38.

With the optical amplifier shown in FIG. 38, the configuration is basically the same as that for the aforementioned seventh embodiment shown in FIG. 15. Here, the case is shown for where the excitation light source 12A is subjected to modulation operation. However, as shown for example in FIG. 39, the excitation light source 12B may be modulated in accordance with a modulation signal generated by the SV response control section 163. Furthermore, while not shown in the figure, both of the excitation light sources 12A and 12B may be each subjected to modulation operation. Moreover, here the configuration is shown for where the optical amplifier has the receiving function or the sending function for the supervisory control signals separately. However, the sending and receiving functions for the supervisory control signals may be incorporated into a single optical amplifier.

By having the aforementioned configuration, the optical amplifier is provided with a function for processing the supervisory control signals. Therefore, optical amplification can be performed in response to the transmission condition of the WDM signal light.

Next is a description of a fifteenth embodiment of the present invention.

With the fifteenth embodiment, as an application example of the aforementioned tenth embodiment, an optical amplifier is considered which copes with the case where optical amplification in the optical fiber amplifying section 10 with respect to the L band optical signal is insufficient compared to that for the C band optical signal.

Figure 40:
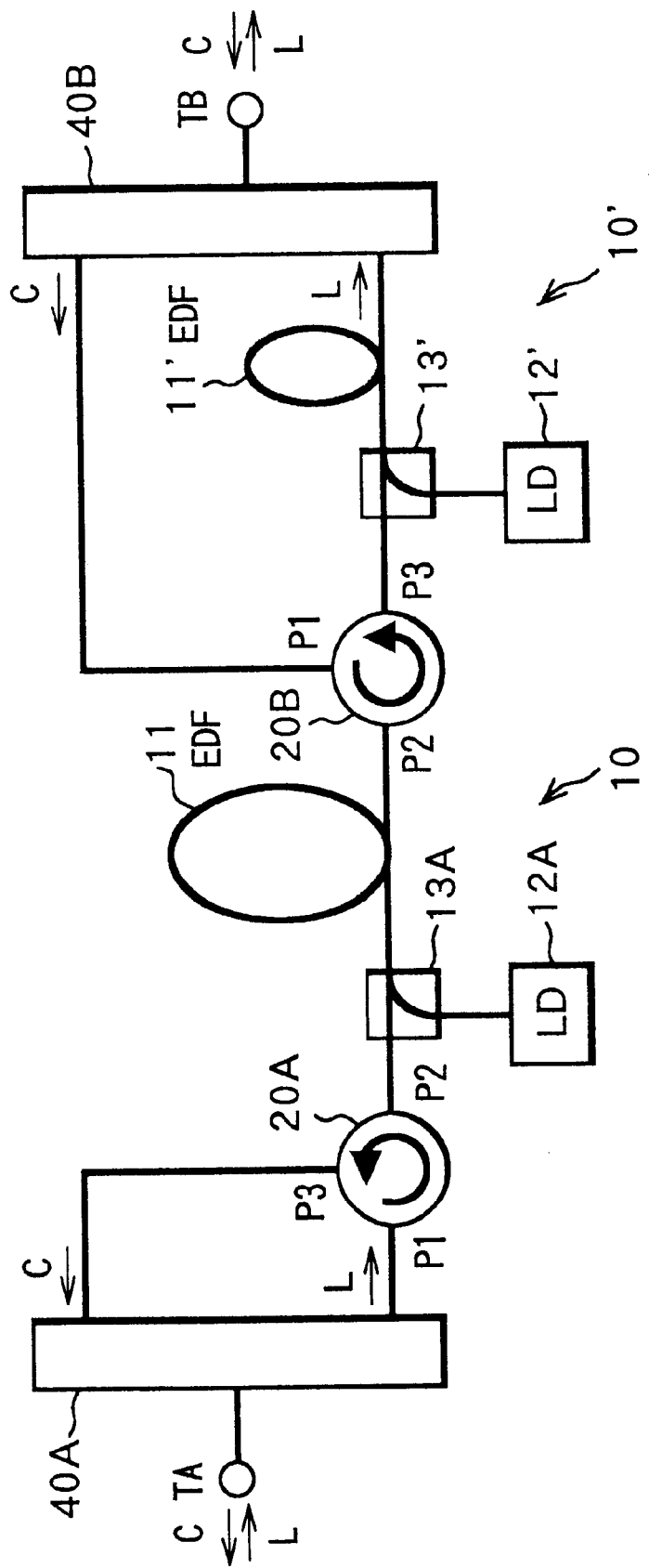
FIG. 40 is a block diagram showing the configuration of a fifteenth embodiment of the present invention.

FIG. 40 is a block diagram showing the configuration of an optical amplifier according to the fifteenth embodiment.

In FIG. 40, with this optical amplifier, in the configuration of the tenth embodiment, the optical fiber amplifying section 10' is provided as the auxiliary optical amplifying device I B. This optical fiber amplifying section 10', as with the one used in the aforementioned ninth embodiment, performs supplementary amplification only for the L band optical signal, and is arranged between the port P3 of the optical circulator 20B and the L band input port of the multiplexer/demultiplexer 40B.

In FIG. 40, a forward excitation type configuration is given where the excitation light is supplied from the input side (optical circulator 20B side) of the L band signal light to the EDF 11'. However, this may be a backward excitation type or a bi-directional excitation type. Moreover, for the optical fiber amplifying section 10, here the configuration is such that excitation light is only supplied to the EDF 11 from the optical circulator 20A side. However, as with the case of the aforementioned tenth embodiment, excitation light may also be supplied from the optical circulator 20B side. Furthermore, a configuration is also possible where excitation light is only supplied to the EDF 11 from the optical circulator 20B side.

By having the aforementioned configuration, the insufficient portion of the optical amplification with respect to the L band optical signal in the optical fiber amplifying section 10, is compensated for by the optical fiber amplifying section 10'. Therefore, the respective optical signals of the L band and the C band can be amplified to a substantially uniform required level.

Here with the fifteenth embodiment, the optical fiber amplifying section 10' for the L band is provided in the configuration of the tenth embodiment. However, it is possible to similarly adopt this for the respective configurations of the aforementioned eleventh through fourteenth embodiments. Hereunder specific configuration examples are given respectively corresponding to the eleventh through fourteenth embodiments.

Figure 41:
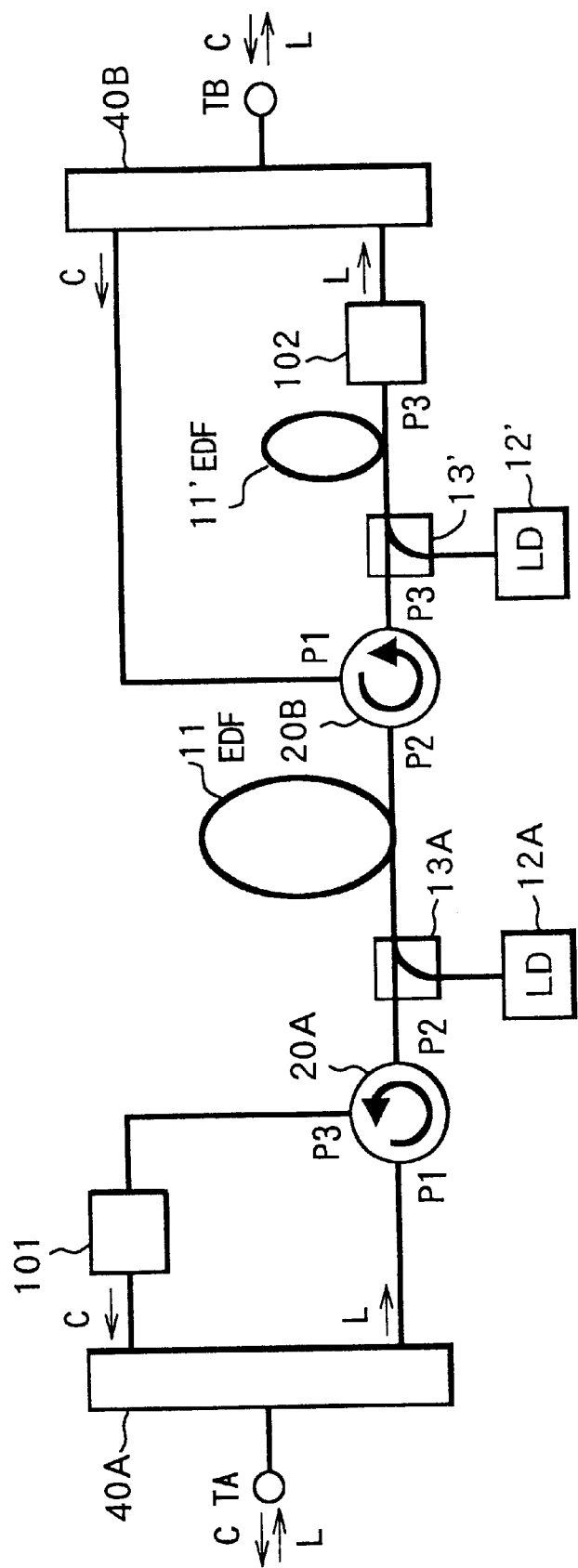
FIG. 41 is a diagram showing an example of where a configuration the same as for the fifteenth embodiment is applied to the configuration of the eleventh embodiment.

FIG. 41 is an example for where a similar configuration to the case of the fifteenth embodiment is adopted in the configuration of the eleventh embodiment (refer to FIG. 33). With the configuration example of FIG. 41, the optical fiber amplifying section 10' is arranged between the port P3 of the optical circulator 20B and the L band compensation optical device 102. Besides this, while not shown in the figure, the optical fiber amplifying section 10' may be provided between the L band compensation optical device 102 and the L band port of the multiplexer/demultiplexer 40B.

Figure 42:
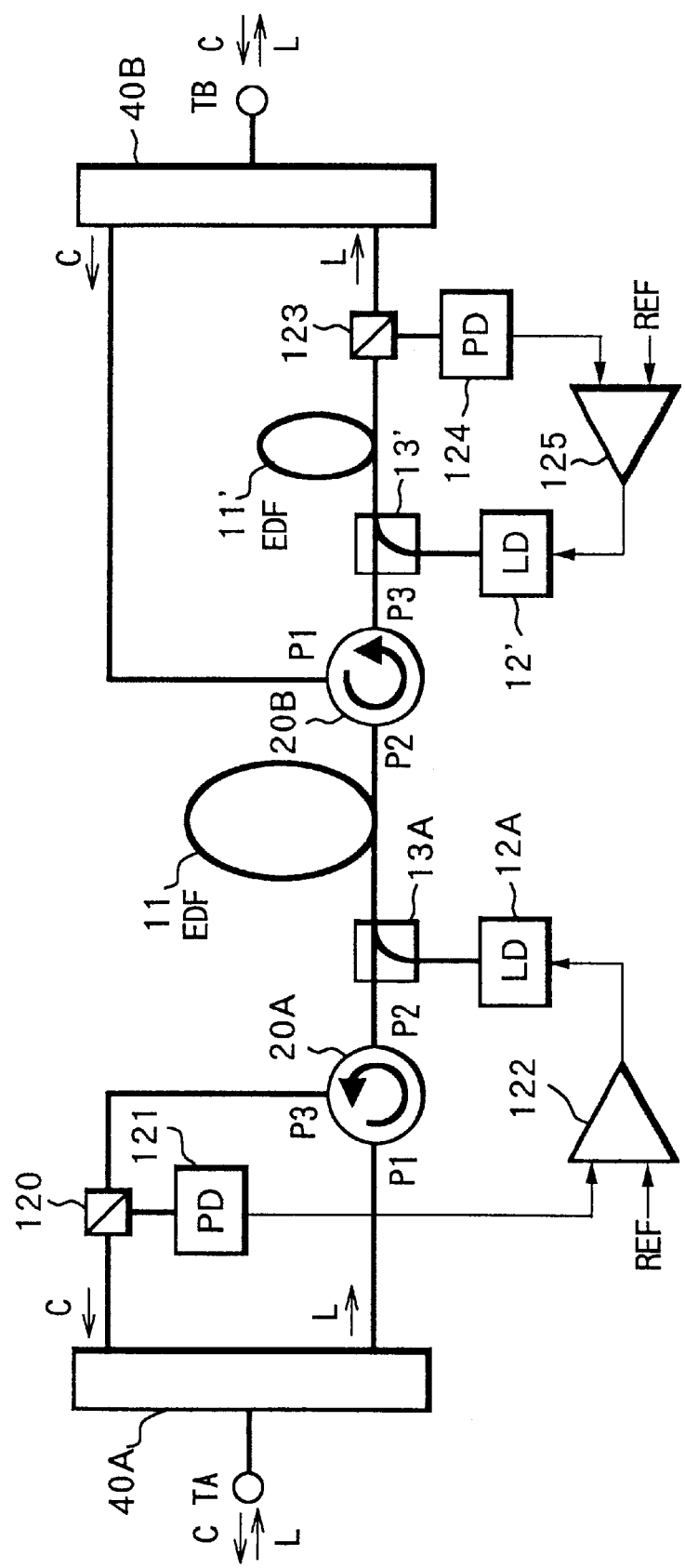
FIG. 42 is a diagram showing an example of where a configuration the same as for the fifteenth embodiment is applied to the configuration of the twelfth embodiment.

FIG. 42 is an example for where a similar configuration to the case of the fifteenth embodiment is adopted to the configuration of the twelfth embodiment (refer to FIG. 34). Here, the optical fiber amplifying section 10' is arranged between the port P3 of the optical circulator 20B and the photocoupler 123, and the drive condition of the excitation light source 12' is controlled in accordance with a control signal from the ALC circuit 125.

Figure 43:
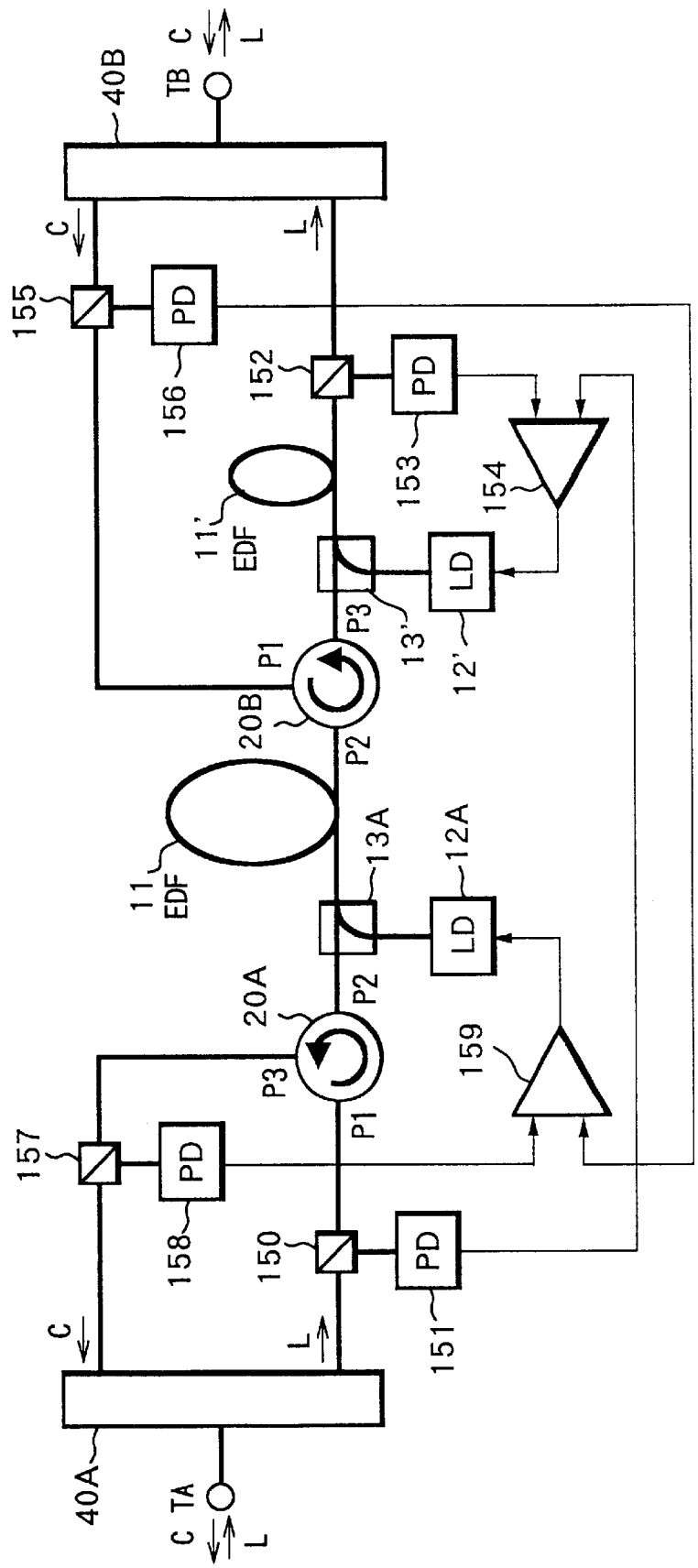
FIG. 43 is a diagram showing an example of where a configuration the same as for the fifteenth embodiment is applied to the configuration of the thirteenth embodiment.
Figure 44:
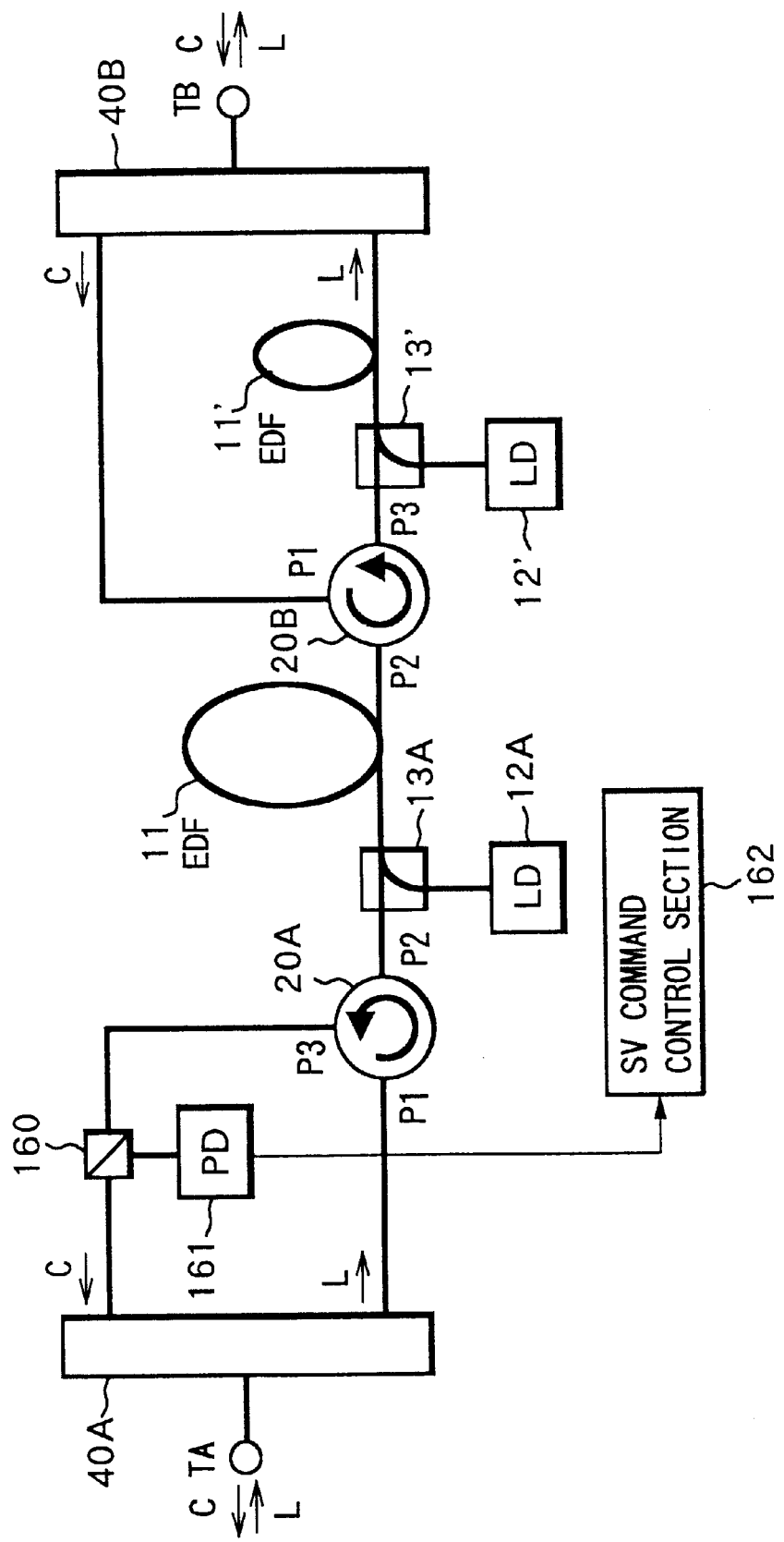
FIG. 44 is a diagram showing an example of where a configuration the same as for the fifteenth embodiment is applied to the configuration of the fourteenth embodiment shown in FIG. 36.
Figure 45:
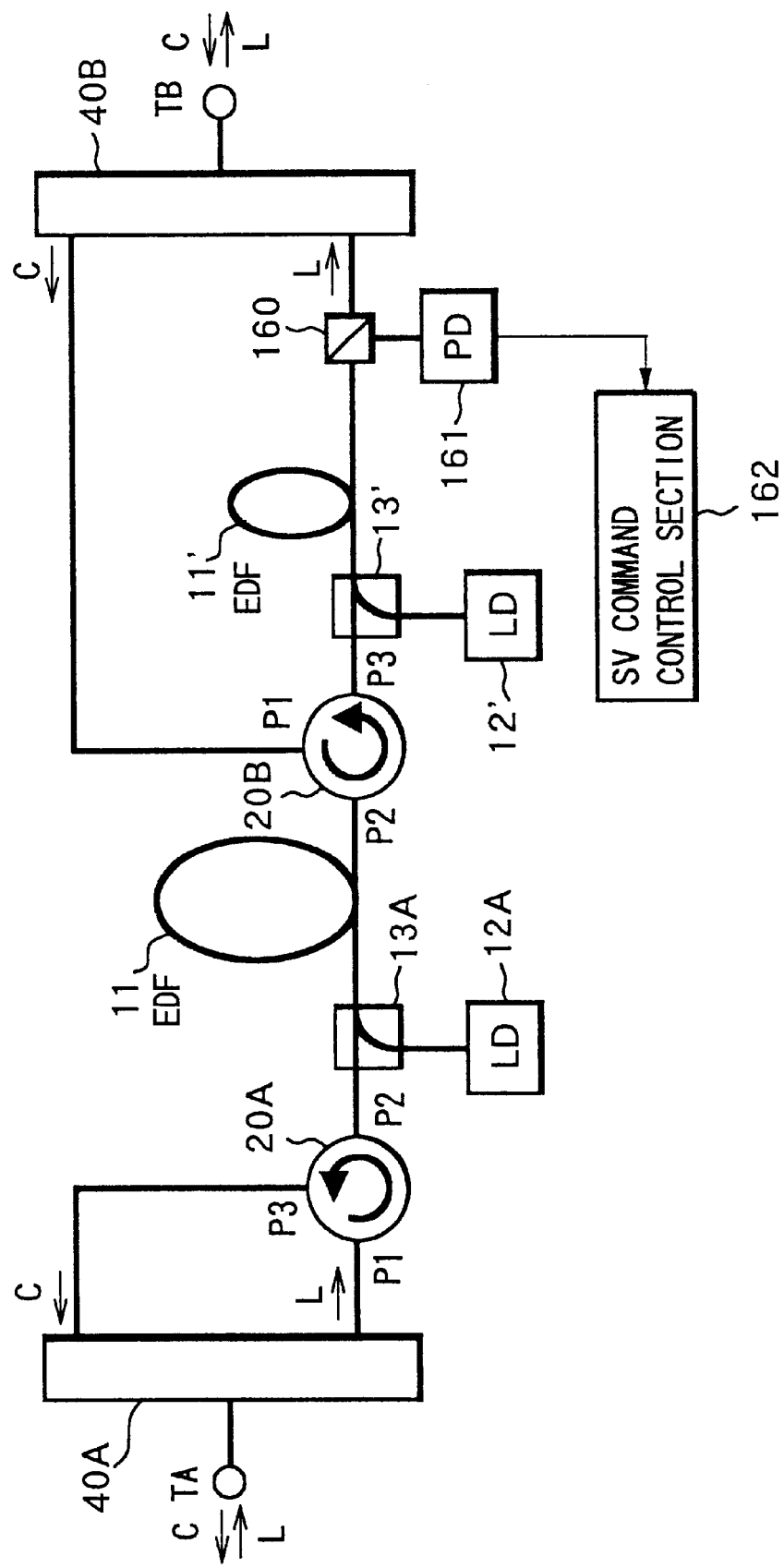
FIG. 45 is a diagram showing an example of where a configuration the same as for the fifteenth embodiment is applied to the configuration of the fourteenth embodiment shown in FIG. 37.
Figure 46:
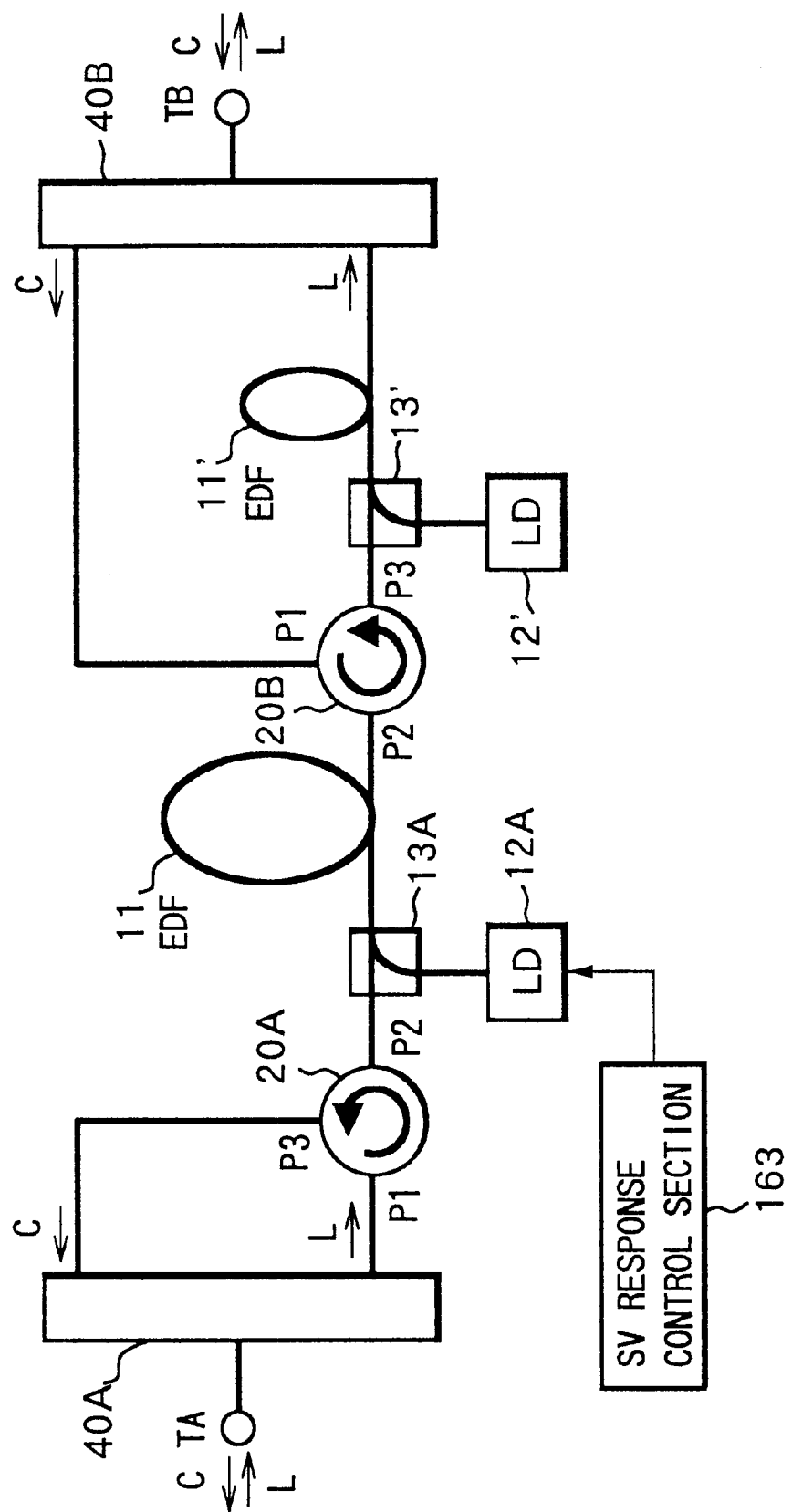
FIG. 46 is a diagram showing an example of where a configuration the same as for the fifteenth embodiment is applied to the configuration of the fourteenth embodiment shown in FIG. 38.

FIG. 43 is an example for where a similar configuration to the case of the fifteenth embodiment is adopted to the configuration of the thirteenth embodiment (refer to FIG. 35). Here for the C band, the drive condition of the excitation light source 12A is controlled in accordance with a control signal from the AGC circuit 159 and for the L band, the drive condition of the excitation light source 12' is controlled in accordance with a control signal from the AGC circuit 154.

Figure 47:
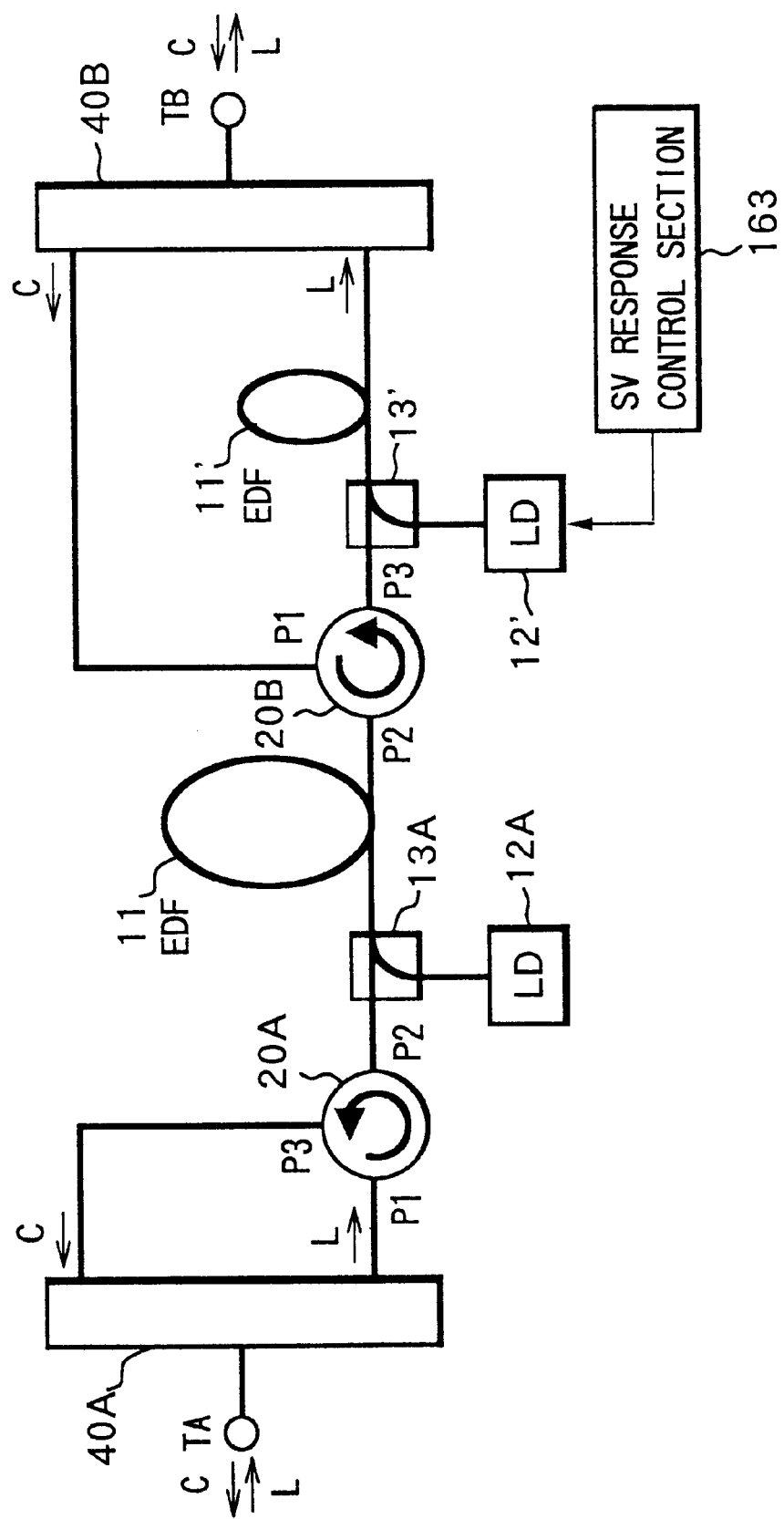
FIG. 47 is a diagram showing an example of where a configuration the same as for the fifteenth embodiment is applied to the configuration of the fourteenth embodiment shown in FIG. 39.

FIG. 44 to FIG. 47 are examples for where a similar configuration to the case of the fifteenth embodiment is adopted to the configuration related to the fourteenth embodiment (refer to FIGS. 36 to 39). With the configuration example of FIG. 44, the case is shown for where the SV command signal superimposed on the C band optical signal is subjected to receive processing. With the configuration example of FIG. 45, the case is shown for where the SV command signal superimposed on the L band optical signal is subjected to receive processing. Here, the configuration is such that the output from the optical fiber amplifying section 10' is monitored. With the configuration example of FIG. 46, the case is shown for where the excitation light source 12A is modulated in accordance with a modulation signal generated by the SV response control section 163. As shown in FIG. 47, the excitation light source 12' may also be modulated in accordance with a modulation signal from the SV response control section 163. However in this case, the SV response signal is superimposed only on the L band optical signal.

In FIG. 40 to FIG. 47, a forward excitation type configuration is given where the excitation light is supplied from the input side of the signal light to the EDF 11 and EDF 11'. However, this may be a bi-directional excitation type.

Next is a description of a sixteenth embodiment of the present invention.

With the sixteenth embodiment, an application example of the optical amplifier according to the present invention is considered for where the transmission directions of the respective signal lights of the L band and the C band output and input with respect to the optical amplifier, can be coped with irrespective of whether these are the same direction or opposite directions.

Figure 48:
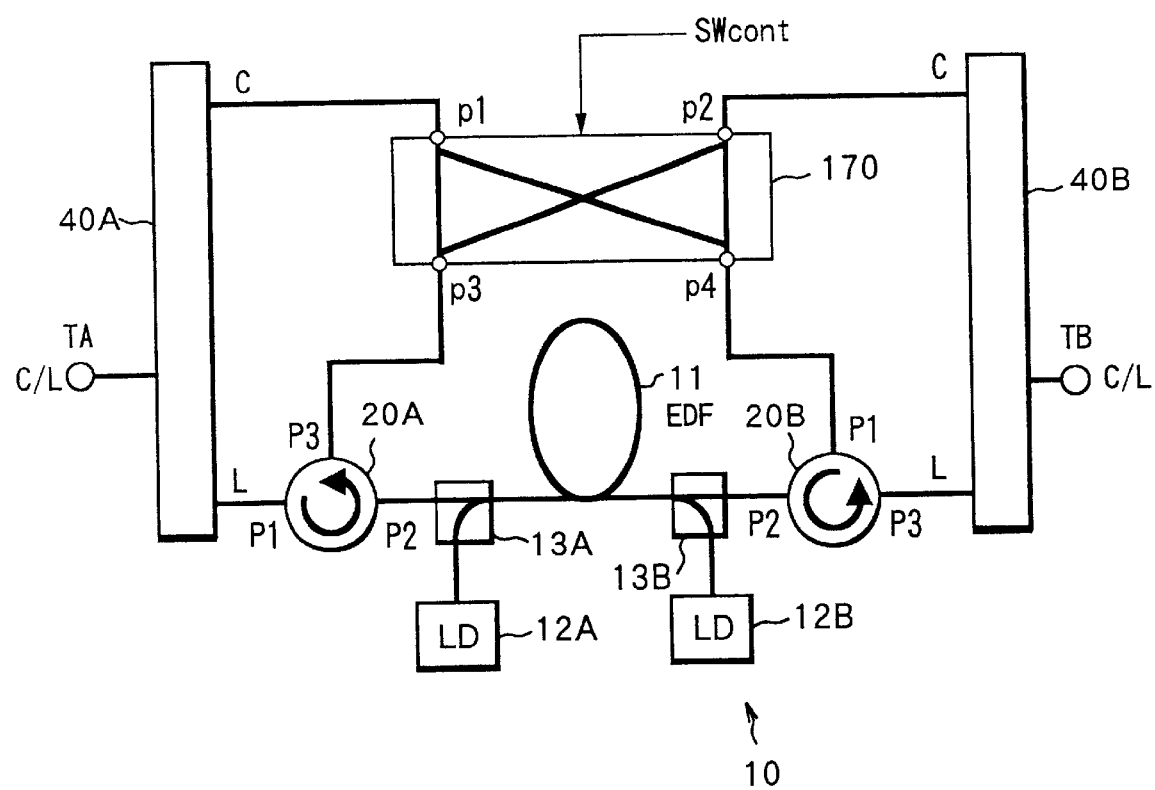
FIG. 48 is a block diagram showing the configuration of a sixteenth embodiment of the present invention.
Figure 49:
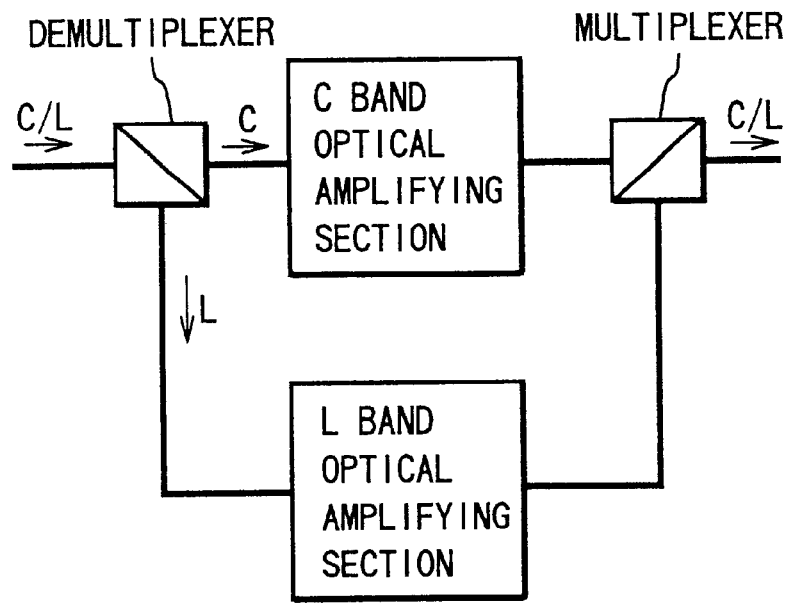
FIG. 49 is a block diagram showing a configuration of a conventional C/L band optical amplifier.
Figure 50:
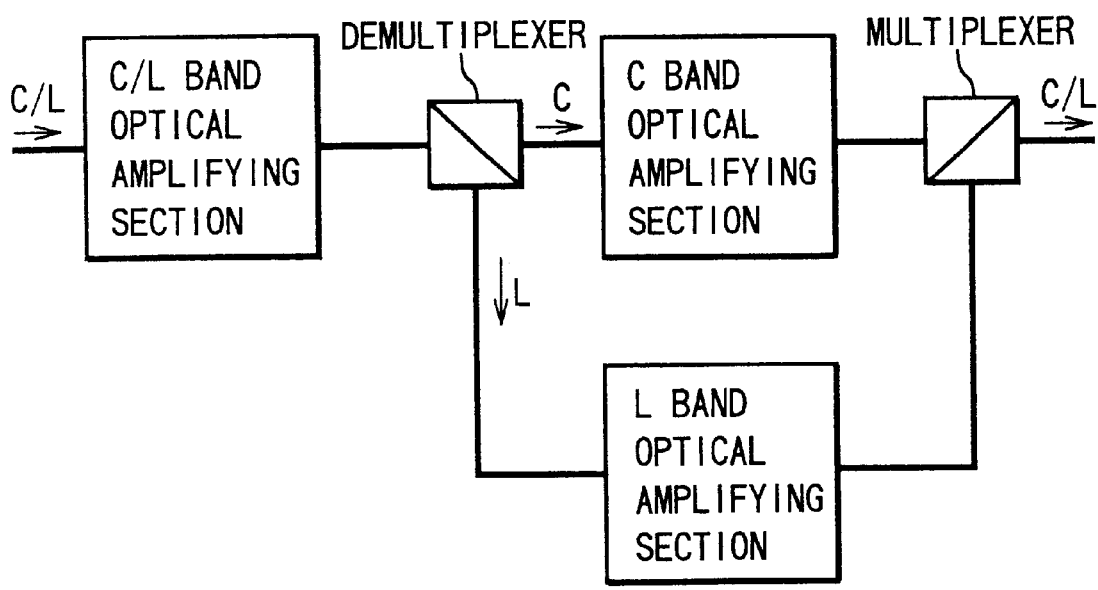

FIG. 48 is a block diagram for the configuration of an optical amplifier according to the sixteenth embodiment.

In FIG. 48, with this optical amplifier, for example in the configuration of the aforementioned tenth embodiment (refer to FIG. 32), the configuration is such that the connection condition between the C ban d port of the multiplexer/demultiplexer 40A and the port P3 of the optical circulator 20A, and the connection condition between the C band port of the multiplexer/demultiplexer 40B and the port P1 of the optical circulator 20B, can b e switched using a 2×2 optical switch 170 (optical switch device).

With the optical switch 170, a first port p1 is connected to the C band port of the multiplexer/demultiplexer 40A, a second port p2 is connected to the C band port of the multiplexer/demultiplexer 40B, a third port p3 is connected to the port P3 of the optical circulator 20A, and a fourth port p4 is connected to the port P1 of the optical circulator 20B. This optical switch 170, in accordance with an optical switch control signal SWcont applied from an outside section, connects the first port p1 and the third port p3 or the fourth port p4, and at the same time connects the second port p2 and the fourth port p4 or the third port p3.

With the optical amplifier of such a configuration, for example in the case where the L band optical signal and the C band optical signal which are transmitted in the same direction, are input to the terminal TA and output from the terminal TB, the optical switch 170, in accordance with the optical switch control signal SWcont, connects between the first port p1 and the fourth port p4, and at the same time connects between the second port p2 and the third port p3. As a result, the C band optical signal input to the terminal TA is input to the first port p1 of the optical switch 170 via the multiplexer/demultiplexer 40A, and transmitted to the fourth port p4 and then sent to the port P1 of the optical circulator 20B. Furthermore, after being propagated inside the optical fiber amplifying section 10 in the opposite direction to the L band optical signal and amplified, the C band optical signal is passed from the port P2 to the port P3 of the optical circulator 20A and is input to the third port p3 of the optical switch 170, and is then transmitted to the second port p2 and sent to the C band port of the multiplexer/demultiplexer 40B, and output to the outside via the terminal TB.

On the other hand, in the case where for example the L band optical signal is input to the terminal TA and output from the terminal TB, and the C band optical signal is input to the terminal TB and output from the terminal TA (the case where the transmission directions for the respective bands are opposite), the optical switch 170, in accordance with the optical switch control signal SWcont, connects between the first port p1 and the third port p3, and at the same time connects between the second port p2 and the fourth port p4. As a result, the C band optical signal input to the terminal TB is input to the second port p2 of the optical switch 170 via the multiplexer/demultiplexer 40B, and transmitted to the fourth port p4 and then sent to the port P1 of the optical circulator 20B. Furthermore, after being propagated inside the optical fiber amplifying section 10 in the opposite direction to the L band optical signal and amplified, the C band optical signal is passed from the port P2 to the port P3 of the optical circulator 20A and is input to the third port p3 of the optical switch 170, and is then transmitted to the first port p1 and sent to the C band port of the multiplexer/demultiplexer 40A, and output to the outside via the terminal TA.

In this way, with the sixteenth embodiment, by enabling switching of the connection condition between the multiplexer/demultiplexers 40A and 40B and the optical circulators 20A and 20B by means of the optical switch 170, an optical amplifier can be provided with a simple configuration, which is not dependent on the transmission directions of the respective optical signals of the L band and the C band.

Here with the sixteenth embodiment, the optical switch 170 is arranged so as to switch the connection condition on the C band side. However in a similar manner, the optical switch 170 may be arranged so as to switch the connection condition on the L band side.

What is claimed is:

1. An optical amplifier for amplifying wavelength division multiplexed signal light which contains respective optical signals of a first wavelength band and a second wavelength band, comprising:

optical amplifying means for amplifying said wavelength division multiplexed signal light using a rare earth element doped fiber to which excitation light is supplied;

a first optical circulator connected to one end of said rare earth element doped fiber; and a second optical circulator connected to the other end of said rare earth element doped fiber, wherein an optical signal of said first wavelength band is input to said rare earth element doped fiber via said first optical circulator and output from said rare earth element doped fiber via said second optical circulator, and an optical signal of said second wavelength band is input to said rare earth element doped fiber via said second optical circulator, and output from said rare earth element doped fiber via said first optical circulator, the signal light of said respective wavelength bands being propagated in mutually opposite directions inside the rare earth element doped fiber, and the wavelength division multiplexed signal light of said first wavelength band and the wavelength division multiplexed signal light of said second wavelength band are transmitted in the same direction.

2. An optical amplifier according to claim 1, wherein said first optical circulator, having at least three ports, outputs optical signals of said first wavelength band input to a first port thereof from a second port thereof connected to one end of said rare earth element doped fiber, and outputs optical signals of said second wavelength band which are propagated inside said rare earth element doped fiber and input to said second port from a third port thereof, and said second optical circulator, having at least three ports, outputs optical signals of said second wavelength band input to a first port thereof from a second port thereof connected to the other end of said rare earth element doped fiber, and outputs optical signals of said first wavelength band which are propagated inside said rare earth element doped fiber and input to said second port from a third port thereof.

3. An optical amplifier according to claim 1, wherein said first wavelength band is a 1580 nm band and said second wavelength band is a 1550 nm band.

4. An optical amplifier according to claim 1, wherein there is provided auxiliary optical amplifying means having an optical amplifying band in said first wavelength band, for amplifying and outputting only optical signals of said first wavelength band output from said second optical circulator.

5. An optical amplifier for amplifying wavelength division multiplexed signal light which contains respective optical signals of a first wavelength band and a second wavelength band, comprising:

optical amplifying means for amplifying said wavelength division multiplexed signal light using a rare earth element doped fiber to which excitation light is supplied;

a first optical circulator having at least three ports, connected to one end of said rare earth element doped fiber; and a second optical circulator having at least three ports, connected to the other end of said rare earth element doped fiber, wherein an optical signal of said first wavelength band is input to said rare earth element doped fiber via said first optical circulator and output from said rare earth element doped fiber via said second optical circulator, and an optical signal of said second wavelength band is input to said rare earth element doped fiber via said second optical circulator, and output from said rare earth element doped fiber via said first optical circulator, the signal light of said respective wavelength bands being propagated in mutually opposite directions inside the rare earth element doped fiber, said first optical circulator outputs optical signals of said first wavelength band input to a first port thereof from a second port thereof connected to one end of said rare earth element doped fiber, and outputs optical signals of said second wavelength band which are propagated inside said rare earth element doped fiber and input to said second port from a third port thereof, said second optical circulator outputs optical signals of said second wavelength band input to a first port thereof from a second port thereof connected to the other end of said rare earth element doped fiber, and outputs optical signals of said first wavelength band which are propagated inside said rare earth element doped fiber and input to said second port from a third port thereof, and at the time of amplifying wavelength division multiplexed signal light which contains respective optical signals of the first wavelength band and the second wavelength band transmitted in the same direction, there is provided;

demultiplexing means for demultiplexing said wavelength division multiplexed signal light into respective signal lights of the first wavelength band and the second wavelength band, and outputting the demultiplexed signal light of the first wavelength band to the first port of said first optical circulator, and outputting the signal light of the second wavelength band to the first port of said second optical circulator, and multiplexing means for multiplexing the optical signal of the second wavelength band output from the third port of said first optical circulator and the optical signal of the first wavelength band output from the third port of said second optical circulator, and outputting the multiplexed signal light.

6. An optical amplifier according to claim 2, wherein at the time of amplifying wavelength division multiplexed signal light which contains respective optical signals of the first wavelength band and the second wavelength band transmitted in opposite directions, there is provided;

first and second optical multiplexing/demultiplexing means respectively provided with a function for demultiplexing said wavelength division multiplexed signal light into respective signal lights of a first wavelength band and a second wavelength band, and for multiplexing the respective signal lights of the first wavelength band and the second wavelength band, and said first optical multiplexing/demultiplexing means demultiplexes the signal light of said first wavelength band to send to the first port of said first optical circulator, and multiplexes the signal light of said second wavelength band sent from the third port of said first optical circulator to output the multiplexed signal light, and said second optical multiplexing/demultiplexing means demultiplexes the signal light of said second wavelength band to send to the first port of said second optical circulator, and multiplexes the signal light of said first wavelength band sent from the third port of said second optical circulator to output the multiplexed signal light.

7. An optical amplifier according to claim 1, wherein there is provided optical switch means for switching an input/output condition with respect to said first optical circulator and said second optical circulator for one of the respective signal lights of the first wavelength band and the second wavelength band, in accordance with a transmission direction of the respective optical signals.

8. An optical amplifier according to claim 1, wherein there is provided wavelength dispersion compensation means for compensating for wavelength dispersion which has accumulated in said wavelength division multiplexed signal light.

9. An optical amplifier according to claim 1, wherein there is provided gain equalizing means for compensating for gain wavelength characteristics of said optical amplifying means.

10. An optical amplifier according to claim 1, wherein there is provided optical power fixing control means for monitoring the output power of said wavelength division multiplexed signal light, and controlling an excitation light drive condition of said optical amplifying means so that said output power becomes constant.

11. An optical amplifier according to claim 1, wherein there is provided gain fixing control means for monitoring the gain in said optical amplifying means, and controlling an excitation light drive condition of said optical amplifying means so that said gain becomes constant.

12. An optical amplifier according to claim 1, wherein there is provided ratio control means for respectively monitoring an optical signal power of said first wavelength band and an optical signal power of said second wavelength band, and controlling a ratio of optical signal levels of the respective wavelength bands.

13. An optical amplifier according to claim 1, wherein there is provided supervisory control means for processing supervisory control signals transmitted together with said wavelength division multiplexed signal light.

14. An optical amplification method for amplifying wavelength division multiplexed signal light which contains respective optical signals of a first wavelength band and a second wavelength band transmitted in the same direction, wherein:

with respect to a rare earth element doped fiber with first and second optical circulators respectively connected to opposite ends thereof and to which excitation light is supplied, optical signals of said first wavelength band is input via said first optical circulator and output this via said second optical circulator, and optical signals of said second wavelength band is input via said second optical circulator and outputs this via said first optical circulator, so that optical signals of said respective wavelength bands are propagated in mutually opposite directions inside said rare earth element doped fiber, to thereby perform amplification of said wavelength division multiplexed signal light.

15. An optical amplifier for amplifying wavelength division multiplexed signal light which contains respective optical signals of a first wavelength band and a second wavelength band transmitted in the same direction, comprising:

optical amplifying means for amplifying said wavelength division multiplexed signal light using a rare earth element doped fiber to which excitation means is supplied;

a first optical circulator connected to one end of said rare earth element doped fiber; and a second optical circulator connected to the other end of said rare earth element doped fiber, wherein an optical signal of said first wavelength band is input to said rare earth element doped fiber via said first optical circulator and output from said rare earth element doped fiber via said second optical circulator, and an optical signal of said second wavelength band is input to said rare earth element doped fiber via said second optical circulator, and output from said rare earth element doped fiber via said first optical circulator.

16. An optical amplifier for amplifying wavelength division multiplexed signal light which contains respective optical signals of a first wavelength band and a second wavelength band, comprising:
- an optical amplifying unit amplifying said wavelength division multiplexed signal light using a rare earth element doped fiber to which excitation light is supplied;
- a first optical circulator having at least three ports, connected to one end of said rare earth element doped fiber; and
- a second optical circulator connected to the other end of said rare earth element doped fiber,
- wherein an optical signal of said first wavelength band is input to said rare earth element doped fiber via said first optical circulator and output from said rare earth element doped fiber via said second optical circulator, and an optical signal of said second wavelength band is input to said rare earth element doped fiber via said second optical circulator, and output from said rare earth element doped fiber via said first optical circulator the signal light of said respective wavelength bands being propagated in mutually opposite directions inside the rare earth element doped fiber, and the wavelength division multiplexed signal light of said first wavelength band and the wavelength division multiplexed signal light of said second wavelength band are transmitted in the same direction.

* * * * *